US012566054B2

(12) United States Patent
Barrett et al.

(10) Patent No.: US 12,566,054 B2
(45) Date of Patent: **\*Mar. 3, 2026**

(54) MANEUVERING AEROMECHANICALLY STABLE SABOT SYSTEM

(71) Applicant: University of Kansas, Lawrence, KS (US)

(72) Inventors: Ronald Martin Barrett, Lawrence, KS (US); Lauren Nicole Schumacher, Rolla, MO (US)

(73) Assignee: The University of Kansas, Lawrence, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,605

(22) Filed: Dec. 26, 2023

(65) Prior Publication Data

US 2024/0175666 A1 May 30, 2024

Related U.S. Application Data

(62) Division of application No. 17/606,704, filed as application No. PCT/IB2020/053899 on Apr. 24, 2020, now Pat. No. 11,852,447.

(Continued)

(51) Int. Cl.
 *F42B 14/06* (2006.01)
 *B64D 1/04* (2006.01)
 (Continued)

(52) U.S. Cl.
 CPC .............. *F42B 14/061* (2013.01); *B64D 1/04* (2013.01); *F42B 10/30* (2013.01); *F42B 10/64* (2013.01); *F42B 14/08* (2013.01)

(58) Field of Classification Search
 CPC ................................ F42B 14/06; F42B 14/064
 See application file for complete search history.

(56) References Cited

U.S. PATENT DOCUMENTS

| | | |
|---|---|---|
| 12,629 A | 4/1855 | Houghton |
| 15,075 A | 6/1856 | Hubbell |

(Continued)

FOREIGN PATENT DOCUMENTS

| | | |
|---|---|---|
| EP | 0275685 A2 | 7/1988 |
| FR | 2757938 A1 | 7/1998 |

(Continued)

OTHER PUBLICATIONS

Patent Cooperation Treaty, International Search Report and Written Opinion issued for PCT Application No. PCT/IB2020/053899, dated Aug. 25, 2021, 12 pages.

(Continued)

*Primary Examiner* — Derrick R Morgan
(74) *Attorney, Agent, or Firm* — Norton Rose Fulbright US LLP

(57) ABSTRACT

An aeromechanically stable sabot system that includes a center of gravity that is placed forward of an aerodynamic center of the aeromechanically stable sabot system when in steady-state flight. By placing the center of gravity forwards of the aerodynamic center, the sabot system exhibits positive longitudinal and directional stability. To illustrate, the sabot system and/or portions thereof will return to stable flight after being disturbed in pitch (vertically or about a transverse horizontal axis) or yaw (side to side or about a vertical axis) when traveling horizontally.

20 Claims, 29 Drawing Sheets

Related U.S. Application Data

(60) Provisional application No. 62/839,551, filed on Apr. 26, 2019.

(51) Int. Cl.
F42B 10/30 (2006.01)
F42B 10/64 (2006.01)
F42B 14/08 (2006.01)

(56) References Cited

U.S. PATENT DOCUMENTS

| | | | | |
|---|---|---|---|---|
| 27,245 | A | | 2/1860 | Swain |
| 33,863 | A * | 12/1861 | Woodbury | F42B 10/22 |
| | | | | 244/3.23 |
| 39,180 | A | | 7/1863 | Stafford |
| 39,369 | A | | 7/1863 | Arick |
| 40,198 | A | | 10/1863 | Stafford |
| 44,670 | A | | 10/1864 | Smith |
| 195,040 | A | | 9/1877 | Owen |
| 2,661,694 | A * | 12/1953 | Allen | F42B 12/34 |
| | | | | 102/508 |
| 2,672,814 | A * | 3/1954 | Dubost | E21B 43/116 |
| | | | | 227/9 |
| 2,983,225 | A * | 5/1961 | Walker | F42B 14/064 |
| | | | | 102/523 |
| 3,005,408 | A * | 10/1961 | Prosen | F42B 14/068 |
| | | | | 102/522 |
| 3,055,268 | A * | 9/1962 | Rosenthal | F42B 14/08 |
| | | | | 89/14.6 |
| 3,141,412 | A * | 7/1964 | Roehrdanz | F42B 14/064 |
| | | | | 102/522 |
| 3,148,472 | A | | 9/1964 | Hegge |
| 3,164,092 | A | | 1/1965 | Reed |
| 3,200,751 | A * | 8/1965 | Vitt | F42B 10/22 |
| | | | | 102/519 |
| 3,349,708 | A * | 10/1967 | Paget | F42B 15/00 |
| | | | | 102/374 |
| 3,359,905 | A * | 12/1967 | Engel | F42B 14/064 |
| | | | | 102/522 |
| 3,446,147 | A | | 5/1969 | Engel |
| 3,447,466 | A * | 6/1969 | Engel | F42B 14/064 |
| | | | | 102/522 |
| 3,507,221 | A * | 4/1970 | Grolly | F42B 14/064 |
| | | | | 102/518 |
| 3,714,900 | A * | 2/1973 | Feldmann | F42B 14/064 |
| | | | | 102/522 |
| 3,771,458 | A * | 11/1973 | Schweimler | F42B 14/064 |
| | | | | 102/523 |
| 3,780,658 | A * | 12/1973 | de Longueville | F42B 10/40 |
| | | | | 102/518 |
| 3,834,314 | A | | 9/1974 | Young |
| 3,842,741 | A | | 10/1974 | Brothers et al. |
| 3,847,082 | A * | 11/1974 | Feldmann | F42B 14/064 |
| | | | | 102/522 |
| 3,862,603 | A * | 1/1975 | Kornblith | F42B 14/061 |
| | | | | 102/522 |
| 3,948,184 | A * | 4/1976 | Pierre | F42B 14/064 |
| | | | | 102/522 |
| 4,142,467 | A * | 3/1979 | Stahlmann | F42B 14/064 |
| | | | | 102/523 |
| 4,187,783 | A | | 2/1980 | Campoli et al. |
| 4,284,008 | A | | 8/1981 | Kirkendall et al. |
| 4,301,733 | A * | 11/1981 | Arciniega Blanco | F42B 7/10 |
| | | | | D22/116 |
| 4,384,528 | A * | 5/1983 | Moore | F42B 12/44 |
| | | | | 102/503 |
| 4,430,943 | A * | 2/1984 | Bock | F42B 14/08 |
| | | | | 102/529 |
| 4,434,718 | A | | 3/1984 | Kopsch et al. |
| 4,476,785 | A * | 10/1984 | Hoffman | F42B 14/064 |
| | | | | 102/522 |
| 4,534,265 | A | | 8/1985 | Bates et al. |
| 4,574,703 | A * | 3/1986 | Halverson | F42B 14/064 |
| | | | | 102/522 |
| H165 | H | | 11/1986 | Silsby |
| 4,653,404 | A * | 3/1987 | Halverson | F42B 14/064 |
| | | | | 102/522 |
| 4,709,638 | A * | 12/1987 | Broden | F42B 14/064 |
| | | | | 102/522 |
| 4,776,281 | A * | 10/1988 | Chiang | F42B 10/34 |
| | | | | 102/503 |
| 4,800,816 | A | | 1/1989 | Meyer |
| 4,833,995 | A | | 5/1989 | Gotz et al. |
| 4,944,226 | A | | 7/1990 | Wedertz | F42B 10/18 |
| | | | | 102/306 |
| 5,196,650 | A * | 3/1993 | Cytron | F42B 14/061 |
| | | | | 102/521 |
| 5,323,708 | A * | 6/1994 | Sigler | F42B 14/06 |
| | | | | 102/521 |
| 5,359,938 | A | | 11/1994 | Campoli et al. |
| 5,361,701 | A * | 11/1994 | Stevens | C06C 15/00 |
| | | | | 102/451 |
| 5,388,523 | A | | 2/1995 | Rossmann |
| 5,725,179 | A * | 3/1998 | Gilman | F42B 10/24 |
| | | | | 102/501 |
| H1938 | H * | 2/2001 | Harkins | 114/20.1 |
| 6,234,082 | B1 | | 5/2001 | Cros et al. |
| 6,814,006 | B2 | | 11/2004 | Johansson |
| 7,036,434 | B1 * | 5/2006 | Vo | F42B 14/06 |
| | | | | 102/503 |
| 7,380,504 | B2 * | 6/2008 | Dryer | F41B 6/00 |
| | | | | 102/503 |
| 7,568,433 | B1 * | 8/2009 | Farina | F42B 33/06 |
| | | | | 102/501 |
| 7,781,709 | B1 * | 8/2010 | Jones | F42B 10/60 |
| | | | | 102/382 |
| 8,434,394 | B1 * | 5/2013 | Malejko | F42B 15/105 |
| | | | | 89/1.816 |
| 8,661,983 | B1 * | 3/2014 | Scarr | F42B 10/38 |
| | | | | 102/502 |
| 8,735,789 | B1 * | 5/2014 | Malejko | F42B 10/06 |
| | | | | 244/3.24 |
| 9,644,929 | B1 * | 5/2017 | Bradbury | F42B 10/06 |
| D903,812 | S * | 12/2020 | Buys | D22/115 |
| 10,996,036 | B1 * | 5/2021 | Brookman | F42B 14/068 |
| 2004/0055502 | A1 * | 3/2004 | Hunn | F42B 10/08 |
| | | | | 102/519 |
| 2005/0000383 | A1 * | 1/2005 | Facciano | F42B 15/36 |
| | | | | 102/377 |
| 2007/0034073 | A1 * | 2/2007 | Banks | F42B 12/62 |
| | | | | 89/1.815 |
| 2011/0308417 | A1 * | 12/2011 | Glasser | F42B 10/42 |
| | | | | 102/374 |
| 2013/0228090 | A1 * | 9/2013 | Billings | F42B 7/08 |
| | | | | 264/250 |
| 2013/0312631 | A1 | | 11/2013 | Rossmann et al. |
| 2016/0138898 | A1 * | 5/2016 | Schultz | F42B 7/08 |
| | | | | 102/451 |
| 2017/0080498 | A1 * | 3/2017 | Burrow | B22F 3/225 |
| 2018/0156587 | A1 * | 6/2018 | Raquin | F42B 12/34 |
| 2018/0216922 | A1 | | 8/2018 | Bucher |
| 2018/0335285 | A1 * | 11/2018 | Gizowski | F42B 30/02 |
| 2019/0041175 | A1 * | 2/2019 | Fellows | F42B 10/08 |
| 2020/0348114 | A1 * | 11/2020 | Feese | F42B 14/06 |

FOREIGN PATENT DOCUMENTS

| | | | |
|---|---|---|---|
| GB | 2071825 | A | 9/1981 |
| GB | 2238602 | A | 6/1991 |

OTHER PUBLICATIONS

De Milemete, Walter, Treatise of Walter de Milemete, Nobilitatibus Sapientii et Prudentiis Regum, Christ Church, Oxford, England, 1326, p. 70v. 2 pages.
De Milemete, Walter, De Secretis Secretorum Aristotelis, Library of the Earl of Leicester at Holkham Hall, 1326.

(56) References Cited

OTHER PUBLICATIONS

Etkin, B., & Reid, L. D. (1996). Dynamics of Flight: Stability and Control (3rd Edition), John Wiley & Sons, Inc.
Roskam, J. (2001). Airplane Flight Dynamics and Automatic Flight Controls . Design, Analysis and Research Corporation.
Siegelman, D. and Wang, J. "Sabot Design Optimization," Avco Systems Division, Wilmington, MA. Contract Report ARBRL-CR-00450, 1981. 42 pages.
Carlucci, D. E., & Jacobson, S. S. (2008). Ballistics: Theory and Design of Guns and Ammunition. 1st Ed., CRC Press, Taylor & Francis Group.
European Patent Office, Communication, Extended European Search Report issued for Patent Application No. 20794611.2, dated May 23, 2022, 8 pages.

* cited by examiner

PRIOR ART

*PRIOR ART*

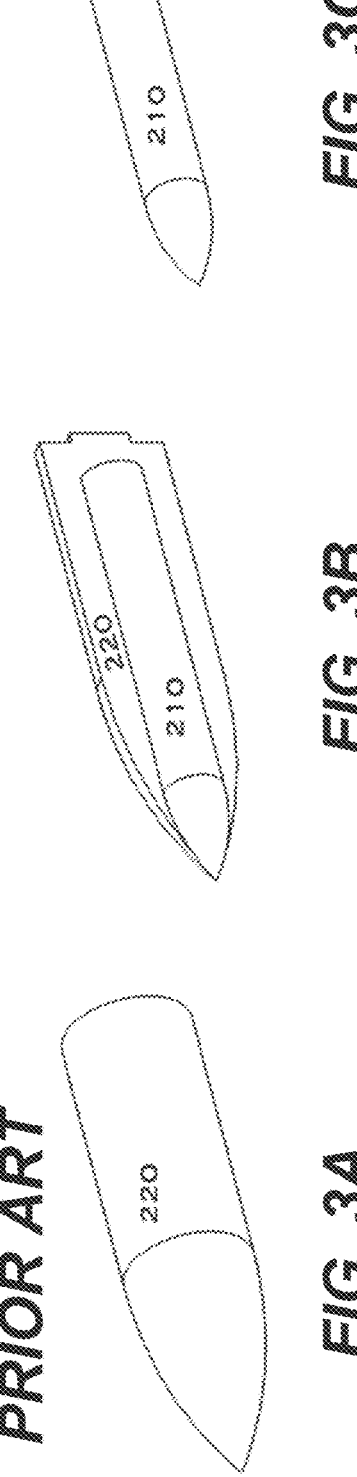
*PRIOR ART*
*FIG. 3A*
*FIG. 3B*
*FIG. 3C*
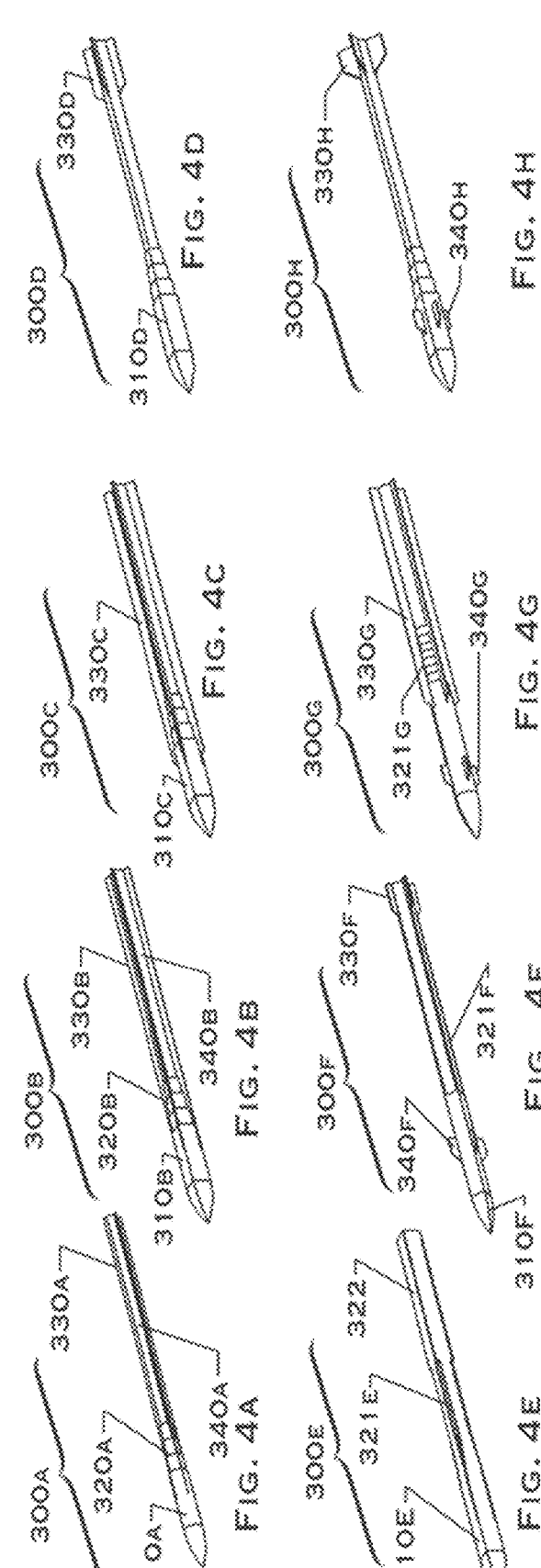
FIG. 4A
FIG. 4B
FIG. 4C
FIG. 4D
FIG. 4E
FIG. 4F
FIG. 4G
FIG. 4H

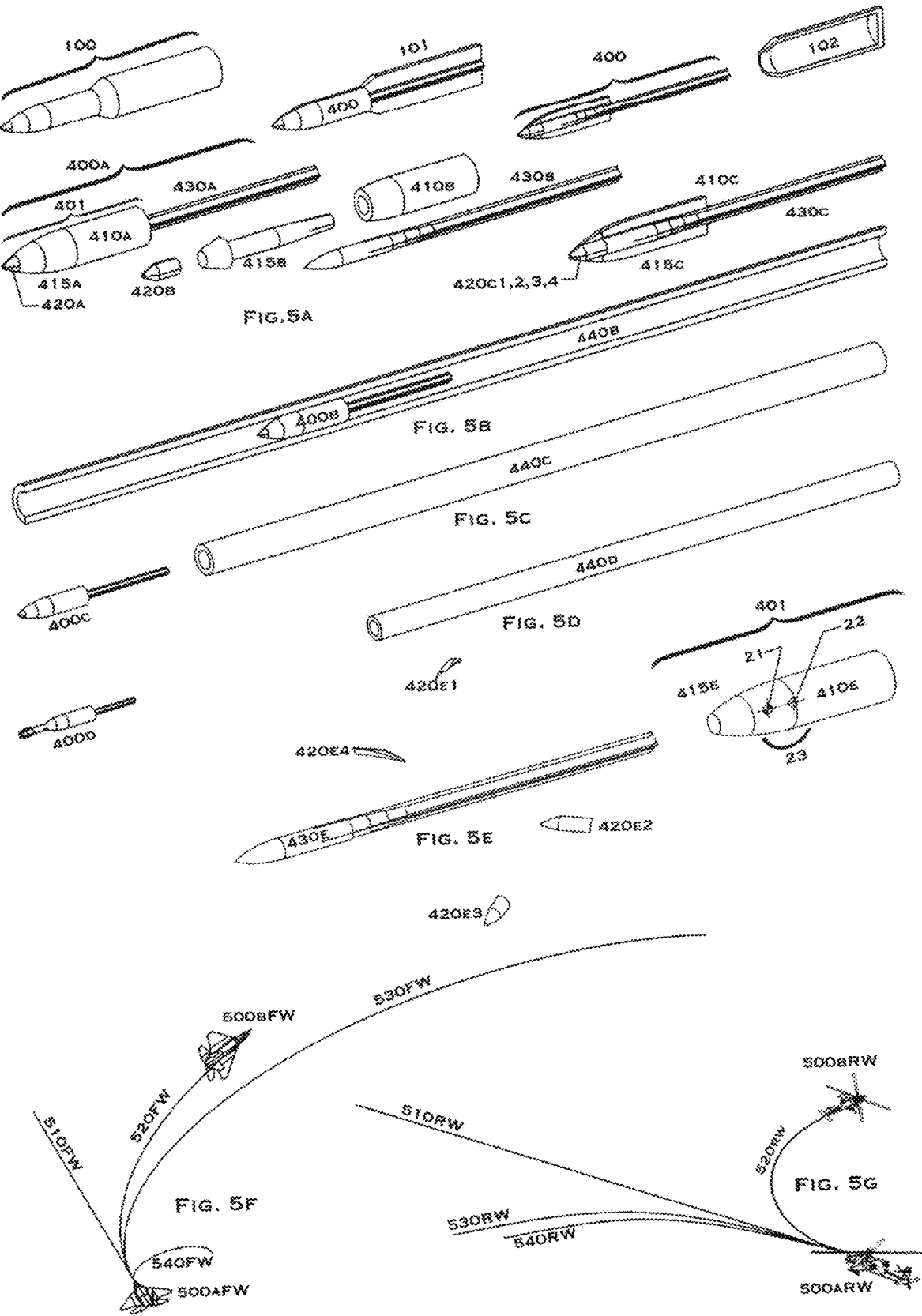

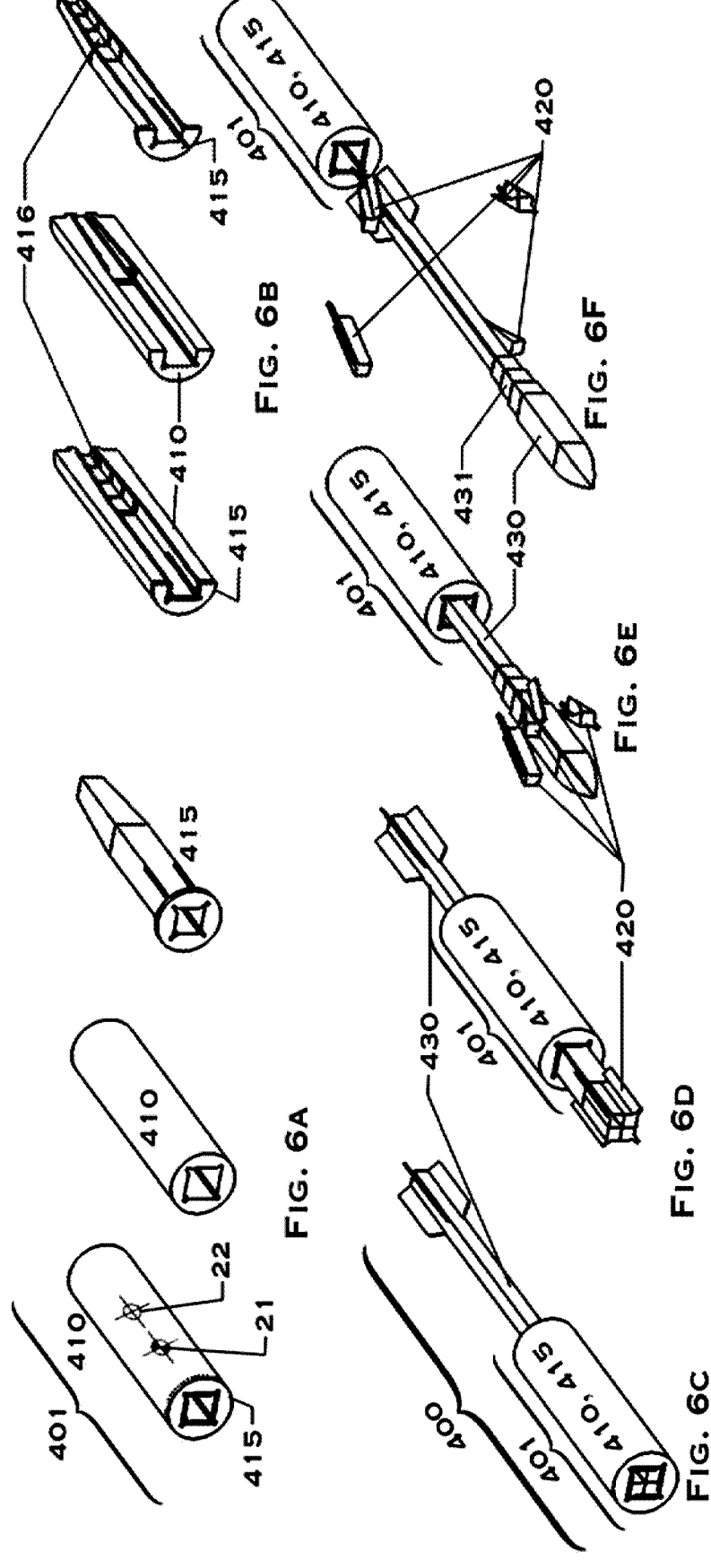

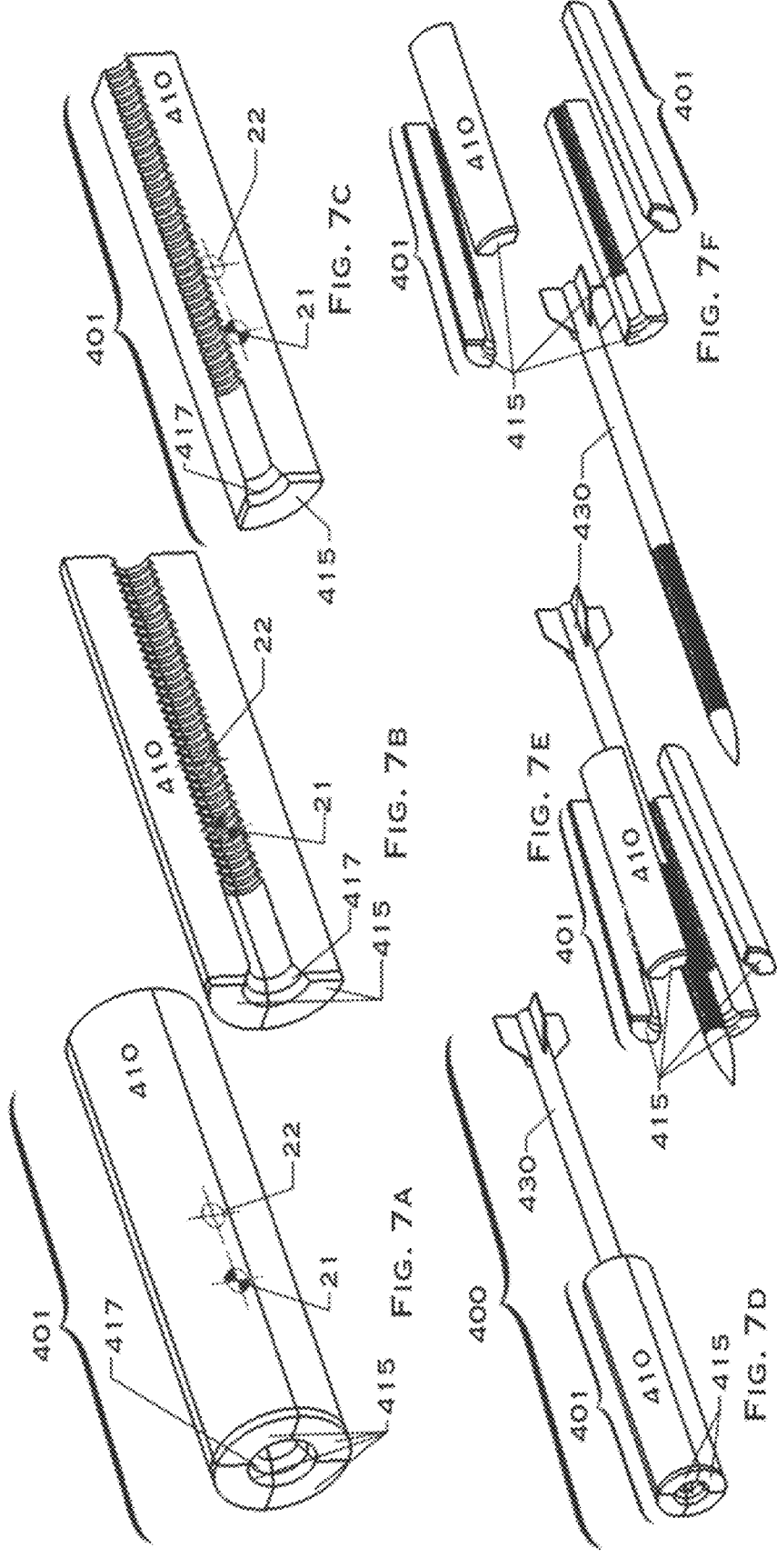

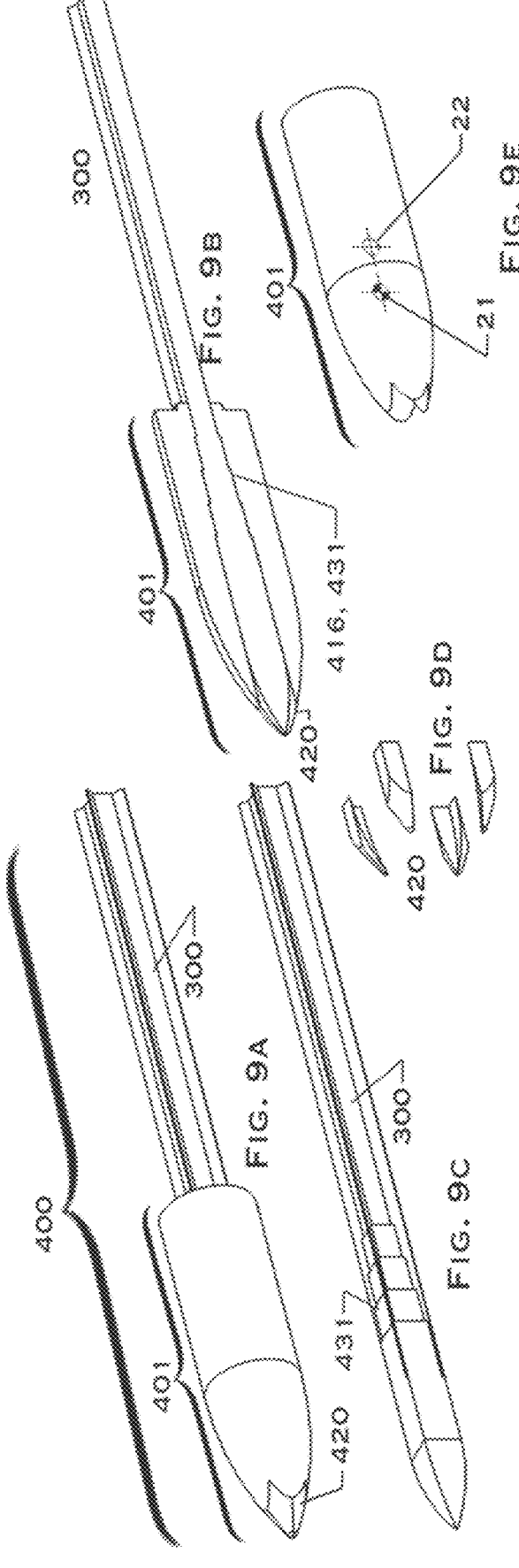

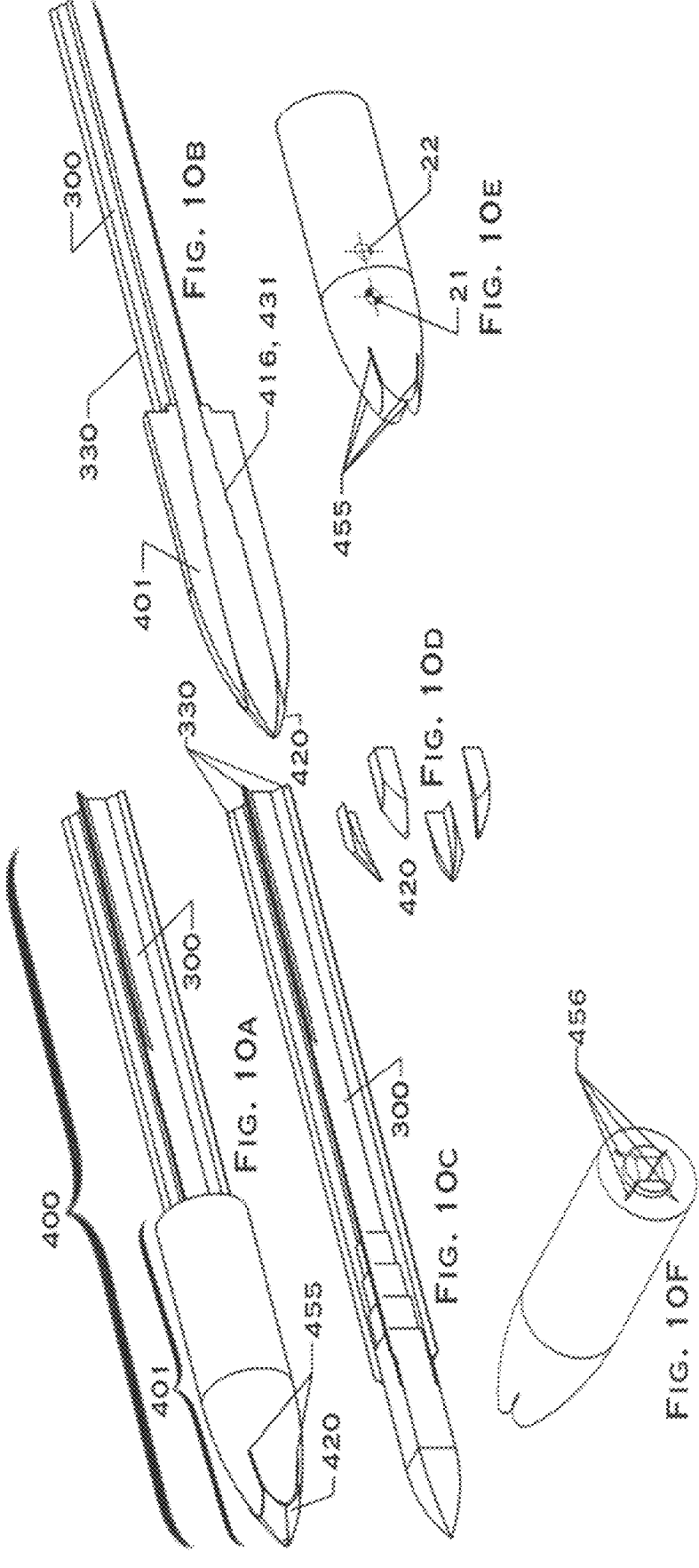

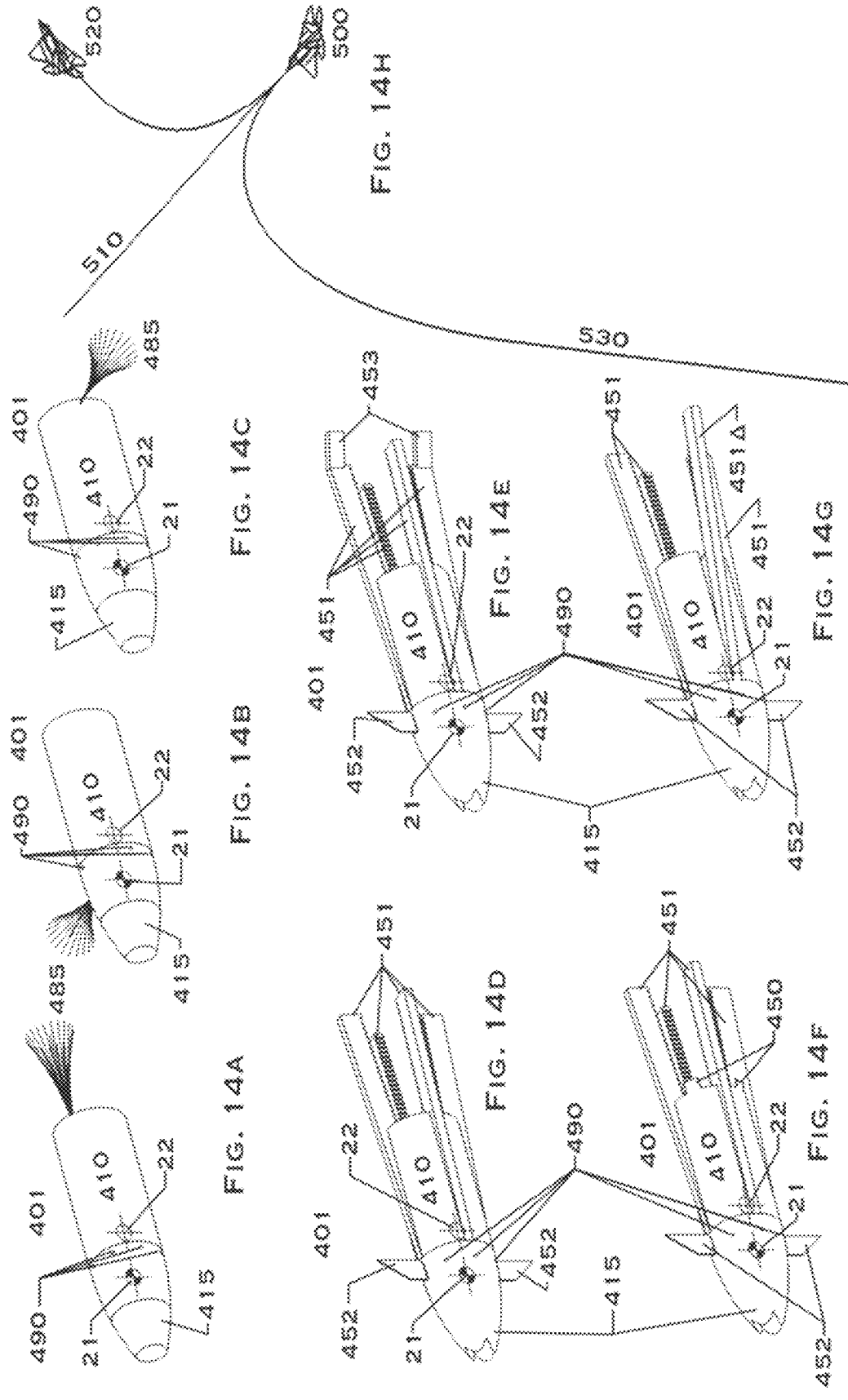

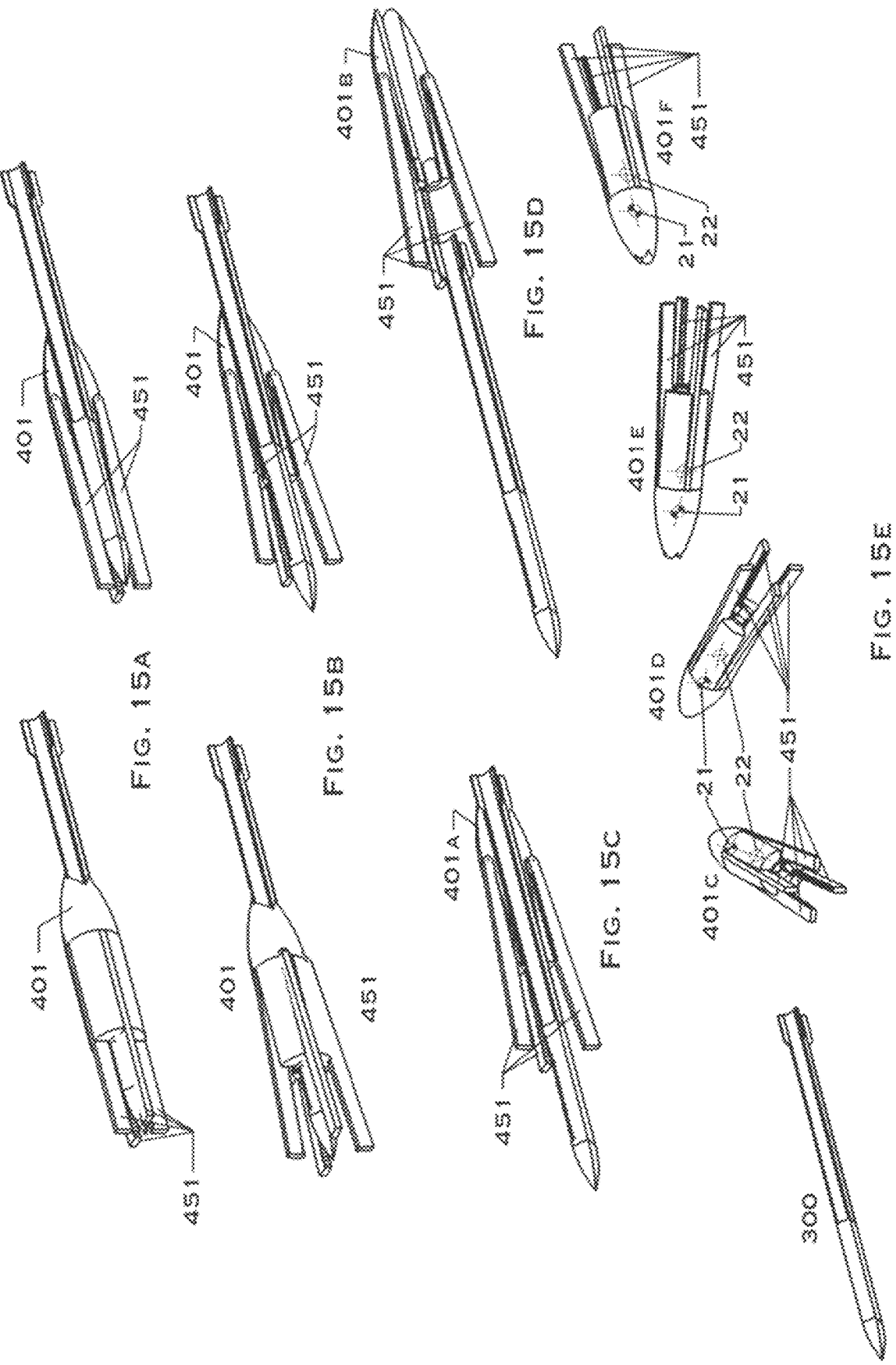

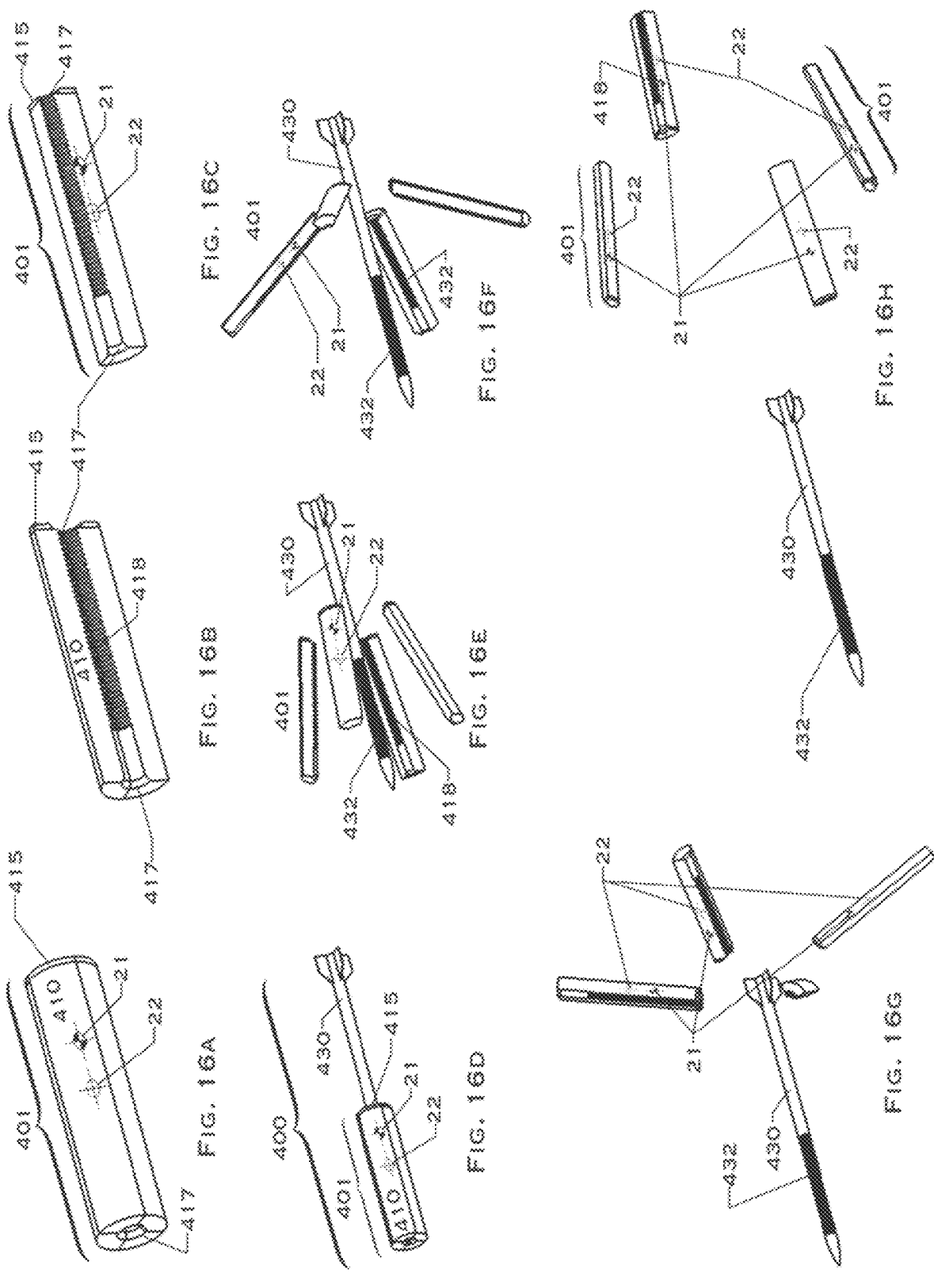

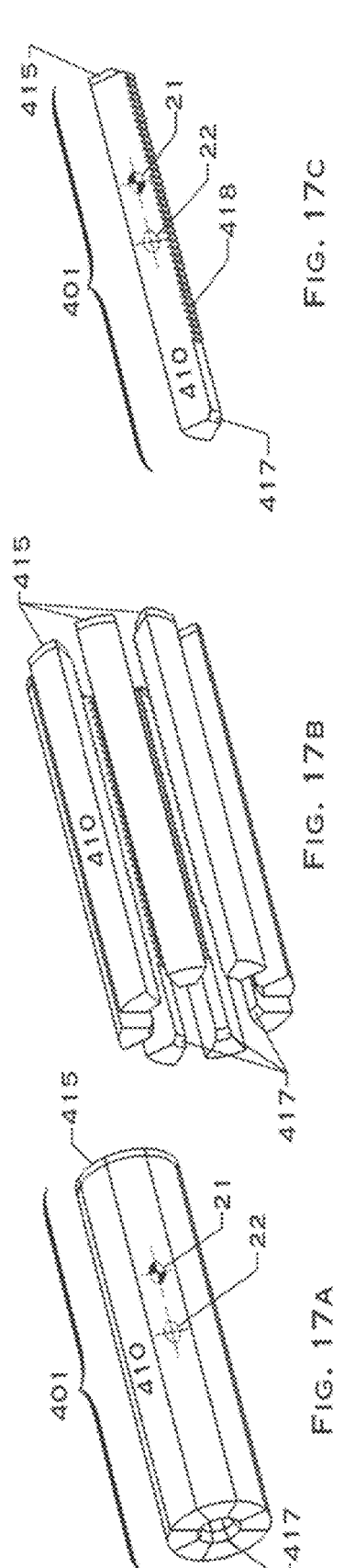
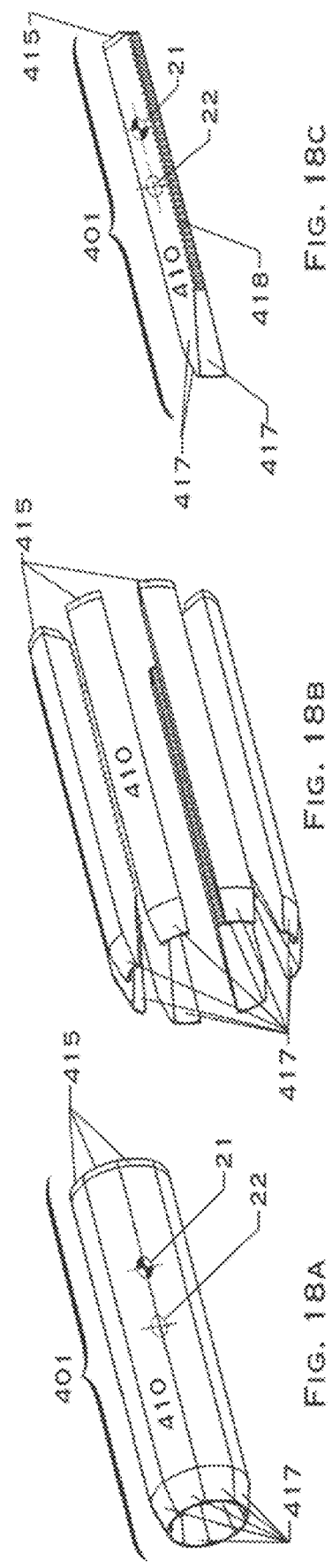

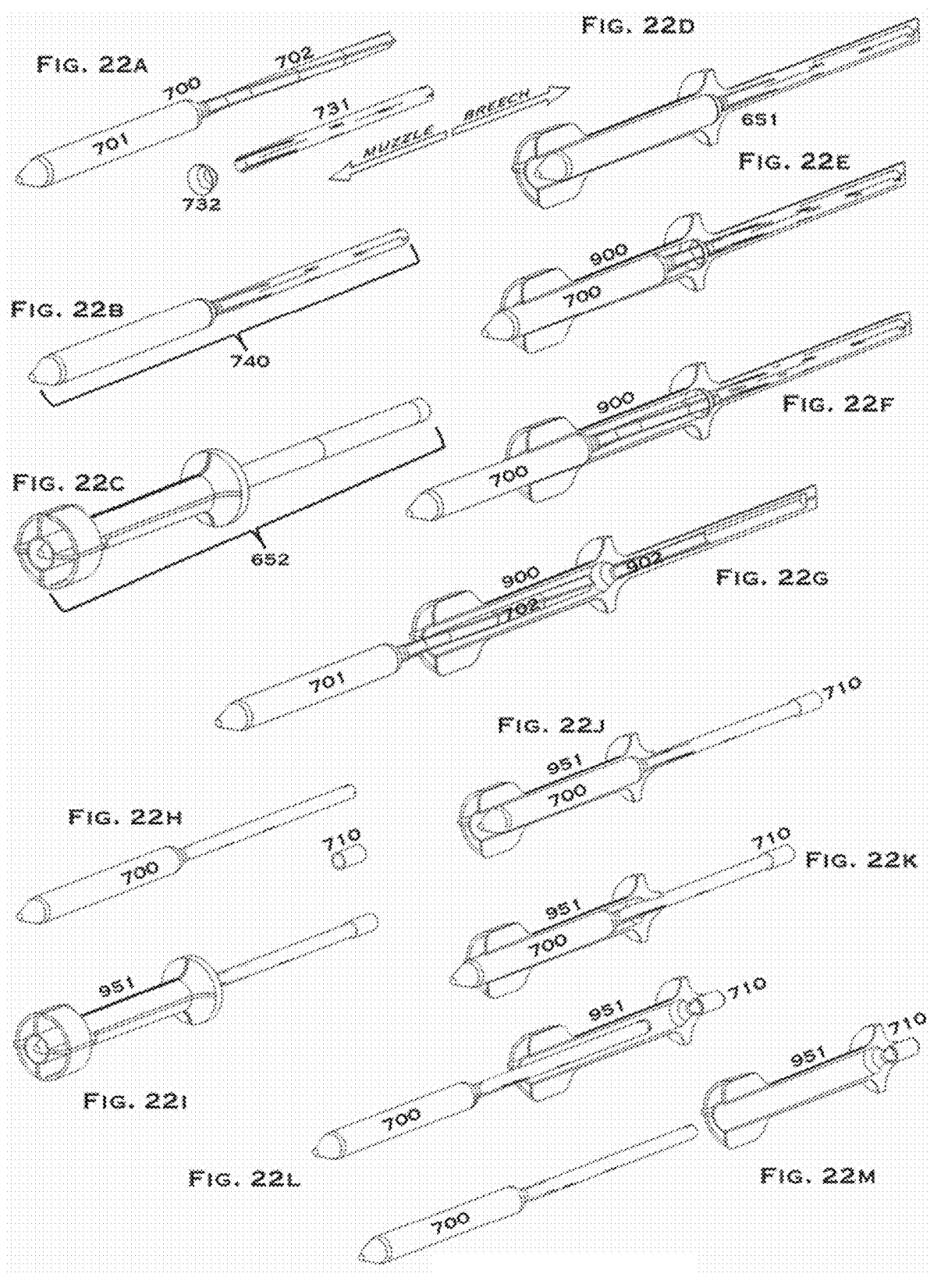

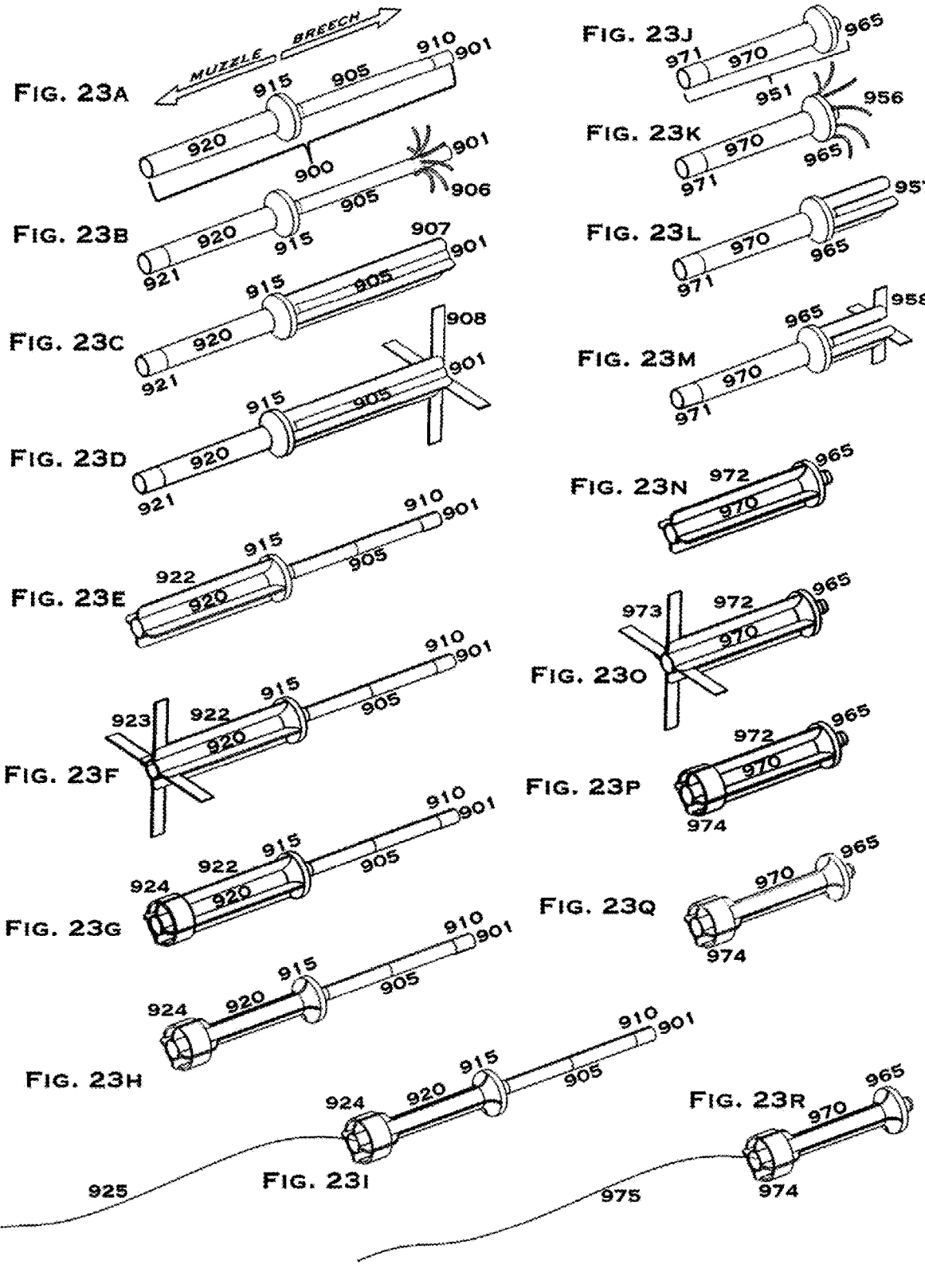

3000

3100

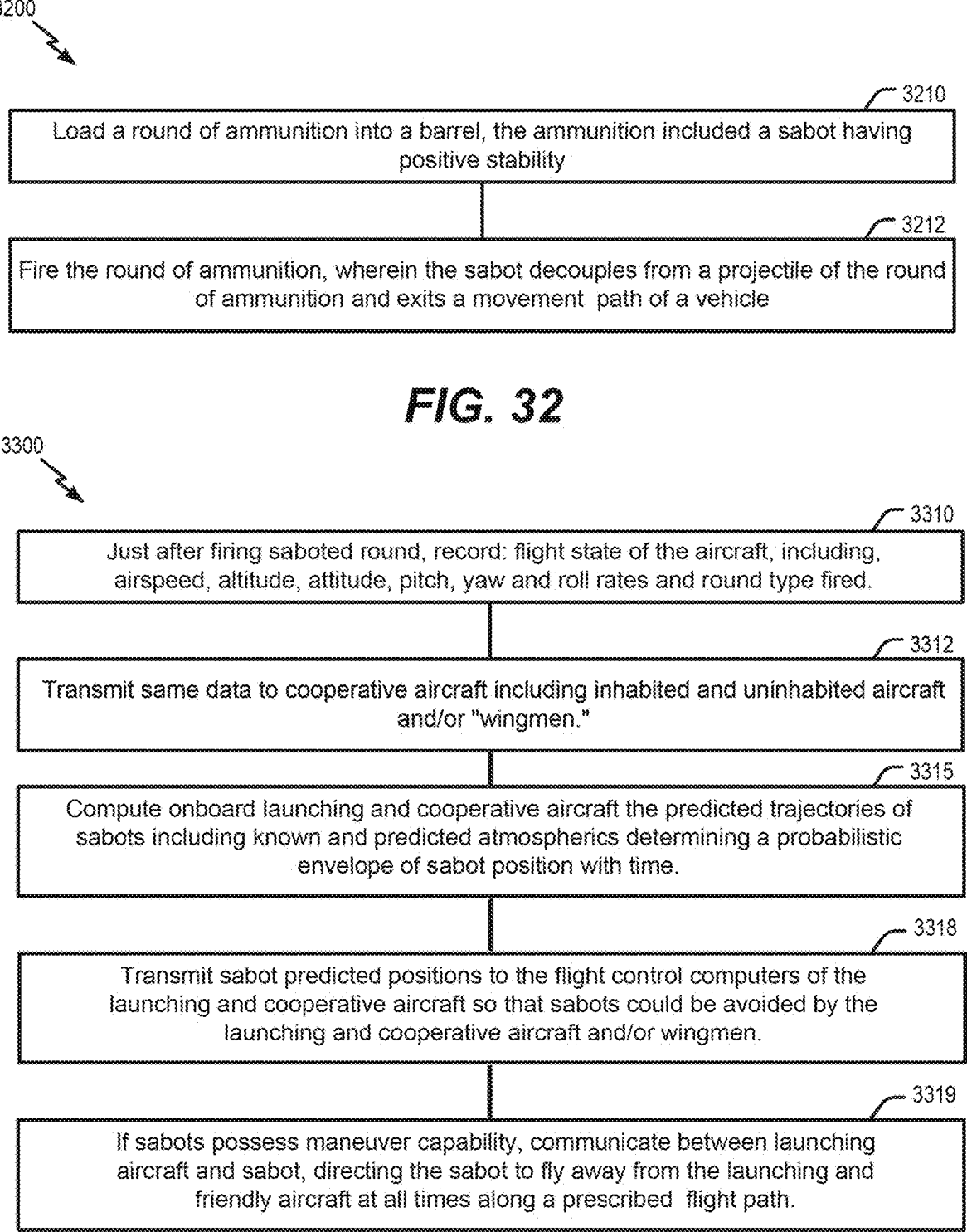

3200

3210

Load a round of ammunition into a barrel, the ammunition included a sabot having positive stability

3212

Fire the round of ammunition, wherein the sabot decouples from a projectile of the round of ammunition and exits a movement path of a vehicle

Just after firing saboted round, record: flight state of the aircraft, including, airspeed, altitude, attitude, pitch, yaw and roll rates and round type fired.

3312

Transmit same data to cooperative aircraft including inhabited and uninhabited aircraft and/or "wingmen."

3315

Compute onboard launching and cooperative aircraft the predicted trajectories of sabots including known and predicted atmospherics determining a probabilistic envelope of sabot position with time.

3318

Transmit sabot predicted positions to the flight control computers of the launching and cooperative aircraft so that sabots could be avoided by the launching and cooperative aircraft and/or wingmen.

3319

If sabots possess maneuver capability, communicate between launching aircraft and sabot, directing the sabot to fly away from the launching and friendly aircraft at all times along a prescribed flight path.

FIG. 33

MANEUVERING AEROMECHANICALLY STABLE SABOT SYSTEM

CROSS-REFERENCE TO RELATED APPLICATIONS

This application is a division of U.S. patent application Ser. No. 17/606,704 filed Oct. 26, 2021 and issued Dec. 26, 2023 as U.S. Pat. No. 11,852,447, which is a national phase application under 35 U.S.C. § 371 of International Application No. PCT/IB2020/053899 filed Apr. 24, 2020, which claims the benefit of priority to U.S. Provisional Patent Application No. 62/839,551 filed Apr. 26, 2019, the disclosures of which are incorporated by reference herein in their entirety.

TECHNICAL FIELD

Aspects of the present disclosure generally relate to sabots.

BACKGROUND

A sabot is a structural device used in or with firearm ammunition or cannon ammunition to keep a projectile (aka flight projectile), such as a bullet or arrow-type projectile, in a center of a gun barrel when fired, when the projectile (e.g., a sub-caliber projectile) has a significantly smaller diameter than a bore diameter (i.e., caliber) of the gun barrel. A sabot enables a smaller diameter projectile to be launched at greater muzzle velocity than if the projectile alone were fired from a gun barrel of equal caliber (full-bore).

A function of a sabot is to provide a larger bulkhead structure that fills the entire bore area between the sub-caliber projectile and the gun barrel. The bulkhead structure provides a larger surface area for propellant gasses to act upon as compared to only a base of the sub-caliber flight projectile. Efficient aerodynamic design of a projectile usually does not coincide with efficient interior ballistic (gun barrel ballistics or ballistics inside the gun barrel) design to achieve high muzzle velocity. This is especially true for arrow-type projectiles, which are long and thin for low drag efficiency, but too thin to shoot from a gun barrel of equal diameter to achieve high muzzle velocity. The physics of interior ballistics demonstrates why the use of a sabot is advantageous to achieve higher muzzle velocity with an arrow-type projectile. Propellant gasses generate high pressure, and the larger the base area that pressure acts upon the greater the net force on that surface. Force, pressure times area, provides an acceleration to the mass of the projectile. Therefore, for a given pressure and gun barrel diameter, a lighter projectile can be driven from a gun barrel to a higher muzzle velocity than a heavier projectile, assuming surface area and shape are constant. However, a lighter projectile may not fit in the gun barrel, because it may be of smaller diameter. To make up this difference in diameter, a properly designed sabot provides increase or full bore like surface area for propellant gasses to act and less parasitic mass than if the flight projectile were made full-bore.

Nevertheless, the weight of the sabot represents parasitic mass that must also be accelerated to muzzle velocity, as least while in the gun barrel. The sabot does not contribute to the terminal ballistics of the flight projectile. Accordingly, great emphasis is placed on selecting strong yet lightweight structural materials for the sabot, and configuring the sabot geometry to efficiently employ these parasitic materials at minimum weight penalty.

Sabots have been used since ancient times. For example, works showing the use of a saboted projectile being expelled from a cannon were published in 1326 by Walter De Milemete in *Nobilitatibus Sapientii et Prudentiis Regum* and *De Secretis Secretorum Aristotelis*. These documents claim to pass down techniques of warfare and weapons used as far back as Aristotle's time, and depict arrow-shaped projectiles being shot from cannon with what appears to be sabots encasing a portion of the arrow-shaped projectiles.

While sabots have evolved from the classical and medieval approaches referenced above to the hypersonic designs of today, several principles have held steady through time: i.) a sabot is placed around a projectile and is composed of one or more pieces of comparatively low-density material; ii.) the projectile is made from comparatively higher-density material and lies within the sabot; iii.) during the launching event in the gun barrel, the sabot transfers kinetic energy from propellant gasses to the projectile and the sabot helps guide the projectile down the gun barrel; iv.) the projectile is inherently stable or spin stabilized following gun barrel exit and sabot separation; v.) the sabot and its pieces are unstable and tumble upon gun barrel exit and sabot separation.

Outside of the above general common characteristics, the configurations of sabots and projectiles vary widely, encompassing varied geometry and muzzle velocities ranging from low subsonic through hypersonic. To illustrate, many different types of sabots are known, such as cup sabots, expanding cup sabots, base sabots, spindle sabots, and ring sabots.

For a long time, round cannon balls were used as projectiles in warfare on land and sea. U.S. Pat. Nos. 12,629 and 15,075 show configurations wherein wooden blocks are placed behind the cannon balls and are used to push the balls down the gun barrel. These sabot configurations had several advantages in that their tighter fits within the gun barrel meant that fewer gun gasses would escape around the ball as it would travel down the gun barrel. Another profound advantage was that the ball would no longer be spun in an axis perpendicular to the gun barrel longitudinal axis as the round would ballot down the gun barrel. This lack of spin means that the Magnus effects and forces would be reduced as the cannon ball would travel downrange, thereby improving accuracy.

U.S. Pat. No. 27,245 shows a wooden sabot wrapping around a projectile that generates spin in a direction parallel to the gun barrel longitudinal axis after sabot release. Once again, the pieces of the sabot are not designed with inherent stability; as there is no prescription for c.g. positioning with respect to a.c. location of the individual sabot pieces, they will tumble upon release.

U.S. Pat. Nos. 39,180, 39,369 and 40,198 teach a different approach to sabot-projectile integration as the sabot takes the form of a pusher plate mounted at the back of the round. As previous sabot designs demonstrate, the pusher plate and all other components of the sabot are not aeromechanically stable as they prescribe no positioning of c.g. with respect to a.c. and their geometries indicate that they will tumble upon gun barrel exit and projectile release.

U.S. Pat. No. 44,670 teaches a different variation of a similar configuration. A single piece sabot envelopes the projectile, but upon projectile release, the sabot remains intact. Because the projectile does not protrude past the base of the sabot, the entire configuration is limited to low fineness ratio projectiles. Although the very concept of aeromechanical stability had not been described or analyzed scientifically in 1864, it is easy for one who is skilled in the art of weapon system design to recognize that the combined sabot-projectile system is directionally and longitudinally stable. However, it is just as obvious that the sabot, upon separation from the projectile, is (grossly) unstable. This instability will induce flight path divergence and tumbling of the sabot upon projectile release.

By 1877, the concepts of projectile aeromechanical stability were becoming more refined as seen in U.S. Pat. No. 195,040. However, the sabot pieces which are taught are clearly aeromechanically unstable and suffer from the same divergence and tumbling motions described above.

Between the late 1800's and the 1960's, the concept of aeromechanical stability by positioning c.g. with respect to a.c. was well understood as a guiding principle for inherently stable flight. With that said, sabot designs still did not possess inherent aeromechanical stability, the principal reason being they had to tumble to bleed off airspeed quickly for safe combat operation. As described in Siegelman and Wang and Carlucci and Jacobsen, sabots come apart rapidly to bleed off airspeed by design. This property allows cannon to be positioned behind friendly troops; firing over friendly forces in support of their operations while not exposing them from behind with dangerous high velocity sabot pieces.

U.S. Pat. No. 3,148,472 shows just such a family of sabot designs using splitting wedges mounted in the gun barrel so as to initiate sabot disintegration upon gun barrel exit. Just as all of the earlier sabot designs teach, the sabot segments and whole sabot described in U.S. Pat. No. 3,148,472 make no mention of aeromechanical stability. Rather, the patent speaks of "sabot disintegration" and cutting upon emergence from the gun barrel. This would generate aeromechanically unstable pieces with high tip-off angles that tumble upon gun barrel exit.

U.S. Pat. No. 3,164,092 teaches a pre-split design which peels open like a fleur-de-lis to expose a central projectile during lateral separation of the individual sabot arms. Once again, the sabot design is inherently aeromechanically unstable upon projectile release and will repeatedly swap ends and/or tumble upon projectile release.

U.S. Pat. No. 3,834,314 teaches a gripping puller sabot with full-length finned projectiles. As with many other designs, upon gun barrel exit the sabot separates into aeromechanically unstable pieces that are flung laterally away from the projectile, diverging and tumbling as they fly through the air.

A system of telescoping tubes with a high-density projectile is taught in U.S. Pat. No. 3,842,741. The overall design also shows a number of aeromechanically unstable petals and protective pieces flying off in all directions (e.g., left, right, up and down, etc.) as the projectile exits the gun barrel. Additionally, the tubes telescope (i.e., extend from one another by sliding) and fly downrange as the projectile exits the gun barrel.

U.S. Pat. No. 4,187,783 teach a modern sabot similar to modern US Army tank ammunition. This sabot design is of a double bourrelet, "gripper" configuration as its multiple segments interface with the projectile via a number of ridges spread down the length of the projectile. The front of the sabot is concave and designed to peel cleanly and quickly from the projectile. The sabot splits into multiple components which are flung perpendicular to the flight path of the projectile, then diverge in flight path and tumble as the components are aeromechanically unstable.

The sabot described in U.S. Pat. No. 4,284,008 possesses the same overall aeromechanical characteristics as '783, but one incarnation shown in '008 is not a double bourrelet configuration; instead, it takes the form of a single bore rider with a "cylindrical bore-riding guidance member." The chief difference between the two patents is the configuration of the gripping ramps holding the sabot pieces to the projectile during the firing event. As taught in '783, the sabot pieces are flung perpendicular to the flight path of the projectile only to diverge and tumble through the air following projectile release.

Another unstable sabot configuration is taught in U.S. Pat. No. 4,800,816. This configuration is incrementally different than the previous designs as the sabot maintains most of its structural integrity as a single piece upon gun barrel exit. While several nose cap pieces are ejected randomly upon gun barrel exit, the bulk of the sabot mass continues a short distance forward from the launching aircraft. While FIG. 1 of '816 shows an idealized flight path of the sabot, the actual flight path of an unstable sabot of this configuration will be quite different given basic aeromechanics and the fundamental physics associated with reactive expulsion of the sabot. The sabot taught in '816 possesses a c.g. which is necessarily behind the a.c. of the sabot in both subsonic and supersonic flight, longitudinally and directionally. This aft ward positioning of the c.g. with respect to the a.c. guarantees that the sabot will be aeromechanically unstable once separated from the projectile. Because the sabot is inherently longitudinally and directionally unstable, it will rotate through at least a 180 deg. turn around the body y or z axes upon projectile expulsion to orient the comparatively heavier aft end into the relative wind, and in many cases the configuration will tumble. As it turns, the flight path will deviate substantially up, down, left or right, frequently presenting large cross-sections perpendicular to the flight path direction. This flight path deviation combined with the sabot's low weight and high drag run the very real risk of ingestion into the launching aircraft engine inlets.

Unlike the modern sabot-projectile configurations taught in '783 and '008, the projectile taught in '816 cannot extend past the base of the sabot. This is because the design calls explicitly for an expulsion charge to be placed at its base of the projectile, within the sabot. While guaranteeing clean separation of the sabot from the projectile, the high mass of the projectile relative to the sabot guarantees that the reward velocity increment of the sabot will be comparatively high. This leads to a dangerous situation in which the sabot itself is shot towards the launching aircraft. Because the tip-off of the sabot upon ignition of the expulsion charge could be nontrivial and the geometry exhibits inherent aeromechanical instability, the danger to the launching aircraft is ever present.

Another artifact of the use of an expulsion charge configuration in '816 is seen in the compromised fineness ratio of the penetrator itself. Because '816 teaches that the projectile cannot protrude past the end of the sabot, the fineness ratio of the '816 projectile is forced to be dramatically lower than the fineness ratios of the projectiles taught in '783 and '008 which can lie deep in the cartridge. This reduction in fineness ratio increases the drag and aeromechanical instability of the '816 projectile with respect to the projectiles taught in '783 and '008.

A hollow windscreen gripper sabot configuration is taught in U.S. Pat. No. 4,833,995. This configuration sabot is composed of pieces that are even more unstable than those taught in '783 and '816 because of the extremely low weight of the windscreen section; this induces a large aftward shift of c.g. The debris field following projectile separation from the sabot includes a plastic sealing disk which is similarly unstable and will fly in many different directions and also includes a thrust ring which is the primary structural connection between the sabot and the projectile.

A hybrid of the gripper bourrelet configuration taught in '783 and '008 is also taught in U.S. Pat. No. 5,359,938. The major difference between the aforementioned gripper bourrelet configuration is that the forward bore rider is composed of not a single disk, but four orthogonal bore-riding arms called "stabilizing posts." As with the sabots taught earlier, once the segments separate from the projectile, their aeromechanically unstable configurations induce tumbling and flight path divergence of both the individual and collective sabot pieces.

Another sabot configuration which employs aeromechanically unstable pieces is taught in U.S. Pat. No. 5,388,523. As is the case with sabots taught in '741, '783, '995 and '938, individual aeromechanically unstable sabot pieces separate laterally to release the projectile, then the components diverge and tumble.

Sabots are even used in missile systems as shown in U.S. Pat. No. 6,234,082. As with hard-launched munitions like cannon shells, the sabot shown in '082 shows aeromechanically unstable pieces laterally separating from a projectile. Because of their aeromechanical instability, the pieces of the sabot will necessarily diverge then tumble.

As shown in '092, U.S. Pat. No. 6,814,006 describes a sabot that opens like petals of a flower or fleur-de-lis to release its projectile. The inherently unstable post-release configuration along with the associated base cap or "driving speculum" are both aeromechanically unstable and will tumble following projectile release.

U.S. Pat. App. Pub. No. 2013/0312631 A1 teaches that the arms do not substantially bend or open like the petals on a flower to allow for projectile release although arranged in a similar multi-arm holder configuration of sabot as taught in '006. Rather, the projectile and sabot are designed to slide away from each other along the projectile body x-axis. This translation is intended to reduce tip-off disturbances following gun barrel exit. This is essentially the same scheme of projectile-sabot separation taught in '816, but without the explosive ejection charge. As with the sabot taught in '816, the sabot taught in '631 is aeromechanically unstable and will swap ends and tumble, leading to the same types of flight path deviations experienced by the sabot laid out in '816.

U.S. Pat. App. Pub. No. 2011/0214582 A1 describes a high velocity projectile held within several aeromechanically unstable sabot segments. As taught earlier in '783, these segments separate upon gun barrel exit, diverge in flight path away from the projectile, and tumble due to their unstable nature.

Accordingly, conventional sabots and pieces thereof are aeromechanically unstable and tend to swap ends, diverge and/or tumble upon projectile separation from the sabot. Because of the unstable trajectory of sabots and pieces thereof, conventional sabots cannot be incorporated into vehicles, such as aircraft, because the sabots and pieces thereof pose a risk to the vehicles. For example, sabots and pieces thereof may strike an body of the aircraft causing damage or may be ingested into a propulsion system of the aircraft and cause engine failure.

SUMMARY

The presently disclosed sabot systems include sabots and sabot pieces which are aeromechanically stable and that achieve stable flight upon separation of the sabot system from a projectile that the sabot system is designed to launch.

Aeromechanically stable as used herein includes an object (flight vehicle) which returns to a steady flight state condition following perturbation with neither static nor dynamic flight path divergence. Such an object may be actively controlled to produce such stability or an object may possess such stability inherently. Aeromechanical stability may also be referred to as positive stability, such as positive static stability, positive dynamic stability, or both.

Inherent aeromechanical stability as used herein includes the inherent property (e.g., by design) of an object (flight vehicle) to return to a steady flight state condition following perturbation with neither static nor dynamic flight path divergence. Directional stability describes the characteristic of an object to inherently point into a prevailing wind when disturbed in yaw. Longitudinal stability describes the characteristic of an object to inherently point into a prevailing wind when disturbed in pitch. Both static and dynamic stability are important and depend on a number of factors including principally a relative positioning between a center of gravity (c.g.) of the object and an aerodynamic center (a.c.) of the object. When the center of gravity (c.g.) of the object is farther forward than the aerodynamic center (a.c., aka center of pressure) of the object, the object experiences aeromechanical stability, i.e., inherent aeromechanical stability because it is caused by the design or physical configuration of the object. Such steady flight state conditions are often referred to as steady-state flight or steady-state, stable flight. A particular example of such steady-state, stable flight is steady-state, stable free flight where the object is not controlled and possesses inherent stability.

Such aeromechanically stable sabots may be launched from any type of vehicle or from stationary installations, and in any type of role, such as surface-to-air, air-to-ground, surface-to-surface, air-to-air, etc. For example, aeromechanically stable sabots may be launched safely from an aircraft in flight at air or ground targets. As another example, aeromechanically stable sabots may be launched from a ground vehicle, such as a tank or a mobile artillery vehicle. When launched from the ground, the aeromechanically stable sabots may be directed at air or ground targets. Similarly, when launched at sea by water vehicle (e.g., naval vessel), the aeromechanically stable sabots may be fired at air or ground targets.

By examining a longitudinal equilibrium equation for a rigid body traveling through the air with neither significant angular momentum nor under power in steady-state flight, a basic set of equilibrium equations can be seen using standard aeromechanics nomenclature established by authors like Etkin and Roskam. An example of such equilibrium equations is provided below by set of Equations 1:

$$m(\dot{U}-VR+WQ)=mg \sin \theta + F_{Ax}$$

$$m(\dot{V}-UR+WP)=mg \sin \phi \cos \theta + F_{Ay}$$

$$m(\dot{W}-UQ+VP)=mg \cos \phi \text{ to } \cos \theta + F_{Az}$$

$$I_{xx}\dot{P}-I_{xz}\dot{R}-I_{xz}PQ+(I_{zz}-I_{yy})RQ=L_A$$

$$I_{yy}\dot{Q}-I_{xz}\dot{R}+I_{xz}(P^2-R^2)+(I_{xx}-I_{zz})PR=M_A$$

$$I_{zz}\dot{R}-I_{xz}\dot{P}+I_{xz}QR+(I_{yy}-I_{xx})PQ=N_A.$$

By assuming the flight state conditions above, the longitudinal stability derivative can be determined by the following equation, Equation 2:

$$C_{mcg\alpha}=dC_{mcg}/d\alpha=C_{L\alpha}(\overline{X}_{cg}-\overline{X}_{aclong}).$$

This basic stability term is used to assess the amount of (stabilizing) nose-down pitching moment induced by a given increment in lift or increase in angle of attack, $\alpha$. Accordingly, Equation 3 below illustrates longitudinal static stability for inherent rigid body aircraft.

$$C_{mcg\alpha} < 0.$$

In lay-terms, this basic equation means that for every increment in upwards lift that is generated, the aircraft will inherently experience an increment in nose-down pitching moment. It should be easy to see that this condition describes basic static longitudinal stability itself as the aircraft pitches nose down, the lift increment is therefore reduced, eventually settling at a trim point. There is, of course, a directional stability analog describing the yawing moment coefficient about the center of gravity, see Equation 4 below:

$$C_{ncg\beta} = dC_{ncg}/d\beta = C_{Y\beta}(\overline{X}_{acdir} - \overline{X}_{cg}).$$

Given traditional aeromechanics sign conventions (like those described by Roskam or Etkins), static directional stability is indicated by Equation 5:

$$C_{ncg\beta} > 0.$$

When this condition is met, the aircraft inherently yaws into the wind as it comes from a given quadrant. Accordingly, this type of stability is normally referred to as "weathercock" or "weathervane" stability.

In both cases, the distance between the aerodynamic centers and the centers of gravity and the sign of their relative positions enable stability. By examining the equations above, it is easy to see that the center of gravity must be ahead of the aerodynamic centers both longitudinally and directionally for static stability. Accordingly, the longitudinal and directional static margins are indicated by set of Equations 6:

$$S \cdot M_{long} = -dC_{mcg}/dC_L = (\overline{X}_{aclong} - \overline{X}_{cg})$$

$$S \cdot M_{dir} = dC_{ncg}/dC_y = (\overline{X}_{acdir} - \overline{X}_{cg}).$$

If one examines the dynamic case, using Routh's stability criterion, the longitudinal condition of set of Equations 6 above changes slightly considering cases of aircraft flying into compressible flight regimes, particularly the ones which may induce troubles with Mach tuck, to Equation 7:

$$S \cdot M_{long} = \overline{X}_{aclong} - \overline{X}_{cg} > \left| \frac{C_{mcgu}}{C_{Lu} + 2C_{L1}} \right|.$$

Of course, the expressions for short period aeromechanical modes also play a role in stability for many ballistic projectiles as sabot separations often induce high tip-off angular accelerations. If one examines the maneuver point which is associated with a condition for divergence of the short period mode, one can see, again, that it can be cast in terms of static margin, Equation 8:

$$S \cdot M_{long} = \overline{X}_{aclong} - \overline{X}_{cg} > \left| \frac{C_{mq} \rho S \overline{D} g}{4W} \right|.$$

As such, the static margin is demonstrated to be enabling both static and dynamic stability of a given projectile and for an aeromechanically stable sabot. Again, in lay terms, what the equations describe is a projectile that flies through the air like a dart—with a heavy part at the front and light stabilizing surfaces aft. To do this, the heavy part shifts the center of gravity forward while the tail surfaces shift the aerodynamic center aft. When this relative position is not maintained, the projectile will fly through the air more like an unspun football—wobbling and tumbling as it goes through the air.

Given the aforementioned nature of maintenance of a positive static margin longitudinally and directionally, a designer who wishes to design a stable sabot system can use such a configuration to modify the exemplary aeromechanically stable sabots described herein and design new sabots. Accordingly, this presently disclosed sabot employs the principles of static and dynamic longitudinal and directional stability in that the sabot will, necessarily, possess a heavy forebody and a lighter afterbody such that the center of gravity is displaced much farther forward on the sabot than the aerodynamic center following release of the projectile from the sabot.

While the previous equations and concepts hold for symmetric, trimmed, unpowered flight of aircraft that are not spinning, another equilibrium equation can describe steady-state longitudinal trim, Equation 9:

$$C_{mcg} = (C_{Lowb} + C_{Lawb}\alpha)(\overline{X}_{cg} - \overline{X}_{aclongwb}) +$$
$$C_{mocgwb} - C_{Lac}\frac{s_c}{S_{ref}}(\overline{X}_{acc} - \overline{X}_{cg})\left\{\alpha - \left(\varepsilon_o + \frac{d\varepsilon_c}{d\alpha}\alpha\right)\right\}.$$

From Equation 9 (which omits but not tail/fin coefficients) it is easy to see that for a symmetrical dart-shaped projectile, the pitching moment coefficient about the center of gravity, $C_{mcg}$ will be close to zero as the angle of attack goes to zero. It is this state that most flechette and dart like projectiles fly in following sabot release.

Equation 9 describes a completely different flight state for a traditional sabot which is normally designed to tumble through the air. Given that property and the static margin for the entire traditional sabot and individual sabot pieces, very small angular pitch and yaw perturbations tend to grow large. That perturbation often comes from the very irregular shape of the sabot which generates large values of the steady state pitching moment coefficient about the center of gravity due to the wing-body combination $C_{mocgwb}$. This perturbation in turn typically initiates pitch and/or yaw divergence, which then grows into a full-blown tumble. It is this very dynamic that is universally found among all prior art sabots and is very different than the presently disclosed sabot system.

The presently disclosed sabot maintains values of steady state pitching moment coefficient about the center of gravity $C_{mocg}$ and the steady state yawing moment coefficient about the center of gravity $C_{nocg}$ which are low enough so as not to induce a tumble, but high enough to generate a finite $\alpha$ or $\beta$ trim angles, canting the body-fixed x-axis in pitch and yaw with respect to the oncoming flow field. These trim angles in turn will generate lift and/or sideforces that are great enough so as to allow the sabot to clear the launching aircraft and all friendly aircraft in the associated formation without undue risk of engine ingestion or airframe strike. Further aiding stable flight of the presently disclosed sabot is the fact that the sabot and its pieces are aeromechanically stable, which means that the center of gravity is ahead of the aerodynamic center. In aeromechanics parlance, the longitudinal and directional static margins as described in equations 6-8 are positive.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein:

FIGS. 3A-3C illustrate enlarged perspective views of the aeromechanically unstable prior-art sabot and projectile of FIGS. 2A-2F;

FIGS. 4A-4H illustrate perspective views of a variety of projectile configurations which are compatible with sabots of the present disclosure;

FIGS. 5A-5G illustrate an example sabot of the present disclosure including a matched right-circular cross-section projectile and a trajectory of the sabot after firing from an aircraft;

FIGS. 6A-6F illustrate an example sabot of the present disclosure including a monolithic bluff-body and the sabot releasing a square cross-section projectile;

FIGS. 7A-7F illustrate an example sabot of the present disclosure including a segmented bluff-body variant and the sabot releasing a round-cross-section projectile;

FIGS. 9A-9E illustrate an example sabot of the present disclosure including a monolithic low-drag body and the sabot releasing a regular polygon cross-section projectile with fins;

FIGS. 10A-10F illustrate an example sabot of the present disclosure including a monolithic low-drag body and the sabot releasing a regular polygon cross-section projectile with fins;

FIGS. 14A-14H illustrate an example guided sabot of the present disclosure including attitude sensors and active steering and illustrate post-launch trajectories of the sabot;

FIGS. 15A-15E illustrate an example sabot of the present disclosure including an articulated fins in a fin-forward configuration and illustrate the sabot exhibiting shuttlecock stability after firing;

FIGS. 16A-16H illustrate an example sabot assembly of the present disclosure including a segmented bluff-body where segments of the sabot assembly exhibit shuttlecock stability after projectile separation;

FIGS. 17A-17C illustrate an example sabot assembly of the present disclosure including a segmented bluff-body with a plurality of small segments;

FIGS. 18A-18C illustrate an example sabot assembly of the present disclosure including a segmented bluff-body with a plurality of small segments with more clearly tailored chamfers for maintenance of free-flight trim angles of attack and sideslip;

FIGS. 22A-22M illustrate example sabot assemblies of the present disclosure including mechanisms for expulsion of the projectile from the sabots with and without imparting spin;

FIGS. 23A-23R illustrate example sabot assemblies of the present disclosure including additional features that move the aerodynamic centers aft of the centers of gravity to attain stable flight;

FIG. 32 is a flowchart in accordance with aspects of the present disclosure; and FIG. 33 is a flowchart in accordance with aspects of the present disclosure.

Figures 1A, 1B, 1C, 1D, 1E, 1F, 1G:
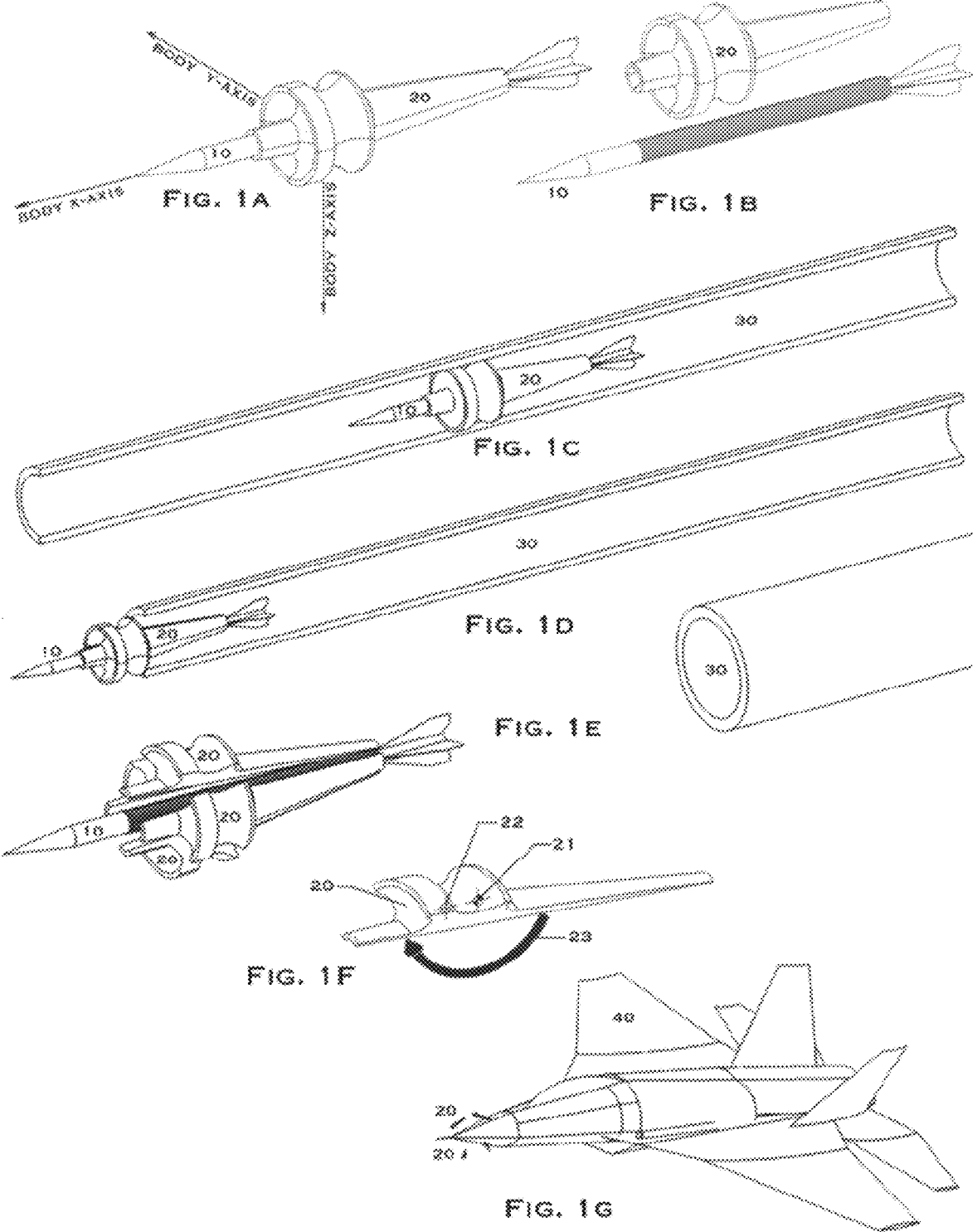
FIGS. 1A-1G illustrate a conventional sabot and behavior of the conventional sabot after firing from an aircraft.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The presently disclosed sabot describes a system that enables high fineness ratio aerial gunnery projectiles. Unlike traditional sabots and sabot systems, this aeromechanically stable sabot system releases a comparatively dense, high fineness ratio, high ballistic coefficient projectile, then after projectile separation, flies as a single piece or in multiple pieces in a stable fashion without tumbling. This stable flight profile allows the sabot to clear a launching aircraft and its engine inlets by following an engineered arc or ballistic path with small circular errors probable (CEP) relative to conventional rounds scaled for similar barrel diameters like the PGU-series ammunition including the PGU-13, PGU-14, PGU-15 and PGU-27, PGU-28, the M789 and other standard ammunition used for aerial gunnery ranging from 12.7 mm to 105 mm in caliber. Small mass offsets, asymmetries, details and/or excrescences are used to tailor the flight trajectory of the sabot to turn more or less severely and otherwise shape the flight path of the sabot with respect to muzzle velocity and launching aircraft flight state so as to clear the launching aircraft, and all other friendly aircraft in the formation.

The aeromechanically stable sabot achieves stable flight as the sabot center of gravity (c.g.) is placed further forward than the aerodynamic center (a.c.), both longitudinally and directionally, and the pitching moments that are dependent on neither angle of attack nor sideslip angle are principally nulled in steady state flight. This forward c.g. position with respect to the a.c. gives the sabot the inherent property of returning to a stable flight state after being disturbed in pitch and/or yaw. In terms of aeromechanics, it possesses a pitching moment coefficient about the center of gravity, $C_{mcg}$, gradient with respect to angle of attack, $\alpha$, $\partial \alpha C_{mcg}/\partial \alpha = C_{mcg\alpha}$ of less than zero and a yawing moment coefficient about the center of gravity, $C_{ncg}$, gradient with respect to sideslip, $\beta$, $\partial C_{ncg}/\partial \beta = C_{ncg\beta}$ greater than zero. In aeromechanics parlance, this directional stability property is often referred to as "Weathercock Stability" as the sabot and/or its pieces inherently "weathervane" into the wind. In addition to the property of having a c.g. ahead of the a.c., the presently disclosed sabot employs a system of coverings and seals which protect the internal components of the projectile during long-term storage, handling and loading, as well as slip rings or obturator bands to control the amount of spin imparted to the round by a rifled gun barrel. The sabot also uses load-bearing, hardened structural interfaces which allow for setback acceleration loads to be transferred to the projectile which can extend far behind the sabot: deep into the shell casing and propellant. A series of slots and/or geometric accommodations in the sabot are included to allow for smooth egress from the projectile following gun barrel exit, while also sealing gun gasses during the firing event and travel in the gun barrel.

The presently disclosed sabot represents a major deviation in the overall design philosophy of sabots. Since at least 1326, sabots have been necessarily designed to be aeromechanically unstable items which are discarded as quickly as possible after firing. The property of inherent aeromechanical instability has been known to be a defining characteristic of conventional sabots as aeromechanical instability enables rapid sabot separation from the projectile with reduced tip-off, nutation, and precession excitation, thereby reducing the circular-error-probable (CEP) downrange.

Referring to FIGS. 1A-1G, a conventional sabot configuration for a munition (e.g., ammunition) and behavior thereof is depicted. FIGS. 1A-1G illustrate behavior for a modern, fielded sabot configuration used by land and sea-based armed forces around the world. At the core of the design is a projectile 10 which is housed within a plurality of sabot segments 20. As is conventional in stability and control analysis methods employed in the United States, a right-hand axis system is typically called out as denoted by the X, Y, and Z-body axes shown clearly in FIG. 1A. FIG. 1B illustrates the projectile 10 and the sabot 20 (e.g., sabot system or sabot assembly) of the munition, often referred to as the two main components thereof. As illustrated in FIG. 1B, the sabot 20 includes 4 pieces or segments.

After an explosive is detonated (e.g., such an explosive in a cartridge surrounding the aft section of the projectile 10 or in a gun barrel 30), the projectile 10 and sabot 20 travel down the gun barrel 20 as seen in FIGS. 1C and 1D. After the projectile 10 and sabot 20 leave the gun barrel 30 as shown in 1E, the segments of the sabot 20 peel off the projectile 10, releasing the projectile 10. This allows the projectile 10 to fly downrange in a low drag configuration, thereby increasing the impact velocity and kinetic energy of the projectile 10 while reducing the time of flight and flattening the trajectory the projectile 10.

Following projectile 10 release, the individual sabot segments fly as aeromechanically unstable objects. This is caused by a center of gravity 21 being positioned behind the aerodynamic center 22. The tailored shape of the conventional sabot 20 also generates a large static pitching moment and/or yawing moment 23. The combination of aeromechanical instability and large moments induce the pieces of the sabot 20 to tumble rapidly and repeatedly around multiple axes. This tumble in turn intermittently presents a larger or maximum cross-sectional area of the pieces of the sabot 20 to the flow of air. Given that drag increases with cross-sectional area, especially in supersonic flight, the airspeed of the pieces of the sabot 20 is rapidly reduced. While this behavior is good and specially designed into rounds for land- and sea-based gunnery applications, an extremely dangerous dynamic occurs if these events unfold during aerial gunnery events. Indeed, FIG. 1G shows the inevitable ingestion of the pieces of the sabot 20 into launching aircraft 40 engine inlets or impact with an airframe of the launching aircraft 40. Because sabots are designed to transfer extremely high forces and pressures from the propellant gases to the projectile, they are typically made from hard, strong materials like steel and graphite-epoxy composites. If such pieces were to hit the windshield or radome of many aircraft or be ingested into engine inlets, material damage to the aircraft and/or engine would result. This dynamic illustrates why no currently fielded fixed-wing fighter or attack aircraft (including fixed- and rotary-wing vehicles) fires conventionally saboted rounds as shown in FIGS. 1A-1G.

Figures 2A, 2B, 2C, 2D, 2E, 2F:
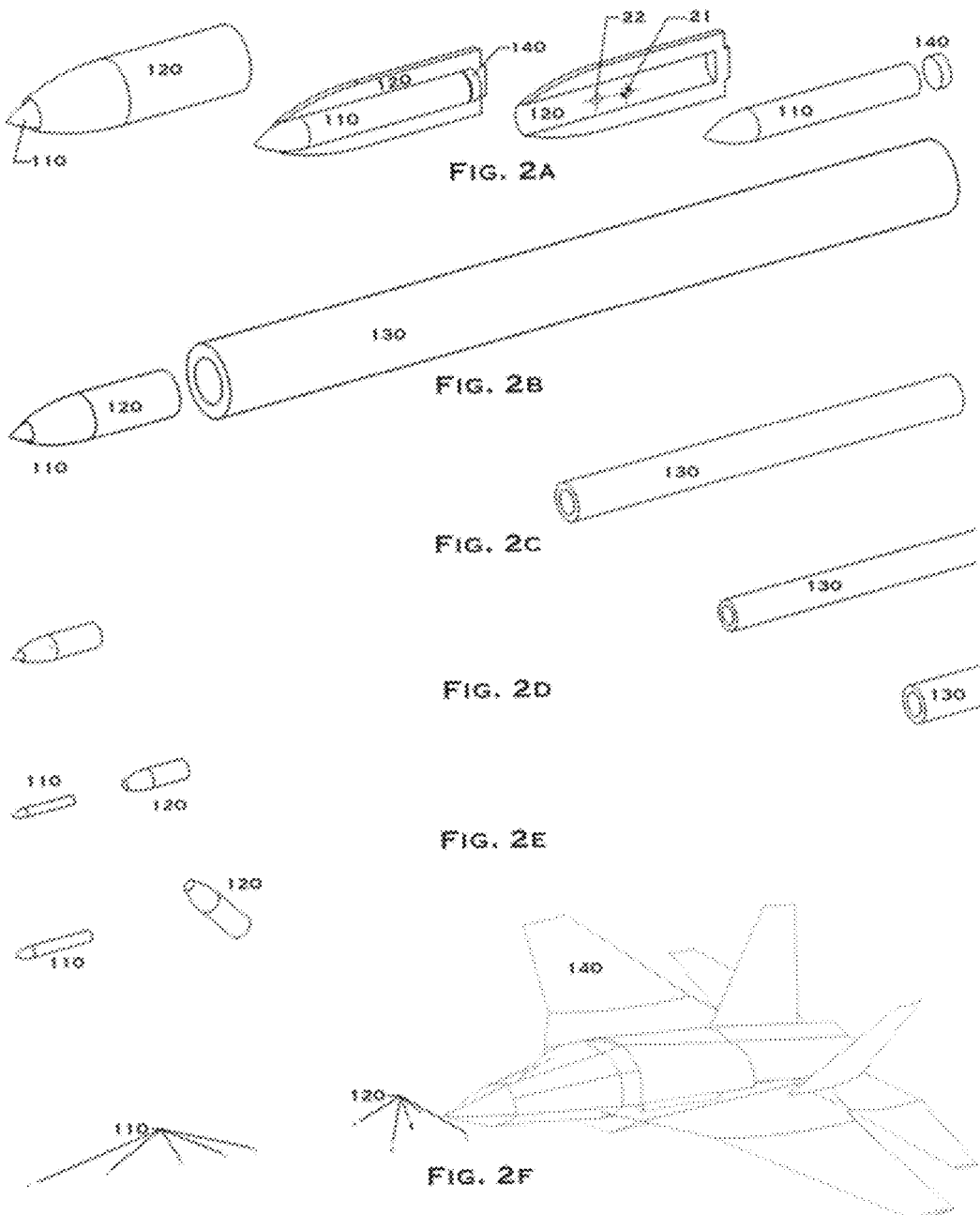
FIG. 2A-2F illustrate an aeromechanically unstable prior-art sabot and behavior of the sabot firing from an aircraft.

Incrementally different than a conventional sabot, the art taught in '816 is a monolithic sabot (rather than a segmented sabot) and therefore will be composed of one principal piece rather than multiple pieces. This art, depicted in FIGS. 2A-2F shows a projectile 110 (e.g., short penetrator projectile) which is contained within a sabot jacket 120 and expelled from the sabot jacket 120 after leaving a gun barrel 130 by an expulsion charge 140. FIG. 2A illustrates a series of diagrams showing the arrangement of the main components 110-140. FIG. 2B shows the combined projectile 110 and sabot jacket 120 as expelled from the gun barrel 130 (e.g., gun barrel or cannon gun barrel).

FIG. 2C shows the downrange flight of the combination prior to ignition of the expulsion charge 140. FIG. 2D shows the expulsion of the projectile 110 from the sabot jacket 120. The sabot pictured in FIGS. 2A-2E possesses an aerodynamic center 22 which is in front of the center of gravity 21, as shown in FIG. 2A, both subsonically and supersonically. This adverse configuration indicates that the sabot is aeromechanically unstable both longitudinally and directionally. Because the sabot is unstable, it will swap ends upon gun barrel exit as depicted in FIG. 2E and tend to tumble unpredictably. Because of the random tumble and associated plunge aerodynamics, such sabots tend to fly randomly in many different directions, creating a dangerous flight zone for the launching aircraft. As was the case of the pieces of the sabot 20 in FIGS. 1A-1G, the sabot in FIGS. 2A-2F has no configuration artifact to make $C_{mcg\alpha}<0$ and $C_{ncg\beta}>0$. Similarly, $C_{mq}$ and $C_{nr}$ are too low to resist a longitudinal or directional tumble. As a result, the sabot jacket 120 will tumble around the body y and/or z axes, intermittently presenting a larger or maximum cross-sectional area to incoming air. This larger/maximum cross-sectional area in turn causes extremely large spikes in total drag, leading to the same kind of adverse dynamics seen in FIGS. 1A-1G. If multiple rounds (110, 120) are fired as depicted in FIG. 2F, then the associated sabot jackets 120 will tumble and fly downstream with a high probability of engine ingestion and airframe impact. Although '816 bears a priority date more than 30 years ago, no fielded fixed-wing fighter or attack aircraft (including fixed- and rotary-wing vehicles) in the world is equipped with rounds like this, most likely because of the aforementioned aeromechanics and associated flight risks.

The most common penetrator round configuration is shown in FIGS. 3A-3C. Cannon shells, such as the PGU-14, fired by aircraft, such as the Fairchild A-10 Warthog, represent some of the most common types of penetrator rounds flown and fielded by the US armed forces. These rounds are configured as shown in FIGS. 3A-3C with an outer jacket, sabot jacket 220, made out of more lightweight materials like aluminum or polymers and an inner penetrator, projectile 210, made out of high-density materials like depleted uranium (DU) or tungsten. The exceptionally high specific gravity of DU (19.1 g/cc) increases its penetration depth. Conversely, the low density of aluminum (2.72 g/cc) makes it well suited to being used in a sabot.

Unfortunately, the adverse aeromechanics of conventional sabots depicted in FIGS. 1A-1G and 2A-2F preclude their use in aerial gunnery. Accordingly, rounds like the PGU-14 keep the projectile 210 (penetrator projectile) and the sabot jacket 220 over the entire flight until impact. Only after impact does the projectile 210 separate from the sabot jacket 220 as the projectile 210 makes its way into the target.

While this configuration has worked well for the PGU-14 and many other similarly configured rounds for aerial gunnery, the price paid is extremely high. The axial force coefficient, $C_A$, or drag coefficient, $C_D$, are direct functions of the base area of the entire round, i.e., projectile 210 and sabot jacket 220. Accordingly, if the projectile 210 shown in FIGS. 3A-3C were to fly on its own, given that its diameter (in the case of the PGU-14) is roughly ⅓ that of the main round caliber, it would have only ⅑th the drag of the entire PGU-14. Accordingly, it would fly much farther and faster with a lower time to reach the target and with a flatter trajectory than a conventionally configured round. Accordingly, the typical ammunition used today in front-line military aircraft have an order of magnitude drag more than they could have if there were some form of flight safe discarding sabot configuration. Unfortunately, none of the aforementioned conventional sabot technologies are compatible with fixed-wing aerial gunnery, given flight safety concerns.

The presently disclosed sabots or sabot systems overcome the aforementioned aeromechanical challenges. Referring to FIGS. 4A-4H, different examples of projectiles which are compatible with the presently disclosed sabot systems are depicted. FIG. 4A depicts a high ballistic coefficient, low circular cross-section penetrator 300A with a nose and main body 310A, stepped grapple—which allows the presently disclosed sabots to transfer launch forces to the projectile 320A—body-caliber fins or strakes 330A, and aft body or fuselage 340A. A high ballistic coefficient (BC) projectile, as used herein, will possess a BC greater than that of the classic Krupp projectile as described in Ingalls' Ballistic Tables, Ingalls, James M., "Ingalls' Ballistic Tables," Washington Government Printing Office, Washington, D.C., 1918. Such penetrators may be made of any suitably dense material, ranging from steel to brass to tungsten and depleted uranium (DU). Also, the penetrator 300A need not be made from a single material, but may be made from a plurality of materials. The projectile 320A is longitudinally and directionally aeromechanically stable, such that $C_{mcg\alpha}<0$ and $C_{ncg\beta}>0$.

FIG. 4B depicts a polygonal cross-section penetrator 300B with a nose and main body 310B, stepped grapple which allows the presently disclosed sabot to transfer launch forces to the projectile 320B, corner caliber fins or strakes 330B, and aft body or fuselage 340B. Such penetrators may be made of any suitably dense material, ranging from steel to brass to tungsten and DU. Also, the penetrator 300B need not be made from a single material, but may be made from a plurality of materials. The projectile is longitudinally and directionally aeromechanically stable, such that $C_{mcg\alpha}<0$ and $C_{ncg\beta}>0$.

FIG. 4C depicts a polygonal cross-section penetrator 300C with a nose and main body 310C, stepped grapple which allows the presently disclosed sabot to transfer launch forces to the projectile 320C, super-corner caliber fins or strakes 330C, and aft body or fuselage 340C. Such penetrators may be made of any suitably dense material, ranging from steel to brass to tungsten and DU. Also, the penetrator 300C need not be made from a single material, but may be made from a plurality of materials. The projectile is longitudinally and directionally aeromechanically stable, such that $C_{mcg\alpha}<0$ and $C_{ncg\beta}>0$.

FIG. 4D depicts a polygonal cross-section penetrator 300D with a nose and main body 310D, stepped grapple which allows the presently disclosed sabot to transfer launch forces to the projectile 320D, super-corner caliber fins 330D and aft body or fuselage 340D. Such penetrators may be made of any suitably dense material, ranging from steel to brass to tungsten and DU. Also, the penetrator 300D need not be made from a single material, but may be made from a plurality of materials. The projectile is longitudinally and directionally aeromechanically stable, such that $C_{mcg\alpha}<0$ and $C_{ncg\beta}>0$.

FIG. 4E depicts a polygonal cross-section cargo round 300E with a nose and main body 310E, stepped grapple which allows the presently disclosed sabot to transfer launch forces to the projectile 321E, and flared back end (322) which may or may not carry a cargo such as high explosive. The round may be constructed from a plurality of materials and may include a variety of fuses. The projectile is longitudinally and directionally aeromechanically stable, such that $C_{mcg\alpha}<0$ and $C_{ncg\beta}>0$.

FIG. 4F depicts a guided polygonal cross-section cargo round 300F with a nose and main body 310F. Protruding laterally from the sides of the round are at least one set of control surfaces 340F. The round may also have a cargo section 321F which has grapple features on the sides to allow the transfer of launch loads from the presently disclosed sabot to the projectile, as well as an empennage assembly 330F. The guidance and control section will command the flight control surfaces 340F to deflect in response to internal or externally directed guidance commands which may come from any electromagnetic wavelength. The projectile is longitudinally and directionally aeromechanically stable, such that $C_{mcg\alpha}<0$ and $C_{ncg\beta}>0$.

FIG. 4G depicts a guided circular cross-section cargo round 300G with a nose and main body 310G. Protruding laterally from the sides of the round are at least one set of control surfaces 340G. The round may also have body strakes, 330G as well as an empennage assembly 330G. The guidance and control section will command the flight control surfaces 340G to deflect in response to internal or externally directed guidance commands which may come from any electromagnetic wavelength. The projectile is longitudinally and directionally aeromechanically stable, such that $C_{mcg\alpha}<0$ and $C_{ncg\beta}>0$.

FIG. 4H depicts a guided polygonal cross-section cargo round 300H with a nose and main body 310H. Protruding laterally from the sides of the round are at least one set of control surfaces 340H. The round may also have an empennage assembly 330H at the end of a comparatively narrow aft fuselage. The guidance and control section will command the flight control surfaces 340H to deflect in response to internal or externally directed guidance commands which may come from any electromagnetic wavelength. The projectile is longitudinally and directionally aeromechanically stable, such that $C_{mcg\alpha}<0$ and $C_{ncg\beta}>0$.

The projectiles which are compatible with the presently disclosed sabots may have any of the aforementioned features. In some implementations, the projectiles include: i.) a mechanism and/or geometric feature to transfer loads from the presently disclosed sabot to the projectile; ii.) be configured such that the presently disclosed sabot can release from the projectile following gun barrel exit; and iii.) will be longitudinally and directionally aeromechanically stable, such that $C_{mcg\alpha}<0$ and $C_{ncg\beta}>0$.

Given the range of projectiles which may be used with the presently disclosed sabots, a basic assembly including those projectiles and the presently disclosed sabots is shown in FIGS. 5A-5F. Referring to FIG. 5A, shell 100 includes a number of components. A casing 102 of the shell 100 is full of propelling charge as illustrated in view 101, and view 101 shows that the projectile 430 sits deep within the propellant, almost all the way to the aft end of the shell casing, far past the aft end of the presently disclosed sabot 401. The projectile assembly 400 is joined to the shell casing with at least one groove, crimp, swage, bond, or interference fit. After firing, the projectile assembly 400 is expelled from the filled casing 101 as the propellant charge within the casing is converted to high temperature, high pressure gas within the firing chamber and gun barrel. The empty casing 102 is then discarded. The presently disclosed sabot 401 then separates from the projectile 430.

FIGS. 5A-5F show one of many kinds of projectiles that may be launched by the presently disclosed sabot. As an example, a circular cross-section projectile 430A that happens to have projectile-caliber aft-body strakes, is launched by the presently disclosed sabot 401. FIG. 5A shows a comparatively lightweight main body of the presently disclosed sabot, 410A/B, comparatively heavy counterweight and load transfer assembly of the presently disclosed sabot 415A/B, and segmented nose seals 420A/B. These components 410A/B, 415A/B, 420A/B, 430A/B all form the projectile assembly 400A which includes the presently disclosed sabot and a projectile. It should also be clear that the presently disclosed sabot 401 contains at least two components of dissimilar materials that are intimately bonded together as shown in the cut-away 410C, 415C. Materials of higher density will be placed forward while lower density materials will be present in the back to shift the presently disclosed sabot center of gravity forward.

The individual sections of the nose seals of the projectile assembly are shown as components (410C1, 420C2, 420C3, 420C4). The nose seal components are made from materials which facilitate storage and handling of the entire assembly, protecting the munition from damage caused by moisture, corrosion and other accidental damage. However, the nose seal components (420C1, 420C2, 420C3, 420C4) are made of a material which is compliant and frangible enough that it can be ingested into aircraft engine inlets without inducing damage. The nose seal components are also compliant and frangible enough that they will not induce damage on airframe components should they strike an airframe.

As the projectile assembly (400B) goes down the launching gun barrel (440B) as shown in FIG. 5B, the assembly accelerates but stays together as a single unit till gun barrel exit. As shown in FIG. 5D, upon gun barrel exit, the projectile assembly changes configuration. The presently disclosed sabot (401) begins to slide backwards, longitudinally along the length of the projectile, 430. This releases the nose seal components, 420, which are then free to fly away from both the projectile and the presently disclosed sabot.

FIG. 5E shows these nose seal components, (420E1, 420E2, 420E3, 420E4) flying away from both the projectile and the presently disclosed sabot (401) in a tumbling motion. Because the nose seal components are neither aeromechanically stable nor exhibit near zero inherent pitching and yawing moment coefficients, they will inherently tumble. By doing so, they will lose airspeed and energy and they will not follow the trajectory of the projectile or the presently disclosed sabot. FIG. 5E shows the presently disclosed sabot (401) in free flight. The free flight sabot (401) is composed of a comparatively heavy nose section, light tail section, and load transfer assembly (415E) coupled to a light aft body, (410E). Because of the prescribed component form factors and mass distribution, the center of gravity (21) is positioned forward of the aerodynamic center (22). This positioning of the center of gravity relative to the aerodynamic center ensures that $C_{mcg\alpha}<0$ and $C_{ncg\beta}>0$. Accordingly, both inherent longitudinal and directional static stability is assured. The mass distribution and length of the presently disclosed sabot (401) are also tailored such that stability in both axes with respect to Mach Tuck and short period modes are maintained. By doing so, precession and nutation modes will be inherently suppressed, as illustrated by the following equations, set of Equations 10:

$$S \cdot M_{long} = \overline{X}_{aclong} - \overline{X}_{cg} > \left| \frac{C_{mcgu}}{C_{Lu} + 2C_{L1}} \right|$$

$$S \cdot M_{dir} = \overline{X}_{acdir} - \overline{X}_{cg} > \left| \frac{C_{ncgu}}{C_{Yu} + 2C_{Y1}} \right|$$

$$S \cdot M_{long} = \overline{X}_{aclong} - \overline{X}_{cg} > \left| \frac{C_{mq} \rho S \overline{D} g}{4W} \right|$$

$$S \cdot M_{dir} = \overline{X}_{acdir} - \overline{X}_{cg} > \left| \frac{c_{nr} \rho S \overline{D} g}{4W} \right|.$$

Because the presently disclosed sabot (401) is designed to execute a maneuver after gun barrel exit and projectile release, slight asymmetries in mass and/or body geometry are employed. These asymmetries may include a mass distribution which is not collocated with the body x-axis or longitudinal centerline, chamfers, bevels, ridges, divots or any other geometric imperfection, flap, surface, or deviation from the inner or outer mold lines. These geometric features may also include a non-axial bend in the geometry of the forward or aft end of the central body hole through which the projectile slides. No matter how these asymmetries are achieved, they will induce a pitching and/or yawing moment about the center of gravity of the presently disclosed sabot (23). This moment helps enable the functionality of the presently disclosed sabot (401) as it will be prescribed to induce a trimmed body of attack and/or sideslip angle that generates more g's of acceleration normal to the flight path than may be achieved by the launching aircraft during its hardest maneuver. It should also be noted that this asymmetry will not be great enough to induce a tumbling motion of the presently disclosed sabot (401), instead only generating a trimmed angle of attack sufficient to generate the aforementioned acceleration.

The result of this acceleration normal to the flight path of the presently disclosed sabot is seen in FIG. 5F. The launching aircraft (in this case a fixed-wing aircraft is shown, 500AFW) launches the projectile assembly (400) from the aircraft gun barrel (440). Extending forward the projectile (430) separates from the presently disclosed sabot (410, 415). The projectile then travels principally straight, along the projectile flight path (510FW) at high speed towards the intended target. The launching fixed-wing aircraft then maneuvers (500AFW to 500BFW) along its flight path (520FW). Because it is imperative that the presently disclosed sabot (401) clear the launching aircraft in all maneuver states, it is designed to execute a clearance maneuver of more g's of normal force than may be achieved by the launching aircraft. Uninhabited aircraft may have higher limits than piloted aircraft, which may have a limit of greater than 10 g's of normal acceleration for inhabited fixed-wing aircraft. However, uninhabited aircraft may have limits of up to 50 g's of normal acceleration when launching the projectile. This clearance maneuver will at least generate an arc (530FW) which clears the tightest maneuver the launching aircraft can achieve. The tightest clearance maneuver the sabot can achieve is shown along flight path 540FW, clearing all aircraft parts in all flight states.

The projectile launch from a fixed-wing aircraft and accompanying sabot clearance maneuver explained in FIG. 5F is mostly mirrored when one considers rotary-wing and other classes of aircraft when attacking ground or sea targets or aerial targets at low altitude. Sabot acceleration normal to the flight path of the presently disclosed sabot is seen in FIG. 5G. The launching aircraft (in this case a rotary-wing aircraft is shown, 500ARW) launches the projectile assembly (400) from the aircraft gun barrel (440). Extending forward the projectile (430) separates from the presently disclosed sabot (410, 415). The projectile then travels principally straight, along the projectile flight path (510RW) at high speed towards the intended target. The launching fixed-wing aircraft then maneuvers (500ARW to 500BRW) along its flight path (520RW). Because it is imperative that the presently disclosed sabot (401) clear the launching aircraft in all maneuver states, the sabot is designed to execute a steady diving maneuver into the ground. This diving clearance maneuver will at least generate an arc (530RW) which represents the straightest trajectory the sabot will make which will clear all launching aircraft (500A-BRW) components in all flight conditions as the sabot heads towards the ground, eventually impacting. Similarly, this diving clearance maneuver will generate no more of an arc (540RW) which represents the steepest trajectory the sabot will make which will clear all launching aircraft (500A-BRW) components in all flight conditions as the sabot heads towards the ground, eventually impacting.

Similarly, it is conceivable that a highly maneuverable variant of the presently disclosed sabot (401) will be able to achieve high turning rates. In some implementations, a tightest turn of the presently disclosed sabot (401) will be designed around (e.g., no tighter than) the minimum turn radius flight path (540). This minimum turn radius flight path 540 will clear the maximum extent of the aircraft and all of the aircraft in the attacking formation by no less than one entire wing span in all dimensions. Between the minimum and maximum turn radius flight paths of the presently disclosed sabot (530, 540), there exists a zone of possible flight paths in which the presently disclosed sabot (401) may fly. By matching the aeromechanics of the presently disclosed sabot (401), the launching aircraft, and associated formation of friendly aircraft, a range of flight paths (530, 540) can be designed. These flight paths (530, 540) can be laid out such that the probability of sabot ingestion by launching aircraft, friendly aircraft, or both satisfies one or more FAA standards. Examples of such probabilities are less than $10^{-6}$, $10^{-9}$, $10^{-11}$, etc. Accordingly, flight operations with the presently disclosed sabots, such as sabot 401 can be rendered as flight safe per aviation safety regulations (commercial and/or military).

FIGS. 6A-6F shows a bluff-body variant of the presently disclosed sabot. As shown in FIG. 5, the assembly shown in FIGS. 6A-6F depicts a projectile assembly (400) which is fired from a separated shell casing (101/102) as shown in FIG. 5. FIG. 6A depicts a monolithic configuration of the presently disclosed sabot (401) with a bluff forward section. The lightweight main body (410) is firmly affixed and otherwise bonded to the load transfer assembly (415) which also includes a nose counterweight section. The main body (410) may have any number of features which allow it to be connected to the forward part of the shell casing (101/102) including: ridges, bumps, grooves, straps, fibers, screws, rivets, fasteners and/or grapples of any given geometry. A swage fit may also be employed so as to keep the main body (410) of the presently disclosed sabot (401) attached to the shell casing (101/102) prior to the firing event. The main body (410) may also be fitted with any number of bands, sheaths, coverings, and/or shields which allow the projectile assembly (400) and presently disclosed sabot (401) to be hermetically sealed against the elements and/or allow for better gun gas sealing during the firing event and/or lubricate the projectile assembly as it travels down the gun barrel during firing.

The load transfer assembly (415) is made from a high strength material which is capable of transferring loads imparted by the projectile on the presently disclosed sabot (401) due to setback accelerations during launch. The net result of the use of a nose weight in the load transfer assembly (415) and comparatively low-density body (410) is that the center of gravity (21) is displaced forward of the aerodynamic center (22) of the presently disclosed sabot (401). A favorable characteristic of the bluff-body configuration of the presently disclosed sabot is that the aerodynamic center is shifted aftwards during both subsonic and supersonic flight regimes. This tends to reduce the amount of nose weight required to make $C_{mcg\alpha}<0$ and $C_{ncg\beta}>0$ and the static margins sufficiently great enough to suppress Mach Tuck, short period, nutation, and precession as previously described.

FIG. 6B shows the halved presently disclosed sabot (401) in its bluff body configuration. The load transfer assembly (415) features a stepped load transfer grapple (416) on the aft body. This grapple is fabricated from high strength materials and transfers loads from the presently disclosed sabot to the projectile (430) during setback. However, following gun barrel exit, it allows the presently disclosed sabot (401) to slide aftward along the x-body axis of the projectile (430) until it is sufficiently separated from the projectile and experiencing free flight. The load transfer grapple (416) may have a mirroring surface which is co-cured or bonded to the main body (410) to enhance load transfer within the presently disclosed sabot (401). The load transfer grapple is also geometrically matched to the projectile load-transfer neck (431).

FIG. 6C shows the entire projectile assembly (400) in the bluff-body configuration with a number of protective nose seals (420) in place. These seals protect the nose of the projectile assembly (400) during handling up through the firing event and lie within the main body of the presently disclosed sabot (401). Moments after the firing event, just after gun barrel-exit, the projectile assembly (400) changes configuration as the presently disclosed sabot (401) slides aftwards along the length of the projectile, as shown in FIG. 6D Immediately following the aftward motion of the disclosed sabot, the protective nose seals (420) are exposed as they remain adjacent to the nose surfaces.

As the nose seals (420) are exposed to airflow, they separate from the projectile forebody and tumble downstream as shown in FIG. 6E. These nose seals are made from frangible highly compliant material that can harmlessly be ingested into jet engines and will pose no threat to the launching airframe. FIG. 6E shows the aftward separation of the load transfer grapple (416) which is on the inside of the presently disclosed sabot (401) and the projectile load-transfer neck (431). The presently disclosed sabot (401) is also shown sliding completely off the aft of the projectile (430) in FIG. 6E. Following the aftward separation of the presently disclosed sabot (401), the projectile (430) then flies towards its target while the presently disclosed sabot flies between maximum and minimum turn radii flight paths (530, 540) as shown in FIG. 5F.

FIGS. 7A-7F show a segmented variant of the bluff-body configuration of the presently disclosed sabot (401). FIG. 7A shows a bluff-body combination of the lightweight, low-density aft body (410) and the higher-density nose counterweight and load transfer assembly (415) making up this variant of the presently disclosed sabot (401). Because the segmented variant of the presently disclosed sabot (401) separates from the projectile (430) by flying away from the projectile laterally, there is no aftwards sliding motion as shown in FIGS. 6A-6F. Accordingly, the grapple configuration between the presently disclosed sabot (401) and the projectile (430) differs from the grapple-to-load transfer neck shown in FIG. 6 (416, 431). FIG. 7A shows a plurality of segments of the presently disclosed sabot (401) together in the firing configuration including: the low-density body (410), load transfer assembly (415), and a special bevel placed on the inside of both of the aforementioned components (417).

FIG. 7B shows that the segmented variant of the presently disclosed sabot (401) may be divided into two or more segments. Each of these individual segments possesses aeromechanical stability both collectively and separately as exemplified by the relative positions of the forward-displaced center of gravity (21) and the aft-displaced aerodynamic center (22) of the presently disclosed sabot (401). The inner surface of this segmented bluff-body variant of the presently disclosed sabot (401) is composed of a plurality of ridges. These ridges transfer loads from the presently disclosed sabot (401) to the projectile (430) by mating with their counterparts on the projectile.

FIG. 7C shows an individual segment configuration of the presently disclosed sabot (401). The lightweight main body (410) is attached to the comparatively heavy load transfer assembly and nose weight (415). Because of the density difference between the two components, (410, 415) the center of gravity of the presently disclosed sabot, (21) is shifted forward with respect to the aerodynamic center (22). The forward shift in c.g. with respect to a.c. is such that the presently disclosed sabot (401) will not tumble and will maintain stable flight following separation from the sides of the projectile (430). The nose chamfer (417) is designed to induce a finite angle of attack such that normal forces perpendicular to the flight path will induce the range of flight paths as described for features 530 and 540 of FIG. 5.

FIG. 7D shows the assembled segmented configuration of the projectile assembly (400) prior to and during the firing event. This includes the presently disclosed sabot (401) with its constituent components (410, 415) and projectile. In this configuration, the inner faces of the load transfer ridges on the presently disclosed sabot (401) make contact with the outer faces of the load transfer ridges of the projectile (430).

FIG. 7E shows the separation of the presently disclosed sabot (401) from the body of the projectile just after gun barrel exit. This includes the separation of the matched sets of load transfer ridges, similar to the matched sets of load transfer ridges (418, 432) of FIGS. 16B—16F. As previously described, the presently disclosed sabot (401) does not tumble, but rather flies away from the projectile (430) after gun barrel exit, achieving a stable trimmed angle of attack and/or sideslip angle. FIG. 7F shows the flight of the individual segments of the present disclosure (401) as they pitch and yaw away from the projectile, ultimately following flight paths as described by maximum and minimum turn radii (530, 540) of FIG. 5.

Figures 8A, 8B, 8C, 8D, 8E:
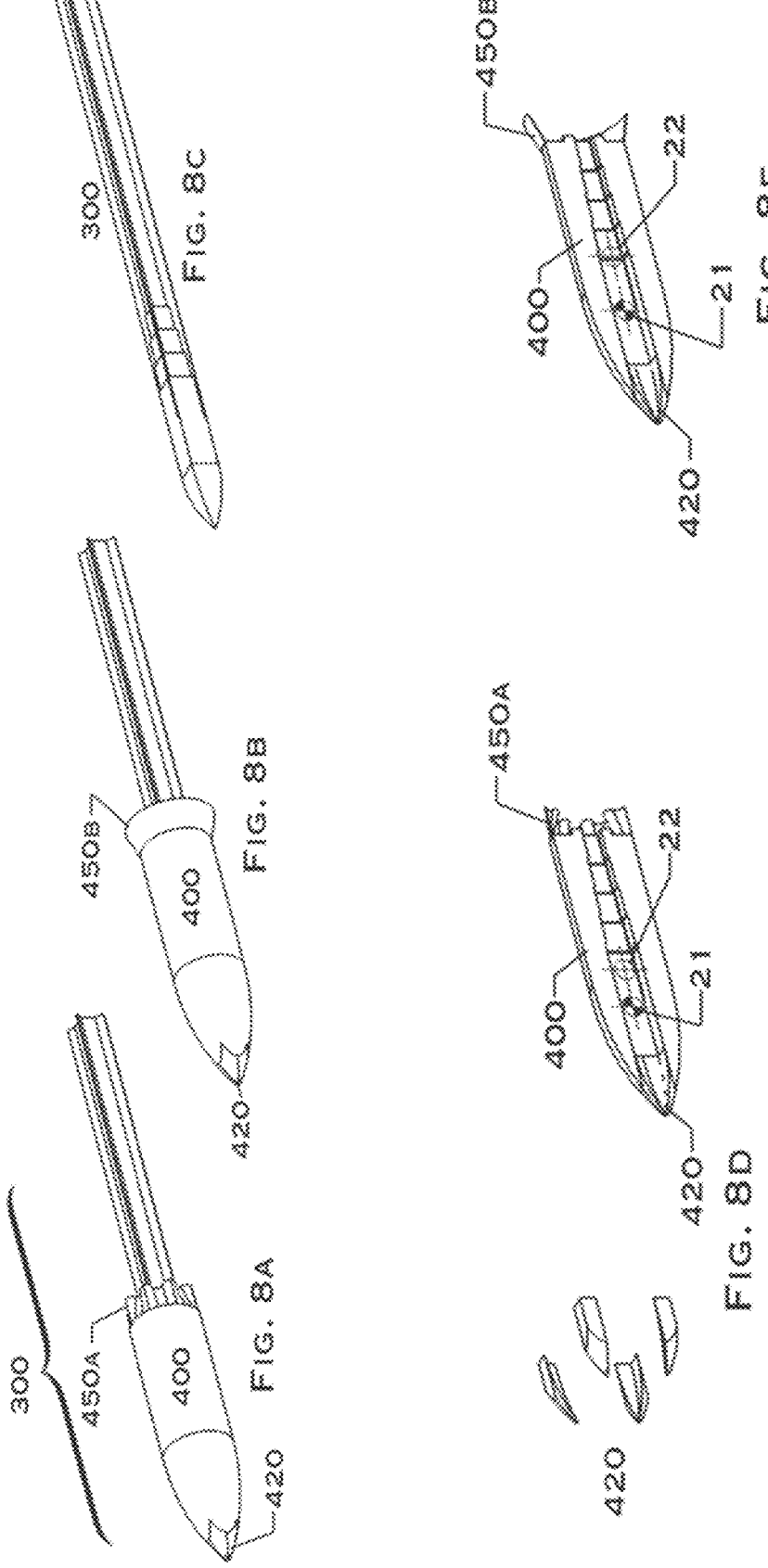
FIGS. 8A-8E illustrate an example sabot of the present disclosure including a monolithic low drag body and an expanding drag skirt.

FIGS. 8A-8E show a skirted configuration of the presently disclosed sabot (401). FIG. 8A shows the projectile assembly (430) containing the disclosed sabot (401), protective nose seals (420), and a folded aft skirt (450A). As the presently disclosed sabot (401) is located within the cartridge (101) for storage and during the launching event, the aft skirt of this incarnation of the presently disclosed sabot (401) will stay folded as shown in FIG. 8A. After gun barrel exit, the skirt on the aft end of the presently disclosed sabot (401) will unfold, forming a conical flare (450B). This conically flared skirt may be asymmetric so as to execute prescribed maneuvers as described by flight paths 530 and 540 in FIG. 5F.

FIGS. 8A-8E also show a monolithic configuration of the presently disclosed sabot (401) that is designed to accommodate a projectile with a regular polygon cross-section and aft strakes that span the corner caliber of the polygonal cross-section. FIG. 8C shows the load transfer neck (431) of the projectile (300). FIG. 8D shows the multiple low compliance protective nose seals (420) both installed and egressed following projectile expulsion from the gun barrel. The load transfer grapple within the monolithic variant of the presently disclosed sabot (401) and folded stabilizing skirt is shown (450A). Because the presently disclosed sabot employs a variety of different density materials which are intended to properly stabilize the device, the center of gravity (21) is positioned ahead of the longitudinal and directional aerodynamic center (22). Following skirt deployment (450B), the aerodynamic center (22) of the presently disclosed sabot (401) will, necessarily, shift further aftward as shown in FIG. 8E.

FIGS. 9A-9E show a skirtless configuration of the presently disclosed sabot (401) which is designed to accelerate a regular polygonal projectile (300) with corner-caliber aft body strakes. As was the case with the sabot configuration shown in FIGS. 8A-8E, the disclosure shown in FIGS. 9A-9E is aeromechanically stable with a center of gravity (21) ahead of the longitudinal and directional aerodynamic center (22). Unlike the configuration disclosed in FIGS. 8A-8E, however, the configuration of the present sabot takes advantage of the forward mass placement within the sabot to achieve proper amounts of longitudinal and directional stability.

FIGS. 10A-10F disclose a projectile similar to the projectile as shown in FIGS. 9A-9E, but with a spanwise growth in aft-body strakes (330). These larger aft-body strakes 330 are accommodated in a series of slots (455), which enable the maintenance of clocking and clearance as the presently disclosed sabot (401) slides aftward along the projectile (300) following the launch event and gun barrel exit. During the launch event, the presence of the strakes (330) in the slots (455) form a seal against gun gasses. If an empennage assembly of the projectile possesses a span which is larger than the aft-body strakes, then flapper-valve seals (456) may be used on the back of the sabot as shown in FIG. 10F.

FIGS. 11A-11E show several incarnations of the presently disclosed sabot (401) that are designed to accommodate fin sets that extend to the full gun bore (300). These bore riding fins preclude completely monolithic designs for the presently disclosed sabot (401). Rather, for the presently disclosed sabot to clear the fins following gun barrel exit, the sabot itself must either expand to open up slots through which the fins can pass or separate off the sides of the projectile (300). To hold the segments of the presently disclosed sabot (401) together, segment clips (560) may be used if the sabot is to stay in a monolithic configuration. These clips fold down and together during storage, chambering and firing (560A). After gun barrel exit, the clips expand (560B) to push the individual segments away from each other. As shown in FIGS. 9A-9E, FIGS. 10A-10F, and previous illustrations, the launch loads are transferred between the grapple-to-load transfer neck shown in (416, 431). As the monolithic, full-bore fin accommodating variant of the presently disclosed sabot (401) shown in FIGS. 11A and 11B, the sabot stays together even after sliding down the length of the projectile, flying freely. As is the case with all incarnations of this presently disclosed sabot (401), the center of gravity (21) is designed to be forward of the longitudinal and directional aerodynamic center (22).

Figures 11A, 11B, 11C, 11D, 11E:
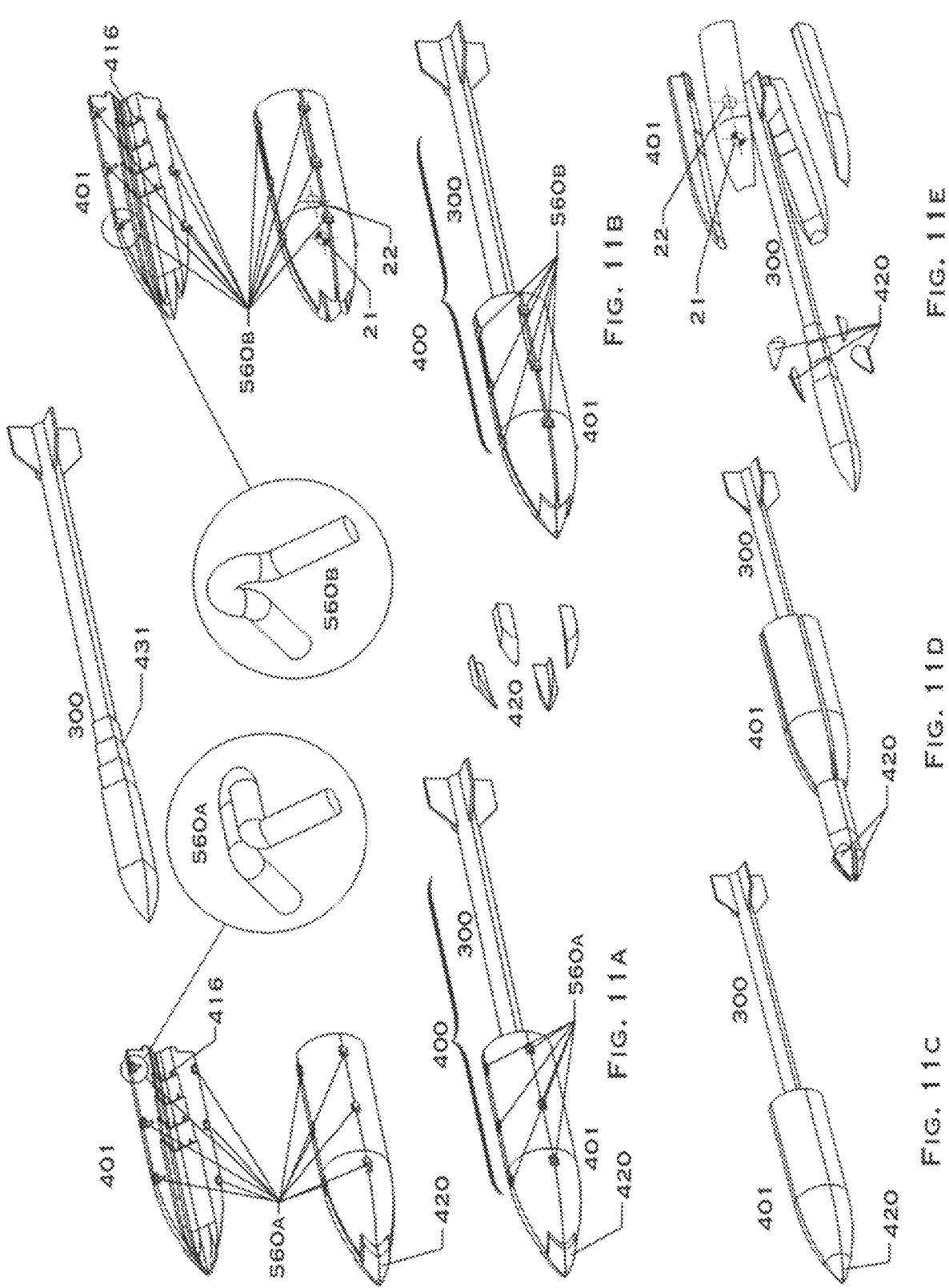
FIGS. 11A-11E illustrate an example sabot of the present disclosure including a segmented low-drag body and the sabot releasing a regular polygon cross-section projectile.

FIG. 11C shows the presently disclosed sabot (401) on a projectile with full-bore fins (300), but in a multi-segmented configuration. The presently disclosed sabot in this segmented configuration (401) may be held together by any number of pins, bands or straps such that upon gun barrel exit, after exiting the muzzle blast, the retaining mechanism releases the segments of the sabot. These bands may be made of Teflon, PTFE, or other polymer systems which may form an obturating band. FIG. 11D depicts the same assembly immediately following launch and gun barrel exit. Clearly, the individual pieces of the presently disclosed sabot (401) are moving aftwards down the length of the projectile (300). FIG. 11E shows the pieces of the presently disclosed sabot (401) clearing the fin set after release along with the protective nose seals (420). As is the case with all other incarnations of the presently disclosed sabot, the center of gravity (21) is positioned ahead of the longitudinal and directional aerodynamic center (22). Also included are geometric features which allow the sabot pieces to achieve trim angles without tumbling and execute high-g maneuvers that are normal to the sabot flight path as described for the sabots depicted in FIG. 5F.

Figures 12A, 12B, 12C, 12D, 12E:
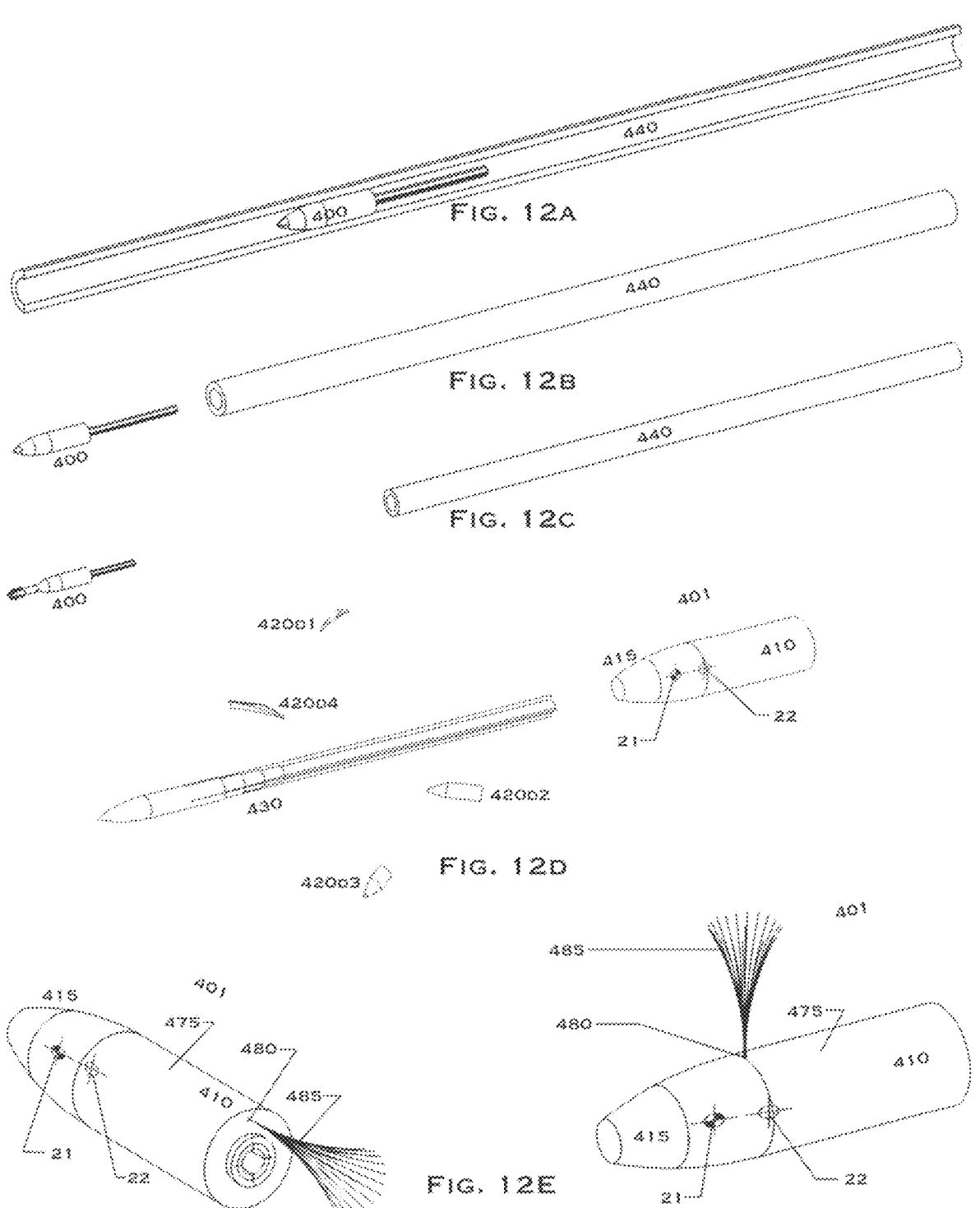
FIGS. 12A-12E illustrate an example sabot of the present disclosure including a monolithic low-drag body and a rocket motor and the sabot releasing a round cross-section projectile with fins.

FIGS. 12A-12E show a rocket assisted variant of the presently disclosed sabot (401). As the projectile assembly (400) travels down the gun barrel as seen in FIG. 12A and then is ejected in FIGS. 12B and 12C, the configuration of the projectile is very similar to the configuration presented in FIG. 5. As is the case in the variant of the presently disclosed sabot shown in FIG. 5, the center of gravity (21) is designed to be ahead of the longitudinal and directional aerodynamic center (22) as shown in FIG. 12D. However, in this variant, the central body of the presently disclosed sabot (410) is filled with rocket fuel (475) which has been triggered at a predetermined time and/or distance from the gun barrel exit by any means including electronic triggering and/or pyrotechnic fuse mechanisms. Rocket motor orifices or nozzles (480) may be placed on the side of the sabot, front or back of the sabot. The purpose of these nozzles and associated rocket motor ejecta (485) are to enhance the maneuvering capability of the presently disclosed sabot so as to execute a range of maneuvers as shown in FIG. 5F.

Figures 13A, 13B, 13C, 13D, 13E:
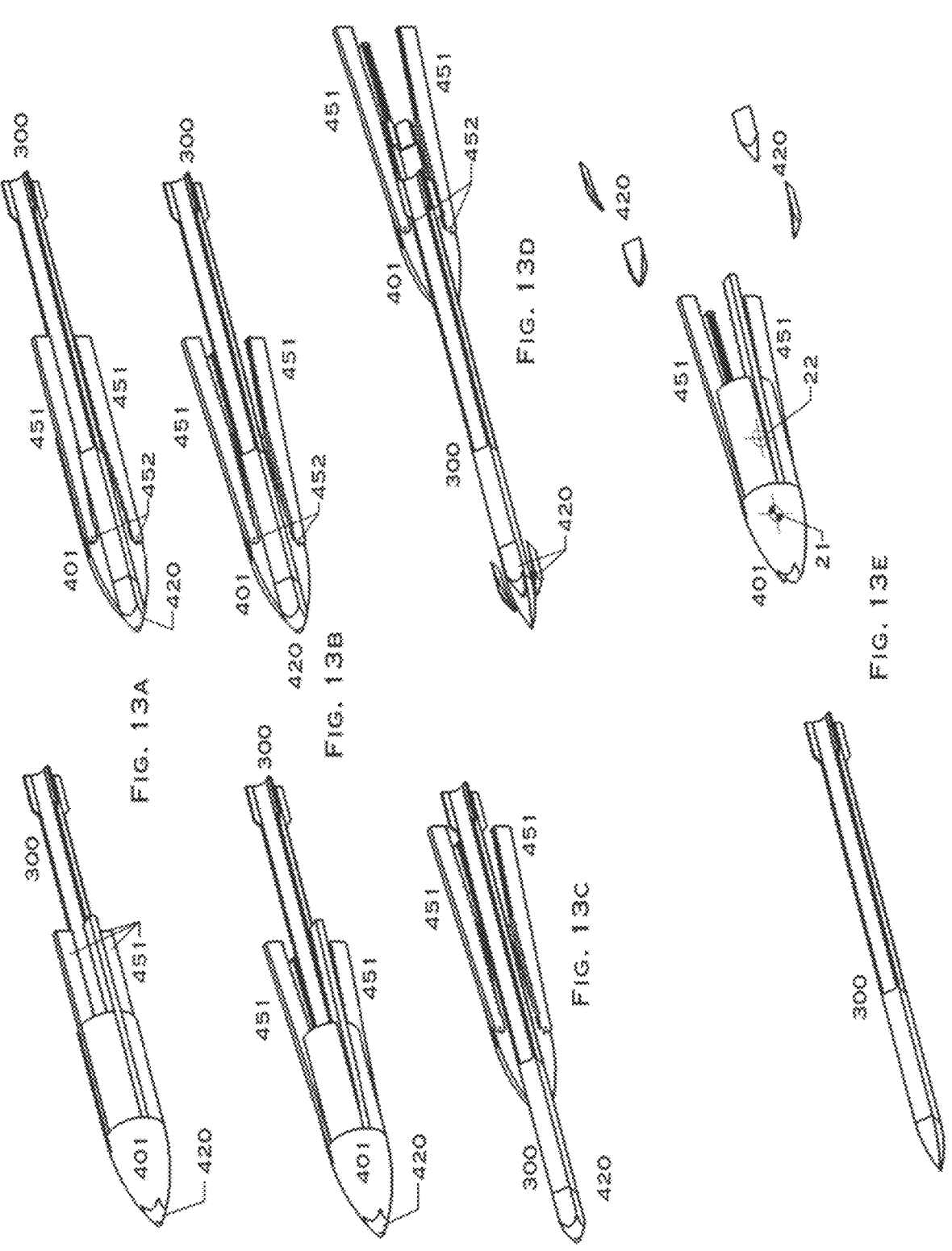
FIGS. 13A-13E illustrate an example sabot of the present disclosure including a monolithic body and articulated fins and the sabot releasing a regular polygon cross-section projectile with fins.

FIGS. 13A-13E show an articulated, finned variant of the presently disclosed sabot. FIG. 13A shows the sabot assembly with fins (451) that are pivoted around either discrete or solid-state hinge mechanisms (452) and sprung outwards. During storage, chambering, and the firing event, the teeth on the inner faces of the fins lock into the interior grooves of the sabot aft body and transfer loads to the projectile body with matched grooves. The configuration of sabot is compatible with projectiles equipped with fin sets that do not extend to the full bore (300). FIG. 13B shows the sabot just after gun barrel exit with sprung fins extending outwards. Just after gun barrel exit, the sprung fins are flung outwards, unlocking the projectile and sabot, allowing the sabot to travel aftwards along the length of the penetrator (300) as shown in FIG. 13C. The penetrator fins move forward underneath the sabot fins (451), then through a slot that formerly accommodated the fins themselves. Eventually the presently disclosed sabot (401) and nose seals (420) completely slide off the back of the projectile. Because the presence of fins dramatically shifts the aerodynamic center of the presently disclosed sabot aftwards (422), the distance from the forward displaced center of gravity (421) is increased, lending a very high level of longitudinal and directional stability.

FIGS. 14A-14H show guided variants of the presently disclosed sabot (401). FIG. 14A shows an aeromechanically stable sabot as described earlier with a center of gravity (21) positioned ahead of the longitudinal and directional aerodynamic center (22). Ringing the sabot is a series of sensors (490). These sensors are sensitive to differences between earth and sky and may respond to differences in a variety of electromagnetic spectra including visual, infrared, and ultraviolet bands. These sensors (490) act to determine the orientation of the sabot about the body x-axis relative to the earth and sky. A flight controller within the round then determines how and when to fire rocket motors as shown in FIGS. 14A, 14B and 14C to execute a prescribed maneuver.

FIG. 14D shows a variant of the presently disclosed sabot (401) with a set of controllable canards (452) in addition to the sensors (490). This variant is designed so that the canards are deployed after gun barrel exit, then pitched so as to control the sabot in both pitch and roll. FIG. 14E shows a variant of the presently disclosed sabot (401) with canards as previously described, but also fins with permanent cants set in the ends of at least two orthogonal fins (453). FIG. 14F shows a canard-controlled sabot, but with a series of tabs (450) that are set to enhance maneuvers. FIG. 14G shows a canard-equipped sabot as previously described, but with one fin that is significantly more deployed than the others. This asymmetric deflection allows the canards to be used principally for roll, while the steady state maneuver is accomplished by tabs or excessive tail fin deflections. The purpose of lending guidance to the presently disclosed sabot is to provide an increased amount of flight safety to the launching aircraft and friendly cooperative aircraft, as compared to conventional sabots. To accomplish this, FIG. 14H shows the launching aircraft (500) firing a projectile along a mostly straight trajectory aligned principally with the body x-axis of the launching aircraft (510). As the launching aircraft maneuvers along another flight path (520), increasing the distance between the launching aircraft and friendly aircraft helps maintain flight safety; accordingly, the trajectory (530) of the guided variant of the presently disclosed sabot (401) may be tailored to the launching aircraft maneuvers. In the example of FIG. 14H, the trajectory of the sabot is designed around a high-g turn straight towards the earth. This means that the sabot will fly downwards as quickly as possible and impact the earth rather than staying airborne and posing potential risk to friendly airborne forces. Such a maneuvering sabot could be in communication with the launching aircraft and/or other friendly aircraft so as to actively maneuver out of the way of the launching aircraft or other friendly forces when commanded.

FIGS. 15A-15E show a reversed variant of the presently disclosed sabot (401). Although the components of this variant of the presently disclosed sabot are essentially the same as shown in FIGS. 13A-13E, the disposition of the sabot is such that the fin set is facing forward and the comparatively heavy nose is facing towards the aft of the projectile as shown in FIGS. 15A and 15B. The utility of this configuration is to allow the projectile assembly to not only exit the muzzle, but survive the muzzle blast and not initiate a high tip-off angle in clearing the blast while not incurring additional weight penalties in the aftmost portion of the sabot to survive these launch loads when in the free flight configuration. This configuration may therefore, afford a lower total weight solution by allowing for the reduction in mass in the forward section of the projectile when stowed or before the launch event. FIG. 15C shows the presently disclosed sabot (401) sliding aftwards towards the tail of the projectile after the fins (451) unlock against the sides of the projectile. The projectile (300) then clears the fins of the presently disclosed sabot (401) with the two noses oriented in opposite directions. FIG. 15E shows that following separation, the extremely high degree of longitudinal and directional stability will dynamically rotate the sabot from the positions shown in various states of rotation through 180 deg. (401C, 401D, 401E), ending up with a flight attitude depicted by stable nose-into-the-wind flight (401F). While a 180-deg. rotation about the body y and/or z-axis is indeed extreme, the static margins of the sabot both directionally and longitudinally is high enough that tumbling will not take place and maneuvers as depicted in FIG. 5F or 14H may then be executed.

FIGS. 16A-16H show a bluff-body configuration of aeromechanically stable sabot which possesses dynamics that are similar to the sabot depicted in FIGS. 15A-15E. FIG. 15A shows the present disclosure in a segmented bluff-body sabot configuration (401). The sabot is constructed with a lightweight body (410), capped with a heavy nose weight (415). The center of gravity (21) is accordingly shifted closer to the nose weight (415). This shifts the center of gravity (21) away from the aerodynamic center (22). A geometric chamfer (417) aids sabot separation from the projectile. FIG. 16B) shows a sectioned sabot exposing the internal grappling grooves (418), lightweight body (410), chamfers on either end (417) and the nose weight (415). FIG. 16C shows the present disclosure (401) segment. FIG. 16D shows the projectile assembly (400) with the present disclosure (401) composed of a lightweight body (410) and comparatively heavy end (415) attached to the projectile (430). This configuration of the present disclosure (401) shows the sabot aerodynamic center (22) as being ahead of the center of gravity (21).

FIG. 16E shows the initial separation of the projectile assembly (400) just after gun barrel exit including the present disclosure (401) peeling away from the projectile (430). The internal grappling grooves inside of the present disclosure (418) are shown breaking away from load transfer grooves (432) on the sides of the projectile (430). The shape of the present disclosure and relative positions of the aerodynamic center (22) and center of gravity (21) induce the present disclosure (401) to pitch up rapidly and away from the projectile. FIG. 16F shows the present disclosure (401) continuing to diverge away from the projectile (430) a split second farther in time. FIG. 16G shows the next split second with the present disclosure (401) flying yet farther away from the projectile (430) as the aerodynamic center (22) forces the present disclosure (401) to flip over and around the projectile. FIG. 16H shows the stable, free-flight configuration of the components associated with the projectile assembly including a straight-flying projectile (430) and the present disclosure (401) with a center of gravity (21) ahead of the aerodynamic center (22), at a trimmed angle of attack and sideslip angle forcing the present disclosure (401) away from the projectile body x-axis. As the present disclosure (401) flies away from the projectile body x-axis, it will follow a trajectory between maximum and minimum normal accelerations (530, 540) seen in FIG. 5F.

FIGS. 17A-17C show a more finely segmented variant of the present sabot disclosure (401). The present disclosure (401) as seen in FIG. 17A will exhibit a center of gravity (21) that is displaced closer to the free-flight configuration nose which accommodates the load transfer ring and nose weight (415). The aerodynamic center (22) will be comparatively behind center of gravity in the free-flight configuration. As the present disclosure separates from one unitary member (shown in FIG. 17A) to many individual components (shown in FIG. 17B) the center of gravity of the collective and individual pieces will shift neither forward nor aft in absolute dimension. However, by examining FIG. 17C, it is apparent that the segmented present disclosure (401) has a much smaller hydraulic diameter or effective caliber. Accordingly, the hydraulic diameter normalized static margin longitudinally and directionally will be far greater for the individual segment configuration of the present disclosure shown in FIG. 17C than the combined configuration shown in FIG. 17A. Because the surface area per unit mass will be increased in the individual segment configuration shown in FIG. 17C, the magnitudes of the normal force coefficient with respect to angle of attack, $C_{N\alpha}$ and the side force coefficient with respect to yaw angle, $C_{Y\beta}$, will also be increased with respect to the combined configuration shown in FIG. 17A. This in turn increases the total amount of normal acceleration along the body y and z axes that can be generated per unit angle of attack.

Adding to the stabilization will be the inevitable increase in magnitude of stabilizing pitching moment coefficient about the center of gravity with respect to pitch rate $C_{mcgq}$ and the yawing moment coefficient about the center of gravity with respect to yaw rate $C_{ncgr}$. Increases in the magnitudes of both of these values will aid in damping out adverse aeromechanical modes which affect flight path tailoring by increasing scatter. The ability of the present disclosure to achieve a particular trimmed angle of attack, a, and sideslip angle, β enables maneuverability. To achieve this enhanced level of steady-state maneuverability, the chamfers (417) may be designed such that the angle of attack and angle of sideslip in free flight produces the prescribed amount of normal force and side force in the given flight state.

FIGS. 18A-18C show a similar increase in segmentation and greater detail on the chamfers. FIG. 18A shows a more finely segmented variant of the present disclosure with all segments combined in the unitary or storage and launch configuration. The center of gravity of the present disclosure (21) is displaced towards the load transfer mechanism and nose weight (415) which results in the many benefits listed for the variant shown in FIG. 17A. The variants of the present disclosure shown in FIGS. 17A-17C and 18A-18C are stable and will tend to inherently stay together just after gun barrel exit as the muzzle blast washes over the projectile assembly (400), starting at the load transfer ring (415), then moving towards the body (410) and chamfers in the tail (417). However, just after clearing the muzzle blast zone, the opposite dynamic occurs as the present disclosure (401) is designed to separate rapidly and peel away from the projectile quickly and cleanly.

The large chamfers shown in FIG. 18A (417) form a pocket of low-pressure air during while being exposed to muzzle blast. This low-pressure air tends to hold the pieces of the present disclosure tightly against the sides of the projectile. However, the chamfers on the present disclosure (417) are also designed such that as the projectile assembly (400) clears the muzzle blast zone, the pocket of air in the middle of the chamfers shown in FIG. 18A goes from low pressure to high pressure as the pocket of air reaches full stagnation pressure for a split second before segment separation. This high-pressure air pocket in the middle of the chamfers of FIG. 18A (417) will act as a wedge and rapidly rotate and translate the present disclosure (401) away from the projectile body. This process may be aided by the addition of small explosive charges placed between the segments and/or the projectile (430). FIG. 18B shows the individual segments of the present disclosure separating.

FIG. 18C shows the load transfer grooves (418), segmented load transfer ring and nose weight (415), lightweight body section (410) and center of gravity (21) displaced closer to the nose weight (415) than the aerodynamic center (22). The chamfers (417) at the free-flight aft of the present disclosure are tailored along with lengthwise curvature to achieve a particular trimmed angle of attack α, and sideslip angle, β to produce the prescribed amount of normal force and side force in a given flight state. The chamfers shown in FIG. 18C may also be augmented with any number of aerodynamic devices or excrescences to achieve the proper trim state and desired aeromechanical properties. Another benefit achievable by chamfer tailoring is shown by the example chamfer in FIG. 18C; chamfer tailoring may enable the recovery of base pressure which can be used to adjust the drag and/or axial force coefficients.

FIGS. 19A-19F illustrate sabots including a traveling charge and the performance of a sabot including a traveling charge. Additionally, FIGS. 19B-19F illustrate some example configurations of a multi-stage charge integrated on the aft portion of the aeromechanically stable sabot, the cartridge, and assembly.

Figures 19A, 19B, 19C, 19D, 19E, 19F:
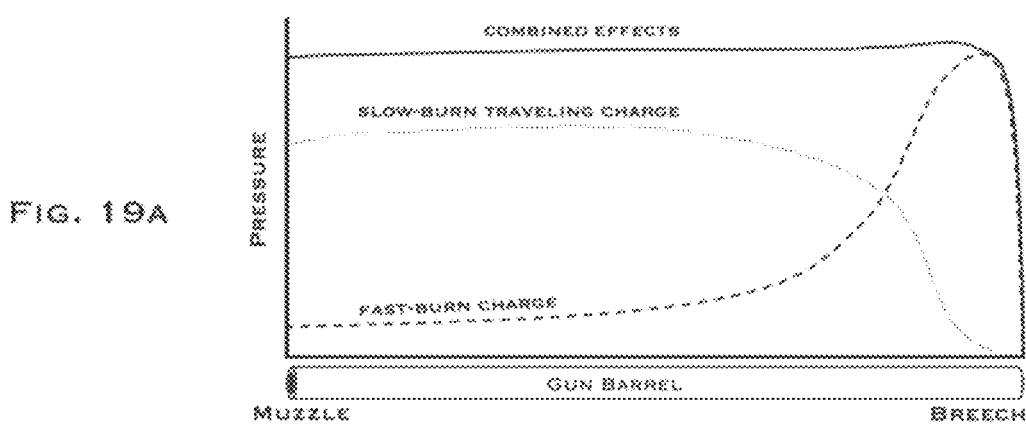
FIG. 19A illustrates a gun barrel pressure diagram for single and multi-stage charges.
FIGS. 19B-19F illustrate an example sabot assembly of the present disclosure including a traveling charge along with overall configuration of a multi-stage charge integrated on an aft portion of the aeromechanically stable sabot, the cartridge and assembly.

FIG. 19A illustrates an example gun barrel pressure diagram. FIG. 19A also depicts a gun barrel with a round entrance at the breech side of a gun barrel (right), and a round exit (muzzle) at the left of the gun barrel that corresponds to the pressure diagram. Most conventional rounds have a "fast-burn charge" and will encounter a comparatively large starting pressure load following ignition of the primer. These conventional rounds will experience a large pressure peak at the start of gun barrel traversal which then tapers off as seen in the fast-burn charge profile of the pressure diagram.

However, for a gun barrel of a given length and a restrained peak pressure profile, the muzzle velocity will be increased if the pressure profile is flattened for a given propellant energy. An exemplary way to do this is to combine one or more fast-burn and slow-burn charges to create a functionally graded propellant. The fast-burn charge initiates quickly while the slow-burn charge (also referred to as a "traveling charge" as the charge travels with the round and/or sabot) continues the acceleration as the volume behind the round increases. It was found to be difficult or to integrate this "traveling charge" profile in conventional round designs as there is usually no structure on the munition for the slow-burn/traveling charge to adhere to.

However, the present aeromechanically stable sabot systems can accommodate such a traveling charge. In an exemplary embodiment, an aeromechanically stable sabot system includes a feature, which extends (relatively deep) into a powder section of a cartridge, allowing the feature to carry a slow-burning charge, as shown and described further with reference to FIGS. 19B-19F.

If both slow-burn and fast-burn charges are combined, then the result of the various burn rate charges is a much flatter pressure profile and therefore a flatter acceleration profile over the length of the gun barrel: resembling the ideal constant pressure travel profile. These more platykurtic pressure and acceleration profiles allow for increases in downrange performance even for profiles that impart the same energy to the system as the weight of the sabot relative to the projectile is a direct function of the chamber pressure: the greater the peak chamber pressure, the greater the mass of the sabot relative to the projectile. Because an ideal sabot transfers the maximum muzzle kinetic energy of the combined system to the projectile, reducing sabot mass improves performance, which also implies that reducing gun barrel peak pressures improves performance. This flattened, total pressure and acceleration profile may also be combined with light gas gun barrel injection like Helium or Hydrogen to further enhance muzzle velocity.

Example features which support such traveling charges are illustrated in FIGS. 19B-19F. Referring to FIG. 19B, FIG. 19B illustrates an assembled exemplary cartridge (600). The aft portion of the cartridge, or cartridge case (601) contains the high explosive. The forward portion of the cartridge or sabot-projectile assembly (602) houses the sabot, penetrator, ejection materials and protective sheaths. If the cartridge case 601 is removed, the powder charge (610) is revealed in FIG. 19C. If the ejection materials are also removed, then the fuselage and ringtail of the aeromechanically stable sabot are shown (605).

FIG. 19D illustrates a cut-away (cross-section) of the powder charge (610) showing that the powder charge 610 may be arranged in multiple sections with a fast-burning segment (611) and a slower-burning segment (612). FIG. 19E shows the fast burn segment (611) separated from the slower-burning segment (612) after the primer initiates the explosion of the fast-burning segment. The slower-burning segment (612) may be any suitable cross-sectional geometry which induces appropriate gun barrel pressure profiles, may be composed of any number of other burn-rate segments and may be functionally graded as well. Ultimately, the slower burning charge(s) will be exhausted, leaving the sabot-projectile assembly (650) with far less charge attached to the aft body just prior to projectile separation from the sabot as shown in FIG. 19F. This dynamic will produce a far more favorable traveling charge profile resembling the ideal uniform pressure profile as shown in FIG. 19A.

FIGS. 20A-20H illustrate exemplary aeromechanically stable sabots including empennage configurations as well as projectile integration features/structures within the exemplary aeromechanically stable sabots. Some such empennage configurations may be designed to be aeromechanically stable themselves, i.e., apart from the rest of the sabot.

FIGS. 20A-20H also illustrate a variety of exemplary embodiments of projectiles to be used with aeromechanically stable sabots (900). The entire projectile assembly (700) often includes a relatively heavy nose section (701) and a lighter-weight empennage section (702).

Figures 20A, 20B, 20C, 20D, 20E, 20F, 20G, 20H:
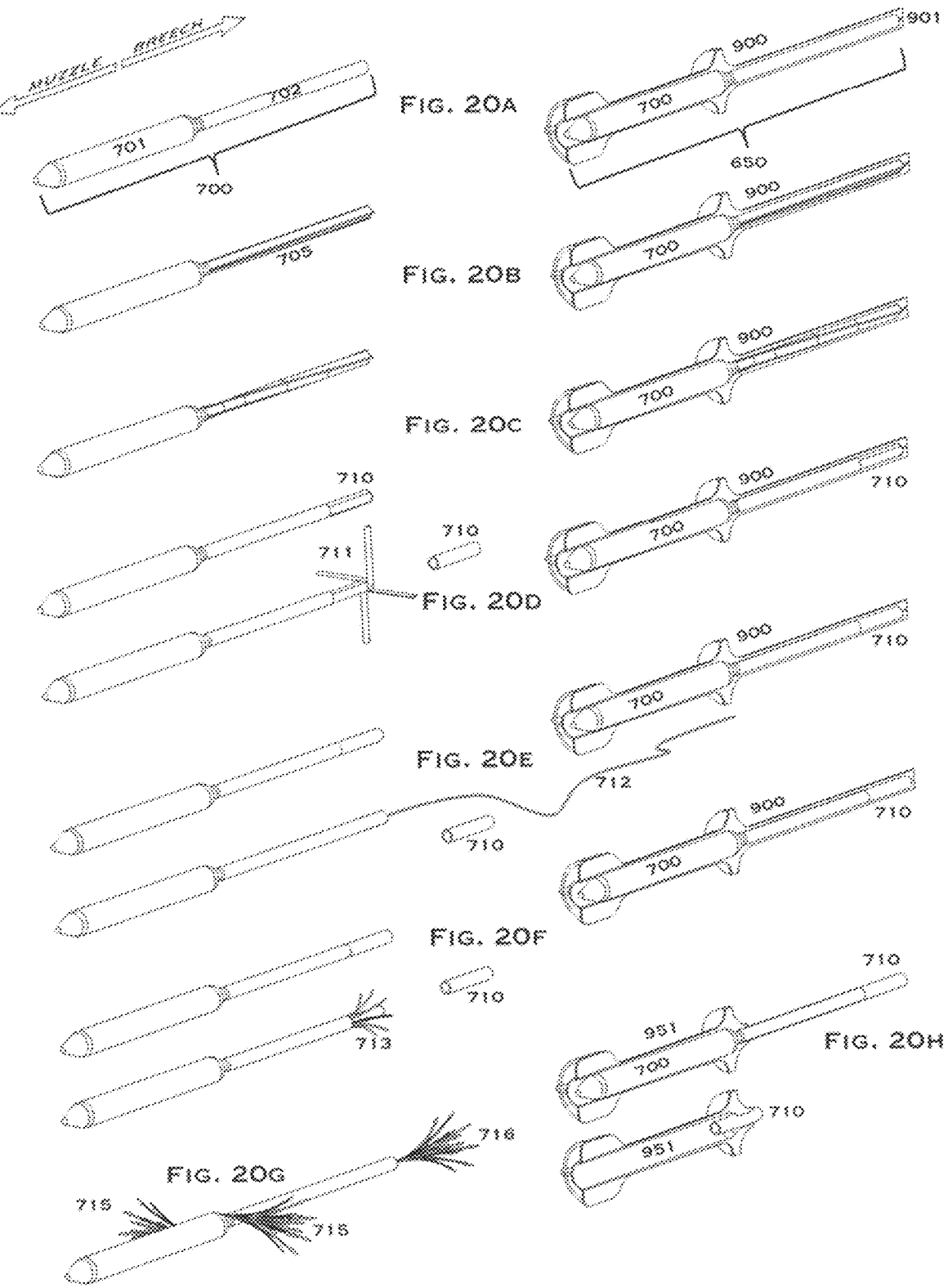
FIGS. 20A-20H illustrate example sabot assemblies of the present disclosure including aeromechanically stable empennage configurations and integrations within exemplary aeromechanically stable sabots.

Referring to FIG. 20A, FIG. 20A illustrates an example of how an exemplary projectile (700) with a circular cross-section may integrate into a closed-end aeromechanically stable sabot (650). The projectile could be fabricated from a uniform, monolithic material, in segments, or could be made as a cargo round with an internal cavity designed to carry materials including explosives or guidance, navigation, and/or control equipment. The fuse hole (901) provides a timed entry of the combustion front into the rest of the sabot for down-gun barrel or post-exit separation.

FIG. 20B shows an exemplary sabot including a straight-fluted projectile configuration. The straight flutes (705) exhibit very low cross-sectional areas, but have high relative normal force gradients, as compared to twisted flutes (e.g., flutes that rotate around the projectile), which help move the aerodynamic center of the projectile aft. The fluted projectile shown in FIG. 20B may extend far aft into the sabot (900) allowing fluids, gasses or solids to fill the areas between the projectile and sabot. The fluted empennage may also be tapered and/or functionally graded or fabricated out of materials that are different than the nose section or other structures within the rest of the projectile, 701. As will be described in later figures, the flutes and/or regular polygon cross-section may also be used to impart spin to the projectile relative to the sabot (900). In the case of a sabot which is spinning around the body x-axis, as shown in FIG. 1A, the spin of the sabot may also be transferred to the projectile via the flutes and/or an empennage (e.g., a regular polygon empennage).

FIG. 20C shows how a projectile with twisted flutes may be integrated into an exemplary aeromechanically stable sabot (900). As the projectile is ejected from the sabot, the twist of the empennage induces rotation relative to the sabot itself via a keyed slot in the sabot (900). This rotation may be used in one of two ways: i.) the spin may be in the same direction as gun barrel rifling, thereby imparting a higher rotational rate than that of the sabot, perhaps even to the point of despinning the sabot or spinning the sabot (900) in the opposite direction of the projectile spin direction; ii.) the spin may be used as an ejection mechanism, forcing the projectile out of the sabot in the event that the sabot is fired from a rifled gun barrel with twist in the direction opposing the twist direction of the twist on the flutes.

FIG. 20D shows an exemplary unfolding empennage assembly, which may have any number of fins or aerodynamic mechanisms folding forward or aft, unfolding in either direction following sabot (900) ejection and clearance. To enable this dynamic, an end cap, (710) may be used which would come off to reveal and release the fins 711. The fins may be mechanically deployed through the use of a spring mechanism or may deploy with the use of centripetal acceleration if the projectile is spinning. The end cap may be retained within the sabot following projectile expulsion or may be ejected from both projectile and sabot (900).

FIG. 20E shows how a drag-whip (712) may be used to stabilize the projectile. Such a whip is typically made of a fine, tough filament which trails behind the projectile and aids in initial stabilization following gun barrel exit. The whip (712) may be made from any filament material of any cross-section and may be designed to be fatigued and cut or released after a prescribed time or distance following gun barrel exit. An associated filament cutter may be designed into the aft end of projectile empennage.

FIG. 20F shows the end cap (710) falling away after projectile ejection revealing drag whiskers (713) on the projectile. The drag whiskers are designed to aid in moving the longitudinal and directional aerodynamic center aft. Such whiskers may be designed to project outside a given boundary layer or area of low dynamic pressure ratio air aft of the nose section. As before, the end cap may be retained in the sabot (900) or ejected following separation of the projectile from the sabot (900).

FIG. 20G shows a projectile configuration which uses lateral rocket ejectors (715) to spin-up the projectile and/or propel it with an end ejector (716) or to form a drag fumer to reduce base drag following separation from the sabot (900). Timed ejection of the propellant and/or lateral ejectors could also be used for flight control (e.g., trajectory control).

FIG. 20H shows an exemplary thru-hole aeromechanically stable sabot (951) and projectile configuration. FIG. 20H shows the projectile (700) in a pre-ejection configuration with end-cap (710) in place, then wedged in the end of the sabot (951) following projectile (700) exit. The projectile may extend past the end of the disk into the propellant in some implementations, and such thru-hole or short hole configurations are compatible with conventionally propelled cartridges.

FIGS. 21A-21J illustrate tip-off moment impulses for both conventional rounds and projectiles of exemplary aero-mechanically stable sabots. As illustrated in FIGS. 21A-21D, conventional rounds are susceptible to nontrivial tip-off moment impulses upon gun barrel exit, while the aeromechanically stable sabot configurations, shown in FIGS. 21E-21J, induce projectile tipoff moments which are substantially lower, leading to straighter trajectories and accordingly lower levels of CEP. Some such implementations may optionally include mechanisms to impart spin to the projectile.

Figures 21, 21A, 21B, 21C, 21D, 21E, 21F, 21G, 21H, 21I, 21J:
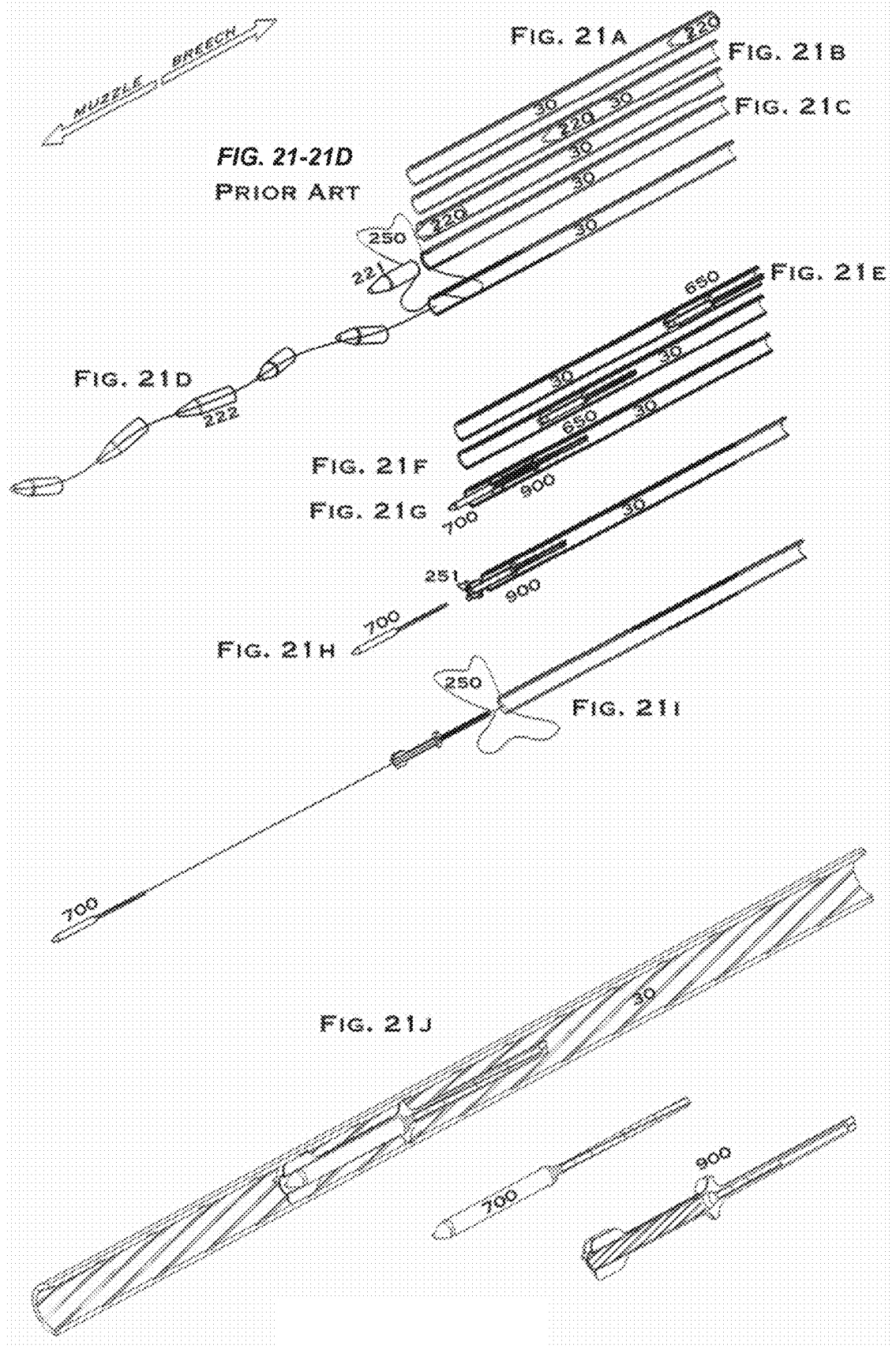
FIGS. 21A-21D illustrate a conventional round according to the prior art and how conventional rounds are susceptible to nontrivial tip-off moment impulses.
FIGS. 21E-21J illustrate example sabot assemblies according to aspects of the present disclosure and including mechanisms to impart spin to the projectile and reduce tip-off.

FIGS. 21A-21D show gun barrel dynamics of conventional rounds and FIGS. 21E-21I show gun barrel dynamics of projectiles exiting from exemplary aeromechanically stable sabots (i.e., FIGS. 21A-21D are prior art and FIGS. 21E-21I are not prior art). Referring to FIG. 21A, FIG. 21A shows a gun barrel (30) with a conventional round (220) of almost any configuration (saboted or not) close to the breech. As the round travels down the gun barrel, seen in FIG. 21B, eventually, the round will exit the gun barrel as shown in FIG. 21C. As the round (221) just clears the end of the gun barrel (30), a large underexpanded muzzle blast (250) typically induces nontrivial tip-off moment impulses on the round as seen in FIG. 21D. This effect compounds with other dynamics such as gun barrel whip to introduce large tip-off impulses that result in precession and nutation disturbances and an otherwise "wobbly" round (222) with larger targeting errors and CEP.

The use of an aeromechanically stable sabot mitigates the muzzle blast tipoff error mechanism. FIGS. 21E, 21F and 21G show the combined sabot and penetrator traveling down the gun barrel from breech to muzzle together. Near the muzzle, the penetrator separates from the sabot as seen in FIG. 21H. Unlike the conventional projectile, as the exemplary projectile embodiment clears the end of the muzzle, much of the exit blast is blocked by the sabot. The sabot tipoff blast, 251 is much smaller than the main muzzle blast, 250, leaving the projectile to continue its travel along a straight, undisturbed trajectory as shown in FIG. 21I. After the sabot (900) clears the end of the muzzle, the main muzzle blast appears (250), but the additional tipoff moment impulse facilitates the sabot gun barrel exit dynamics as the sabot is primed to swap ends, allowing the c.g. to travel downrange ahead of the a.c. as any statically stable trimmed object would do. Although the precise sequencing of the departure of the projectile from the sabot and the sabot from the muzzle may be tailored, the preferred embodiment is to time such a release so as to reduce or minimize tipoff disturbances on the projectile as described while maximizing projectile velocity. This tailored sequencing may allow for projectile separation from the sabot prior to muzzle exit, during muzzle exit or after muzzle exit and will typically be determined by detailed analysis performed by weapon system design engineers.

Another mechanism for reducing or minimizing tipoff disturbances is seen in FIG. 21J which describes a rifled gun barrel (30) spinning the aeromechanically stable sabot. The sabot includes all necessary bore-riding features, bands and cleats to impart spin to the sabot. Spin from the sabot (900) may then transferred to the projectile by internal rifling within the sabot and/or via keying of the through-hole in the sabot being matched to the polygonal cross-section or fins of the projectile. Because the projectile may be spun with respect to the sabot, it is possible to apply angular impulses of such a magnitude that the sabot and projectile spin in opposite directions.

FIGS. 22A-22M illustrate examples of aeromechanically stable sabots including mechanisms for expulsion of the projectile with and without imparting spin. FIGS. 22A-22M illustrate examples of sabots that expel a projectile and impart spin on the projectile, and FIGS. 22A-22M illustrate examples of sabots that expel a projectile without imparting spin.

Referring to FIG. 22A, FIG. 22A shows an exemplary projectile, (700) with an aft expulsion charge (731) with a cylindrical outer profile and an inner profile matching that of the empennage of the projectile. Similarly, the mid-section expulsion charge (732) is designed to fit between the base of the forward projectile section (701) and the sabot (900). The expulsion charges may be any suitable material including liquids, solids or gasses. They may also simply transfer loads from the aft ends of the projectile to the sabot via isostatic or quasi-isostatic loading or may change phase to effect expulsion. They may also be triggered via a combustion process as a fuse may burn through a fuse-hole located anywhere on the sabot or be electronically triggered. The fuse hole may be open, valved or unvalved. The aft expulsion charge (731), mid-section expulsion charge (732) are further joined to the exemplary projectile as shown in FIG. 22B to form a combined projectile-expulsion charge assembly (740).

FIG. 22C shows the overall appearance of the combined projectile-expulsion charge-sabot assembly (652). FIG. 22D shows a cut-away of the integration of the projectile-expulsion charge-sabot assembly (652). FIG. 22E shows the relative movement of the projectile (700) with respect to the sabot (900). The event depicted is just after one or both of the expulsion charges have been initiated and/or a suitable level of setforward acceleration has been applied to the assembly to cause the relative motion.

FIG. 22F shows more motion of the projectile (700) relative to the sabot (900). As the projectile (700) moves to exit the sabot (900), the overpressure of the aft chamber, pressurized gas and/or flame front may be valved into the mid-section chamber which contains the mid-section expulsion charge (732). This allows the mid-section propulsion charge to participate at a different rate and/or initiation time than the aft expulsion charge (731). This forward movement continues until the head of the projectile (701) clears the sabot as shown in FIG. 22G. As mentioned earlier, the projectile may be spun relative to the sabot during this process in either direction to either enhance projectile spin rate or to aid projectile expulsion or deploy stabilizing mechanisms. Keying within the sabot (908) aids in imparting spin about the body x-axis. The configuration and functionality differs slightly for the thru-hole aeromechanically stable sabot (951) seen in FIGS. 22I, 22J, 22K, 22L and 22M.

The projectile (700) may include an end-cap (710) which is affixed to the end of the projectile as seen in FIG. 22I. The cut-away of the exemplary configuration of the thru-hole aeromechanically stable sabot can be seen in FIG. 22J. The base of the head rests against the flange of the sabot, but the empennage protrudes completely through the hole, into the powder charge area. As explained in FIG. 19, a differential burn rate powder may be molded to the empennage of the projectile so as to enable a traveling charge configuration. FIG. 22K shows the projectile (700) moving forward relative to the sabot (951) with the end-cap (710) attached. FIG. 22L shows the projectile (700) just after the end cap (710) was wedged into the thru-hole of the sabot (951), but the empennage of the projectile has not cleared the sabot. The end cap (710) functions in several capacities: First, its mass contributes to a higher static margin of the free-flight sabot (951) following end-swapping as it moves the center of gravity of the thru-hole sabot (951) forward, second, it acts to shield the projectile from excessive blow-through of gun barrel gasses which may increase projectile tip-off angles, and finally, it acts as an air-spike to reduce supersonic drag on the sabot (951) following the end-swap maneuver. FIG. 22M shows the free flight configuration of the projectile (700) and the sabot (951) just after gun barrel exit, but before the end-swapping flip and aeromechanically stable steady-state flight of the sabot. The steady-state free flight positive x-axis of this exemplary sabot is oriented towards the fuse hole (901) end of the sabot, e.g., after the projectile is release from the sabot, the sabot does a 180 degree flip and the previous back end of the sabot when the sabot was in the gun barrel now becomes the leading edge or nose of the sabot during steady state flight.

FIGS. 23A-23R illustrate a variety of aeromechanically stable sabot configurations which possess features that move the aerodynamic centers aft of the centers of gravity to attain stable flight in steady-state flight conditions after initial flip maneuvers. The exemplary features increase the separation of the center of gravity forward from the aerodynamic center in trimmed steady-state flight, generate a more predictable flight path and achieve stable, steady-state flight more quickly by increasing longitudinal and directional static margins as well as increasing the rate damping properties of the sabot, described by the coefficients C mq and Cr. FIGS. 23A-23I illustrate closed-end aeromechanically stable sabot configurations and FIGS. 23J-23R illustrate thru-hole or open-end aeromechanically stable sabot configurations. While the gun barrel muzzle direction during chambering is to the lower left and the gun barrel breech direction is to the upper right during chambering, this does not necessarily correspond to the free-flight configuration in FIGS. 23A-23R. Rather, the positive body-fixed X-axis denotes the sabot nose in the stable steady-state flight condition which is shown for each configuration by an arrow indicating the positive direction. Those configurations shown in FIGS. 23A-23R which depict the positive body X-axis as pointing to the lower left do not undergo a flip maneuver following exit from the gun barrel muzzle to achieve a stable steady-state flight configuration. Those configurations shown in FIGS. 23A-23R which depict the positive body X-axis as pointing to the upper-right do undergo a 180-deg. flip maneuver following exit from the gun barrel muzzle to achieve a stable steady-state flight configuration.

Referring to FIG. 23A, FIG. 23A shows a simplified exemplary variant of a closed end sabot (900). In FIG. 23A, an exemplary closed-end aeromechanically stable sabot configuration includes a fuse hole (901), a weighted end cap (910), a narrow fuselage tube (905), a center flange (915), and a large diameter tube section (920). The large diameter fuselage tube may be constructed of any suitable structural material or combination of materials including filament-wound structural composites like graphite and/or boron filaments embedded in a structural matrix. The steady-state free flight positive x-axis of this exemplary sabot is oriented towards the fuse hole (901) end of the sabot, e.g., after the projectile is release from the sabot, the sabot does a 180 degree flip and the previous back end of the sabot when the sabot was in the gun barrel now becomes the leading edge or nose of the sabot during steady state flight. This 180-degree flip maneuver is normal for all sabots which have a positive body x-axis oriented away from the empennage (922, 923, 924) and towards the fuse hole (901) and end cap (910) end of the sabot.

FIG. 23B shows an exemplary closed-end sabot configuration with a similar layout to FIG. 23A, but with a weighted end ring (921) on the large diameter tube section (920) and stabilizing drag whiskers (906). The steady-state free flight positive x-axis, as shown in FIG. 1A, of this exemplary sabot is oriented away from the fuse hole (901) end of the sabot, towards the weighted end ring, (921).

FIG. 23C shows a closed-end straked variant of the exemplary embodiment including a plurality of strakes (907). The steady-state free flight positive x-axis of this exemplary sabot is oriented away from the fuse hole (901) end of the sabot, towards the weighted end ring, (921).

FIG. 23D shows an exemplary closed-end pop-out fin variant of the exemplary embodiment including a plurality of strakes with pop-out fins (908). The steady-state free flight positive x-axis of this exemplary sabot is oriented away from the fuse hole (901) end of the sabot, towards the weighted end ring, (921).

FIG. 23E shows an exemplary closed-end aeromechanically stable sabot configuration that may include a fuse hole (901), weighted end cap (910), narrow fuselage tube (905), center flange (915), and large diameter tube section (920) with a plurality of strakes on the sides of the large diameter tube section (922). The steady-state free flight positive x-axis of this exemplary sabot is oriented towards the fuse hole (901).

FIG. 23F shows an exemplary closed-end aeromechanically stable sabot configuration that may include a fuse hole (901), weighted end cap (910), narrow fuselage tube (905), center flange (915), large diameter tube section (920) with strakes on the sides of the large diameter tube section and pop-out fins (923). The steady-state free flight positive x-axis of this exemplary sabot is oriented towards the fuse hole (901).

FIG. 23G shows an exemplary closed-end aeromechanically stable sabot configuration that may include a fuse hole (901), weighted end cap (910), narrow fuselage tube (905), center flange (915), large diameter tube section (920) with strakes on the sides of the large diameter tube section and a ring tail (924). The steady-state free flight positive x-axis of this exemplary sabot is oriented towards the fuse hole (901).

FIG. 23H shows an exemplary closed-end aeromechanically stable sabot configuration that may include a fuse hole (901), weighted end cap (910), narrow fuselage tube (905), center flange (915), large diameter tube section (920) without strakes on the sides of the large diameter tube section and a ring tail (924). The steady-state free flight positive x-axis of this exemplary sabot is oriented towards the fuse hole (901).

FIG. 23I shows an exemplary closed-end aeromechanically stable sabot configuration that may include a fuse hole (901), weighted end cap (910), narrow fuselage tube (905), center flange (915), large diameter tube section (920) without strakes on the sides of the large diameter tube section and a ring tail (924). The sabot may trail a drag whip (925) for stabilization which may be cut via a sharp-edged cutter or released through a mechanism located within the large diameter tube (920) after steady state free flight conditions are established. The steady-state free flight positive x-axis of this exemplary sabot is oriented towards the fuse hole (901).

FIG. 23J shows an exemplary open-end, thru-hole aeromechanically stable sabot configuration that may include a weighted large diameter end tube (971), force transfer flange (965), and large diameter tube section (970). The steady-state free flight positive x-axis of this exemplary sabot is oriented towards the weighted large diameter end tube (971).

FIG. 23K shows an exemplary open-end, thru-hole aeromechanically stable sabot configuration that may include a weighted large diameter end tube (971), force transfer flange (965), with stabilizing drag whiskers (956) and large diameter tube section (970). The steady-state free flight positive x-axis of this exemplary sabot is oriented towards the weighted large diameter end tube (971).

FIG. 23L shows an exemplary open-end, thru-hole aeromechanically stable sabot configuration that may include a weighted large diameter end tube (971), force transfer flange (965), with aft-body strakes (957) and large diameter tube section (970). The steady-state free flight positive x-axis of this exemplary sabot is oriented towards the weighted large diameter end tube (971).

FIG. 23M shows an exemplary open-end, thru-hole aeromechanically stable sabot configuration that may include a weighted large diameter end tube (971), force transfer flange (965), with aft-body strakes with pop-out fins (958) and large diameter tube section (970). The steady-state free flight positive x-axis of this exemplary sabot is oriented towards the weighted large diameter end tube (971).

FIG. 23N shows an exemplary open-end, thru-hole aeromechanically stable sabot configuration that may include a force transfer flange (965), with body strakes (972) on the sides of the large diameter tube section (970). The steady-state free flight positive x-axis of this exemplary sabot is oriented towards the force transfer flange (965).

FIG. 23O shows an exemplary open-end, thru-hole aeromechanically stable sabot configuration that may include a force transfer flange (965), with body strakes (972) and pop-out fins (973) on the sides of the large diameter tube section (970). The steady-state free flight positive x-axis of this exemplary sabot is oriented towards the force transfer flange (965).

FIG. 23P shows an exemplary open-end, thru-hole aeromechanically stable sabot configuration that may include a force transfer flange (965), with body strakes (972) and a ring-tail (974) on the sides of the large diameter tube section (970). The steady-state free flight positive x-axis of this exemplary sabot is oriented towards the force transfer flange (965).

FIG. 23Q shows an exemplary open-end, thru-hole aeromechanically stable sabot configuration that may include a force transfer flange (965) and a ring-tail (974) on the sides of the large diameter tube section (970). The steady-state free flight positive x-axis of this exemplary sabot is oriented towards the force transfer flange (965).

FIG. 23R shows an exemplary open-end, thru-hole aeromechanically stable sabot configuration that may include a force transfer flange (965) and a ring-tail (974) on the sides of the large diameter tube section (970). The sabot may include a drag whip (975) which trails from the sabot for stabilization. Such drag whip 975 may be temporary and may be used to establish steady flight and then retracted or removed. For example, the drag whip 975 may be cut via a sharp-edged cutter located or released through a mechanism within the large diameter tube (920) after steady state free flight conditions are established. Whip cutting may be accomplished by natural flailing motion induced by the Karman vortex field being shed by the aft of the sabot in steady-state free flight conditions. The steady-state free flight positive x-axis of this exemplary sabot is oriented towards the force transfer flange (965).

FIGS. 24A-24I illustrate exemplary configurations of aeromechanically stable sabots including protective shields. Such protective shields can prevent liquid (e.g., water) intrusion during long-term storage, lubricate and cool the gun barrel during firing, enable a light gas gun configuration and enhance compatibility with autoloaders, all while mitigating damage to aerodynamic surfaces on the sabot.

Figures 24A, 24B, 24C, 24D, 24E, 24F, 24G, 24H, 24I:
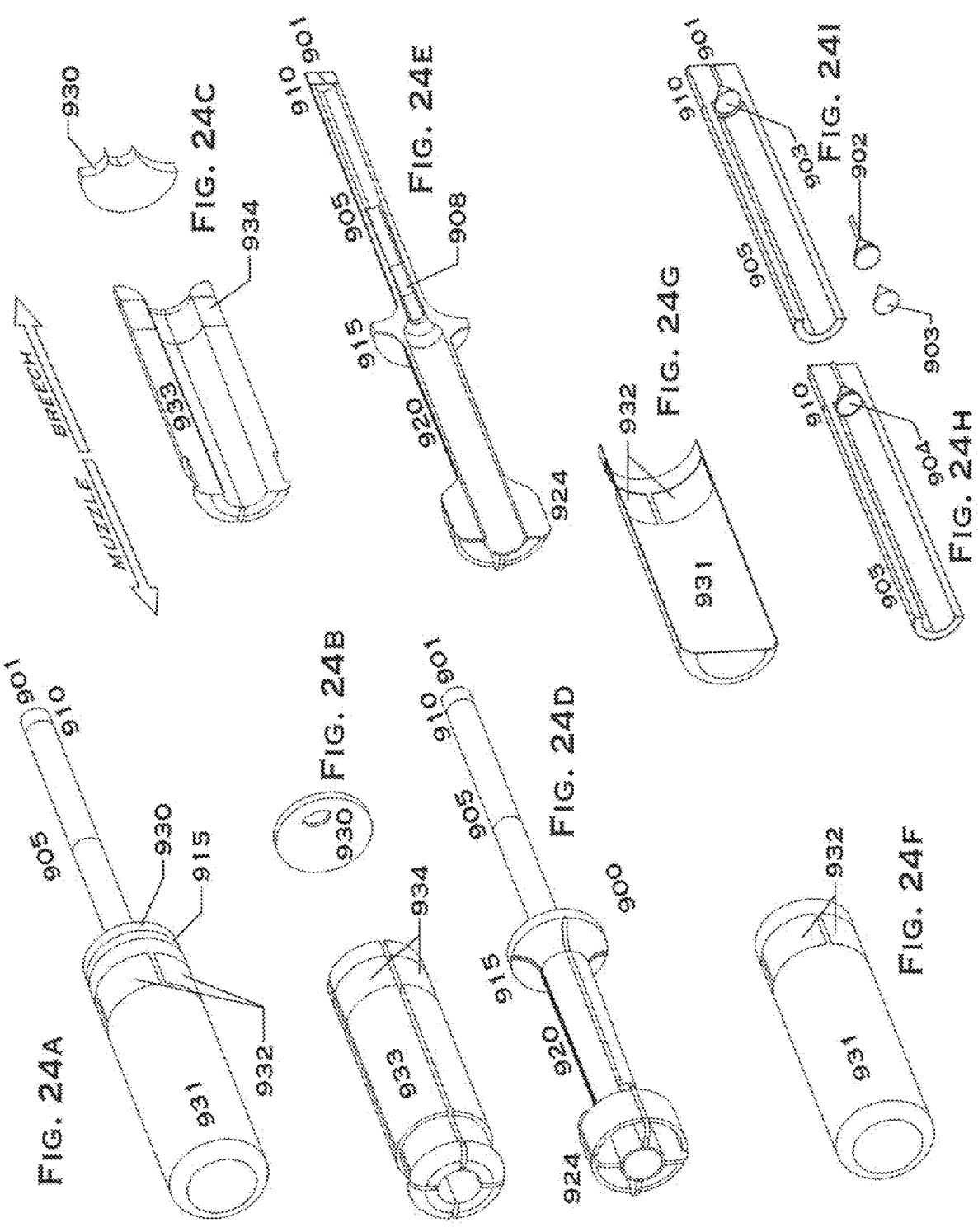
FIGS. 24A-24I illustrate example sabot assemblies of the present disclosure including protective shields.

FIGS. 24A-24I show exemplary features which allow for the protection of the sabot during storage, handling, and loading, as well as in-bore dynamics. Referring to FIG. 24A, FIG. 24A illustrates an exemplary sabot including a fuse hole (901), an end cap (910), a narrow fuselage tube (905), a center flange (915), along with a compliant pusher disk (930), and a forward nose shield (931), with blowout panels (932).

In some implementations, one or more protective wedges (933) may be included. These protective wedges 933 physically cushion the sabot from rough handling associated with packing, shipping, loading, and feeding into magazines and breech blocks. The protective wedges (933) may be made from wadding including any suitable frangible, energy-absorbent material so as to protect the sabot from damage. Also, the wadding may be made from a material like cotton, paper or select polymers that are safe for engine ingestion and will not harm airframes if they hit skins or structural components of an aircraft in flight regardless of flight speed.

FIG. 24B shows more details of the protective wedges which may also include matter in either the liquid and/or gaseous phases. A light gas gun configuration may be enabled by the gas stored in the protective wedges (933). Such light gasses (e.g., lighter than air gasses) include but are not limited to Helium or Hydrogen. They may be stored in gaseous or liquid forms. As the round is readied for firing, an outer protective coating of the wedges (933) may be perforated mechanically or via an electrical impulse. This in turn would release the light gas which would fill the gun barrel just prior to firing. After the powder explosion and subsequent acceleration down the gun barrel, the round would see higher accelerations and muzzle velocities given the reduced round drag during in-bore round travel. This system may use any number of valves and/or baffles on or around the gun barrel, including one at the muzzle which may mitigate light gas leakage. Liquids and/or gasses may also be stored in the forward sections of the protective wedges (933) and used for different purposes than generation of light gas gun dynamics and resulting high muzzle velocities. During in-bore acceleration, the liquids and/or gasses may flow out from ejection ports (934) through blowout panels (932) to lubricate the gun barrel, cool the surface and/or neutralize the corrosive effects of gun gasses while cleaning the gun barrel itself. The fluids within the protective wedges may contain oils, alcohols, water solutions and/or chemical buffers so as to neutralize gun gasses and coatings both in the bore and upon muzzle exit so as to help mitigate powerplant and/or airframe erosion from gungas impingement. The materials in the forward section could also be used to vent and cool the round in the event the stored projectiles are ever caught in an overtemperature situation. Also, if the round is chambered in a gun barrel which is heated to a level beyond a given maximum specified temperature or temperature beyond a certain holding time, the coolants could be used to cool the gun barrel during overtemp chambering.

Referring to FIG. 24C, the cutaways of the protective wedges (933) and compliant pusher disk (930) of the example sabot of FIG. 24B are shown in FIG. 24C. The compliant disk may be made of any suitable material and is intended to mitigate some gun-gas blow-by, aid with bore-riding on a film of lubricant and transfer loads to the center flange (915) which, in turn transfers loads to the projectile.

FIG. 24D shows an exemplary closed-end aeromechanically stable sabot configuration that may include a fuse hole (901), a weighted end cap (910), a narrow fuselage tube (905), a center flange (915), a large diameter tube section (920) without strakes on the sides of the large diameter tube section, and a ring tail (924). The steady-state free flight positive x-axis of this exemplary sabot is oriented towards the fuse hole (901) end of the sabot, e.g., after the projectile is release from the sabot, the sabot does a 180 degree flip and the previous back end of the sabot when the sabot was in the gun barrel now becomes the leading edge or nose of the sabot during steady state flight.

FIG. 24E shows a cut-away of the sabot of FIG. 24D including the fuse hole (901). The fuse hole 901 may transmit a flame front at a prescribed/designed burn rate from the powder inside the cartridge to the charge located within the sabot. The interior of the fuse hole (901) may be valved so that even greater pressure than the gun barrel pressure may be maintained for ejection and acceleration of the penetrator from the sabot.

FIG. 24F shows the thin nose shield (931) which hermetically seals the forward portion of the round, preventing intrusion of water or other foulants and maintaining liquids or gasses within the protective wedges (933). With a thickness from foil-to-sheet gages, the nose shield can also accommodate internal pressures generated by gaseous or liquids contained within. Blowout panels (932) are shown in both FIGS. 24F and 24G. These blowout panels may be made of any suitable material like foil-gage aluminum, stainless steel, polycarbonate or other classes of polymers, and may erode as the round travels down the bore, releasing the liquids or gasses within the protective wedges (933).

FIGS. 24H and 24I show details of an embodiment of the fuse hole (901), fuse material (902), fuse hole valve (903) and fuse assembly (904) which is composed of the fuse material (902) and fuse hole valve (903). FIG. 24H shows the fuse assembly (904) prior to exposure of the flame front which would otherwise set off the fuse material (902). The fuse material (902) is made from any suitable combustible material that has a finite and very regular flame front speed which is used to time the ignition of the aft expulsion charge (731) and mid-section expulsion charge (732). Once the fuse material (902) is ignited and subsequently burned, thereby igniting expulsion materials (731, 732), its volume has been consumed. The pressure within the aft of the sabot will increase substantially, thereby forcing the fuse hole valve (903) into the well formerly occupied by the fuse material (902) as shown in FIG. 24I. The resulting very high pressure within the sabot will then result in the expulsion of the projectile assembly (700) at a precisely timed moment during the launch sequence. The fuse hole valve (903) is made from any suitable structurally strong material which can take high temperatures and maintain structural integrity like various grades of stainless steel, maraging steels or tungsten.

Figure 25A:
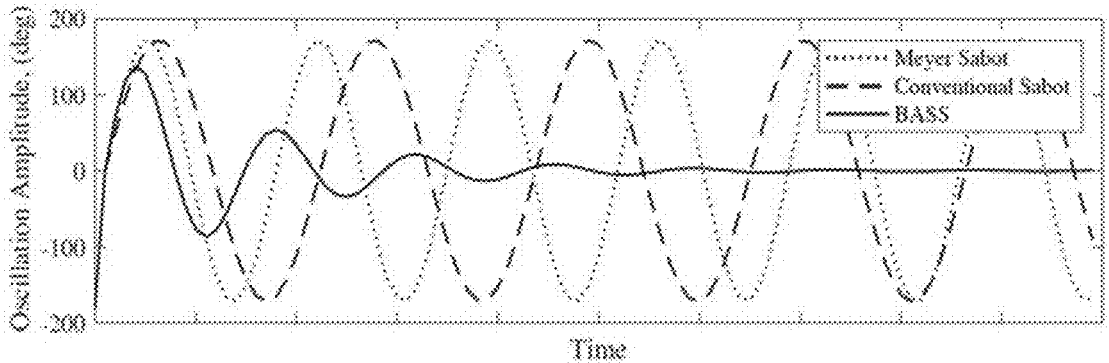
FIGS. 25A and 25B illustrate experimental data demonstrating ballistics of aeromechanically stable sabots versus conventional, tumbling/unstable sabots.

FIGS. 25A and 24B illustrate experimental data demonstrating the improvement in ballistics of aeromechanically stable sabots versus conventional, tumbling/unstable sabots. FIG. 25A illustrates an oscillation diagram of sabots in flight and FIG. 25B depicts a graph illustrating a flight path of the sabots.

Referring to FIG. 25A, the oscillation diagram illustrates oscillation amplitudes in pitch and yaw over time. While the unstable sabots (i.e., the conventional sabot and the Meyer Sabot) and their components oscillate freely up and down, side to side by tumbling, the Ballistic Aeromechanically Stable Sabot (BASS) (present disclosure) rapidly damps out oscillations without undergoing even a full revolution cycle beyond that of the initial flip maneuver. This tumbling (negative stability) versus non-tumbling (positive stability) behavior has profound influences on flight paths and formation of flight danger zones, as illustrated in FIG. 25B.

As a sabot tumbles it typically generates large amounts of normal force perpendicular to its flight path. These normal forces cause the tumbling sabot to behave erratically, such as by climbing, diving, diverging left or right, or even flying straight and level along a non-ballistic path. This leads to a large area of statistical uncertainty where unstable sabots may be present after clearing the gun barrel and separating from the projectile. This tumbling motion also results in a large drag penalty on the sabot bodies, greatly reducing forward flight speed and narrowing the separation from the launching vehicle. As explained for conventional sabots in FIGS. 1E-1G and for Meyer Sabots, FIGS. 2A-2F, such an aircraft strike has been determined to be too dangerous and has precluded their use in fielded aerial gunnery systems.

Figure 25B:
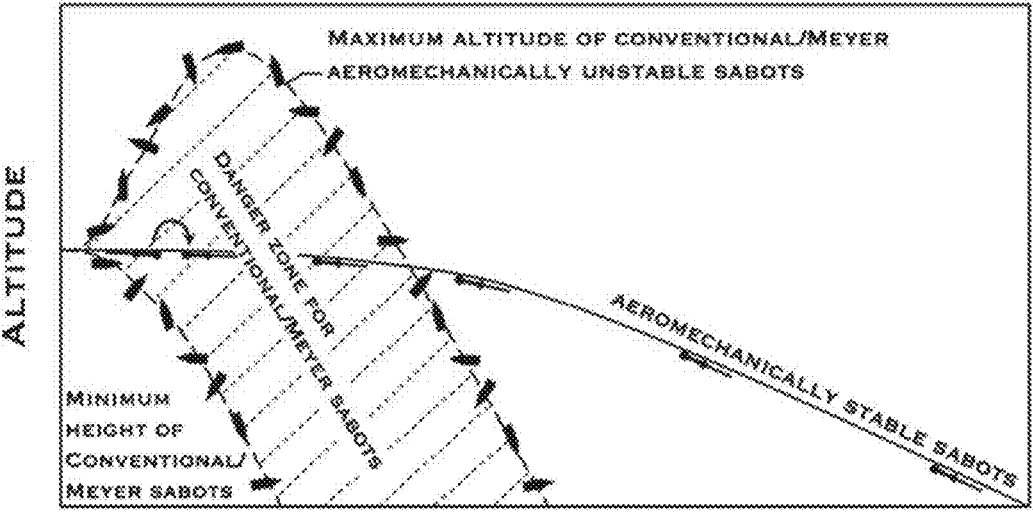

Referring to FIG. 25B, FIG. 25B illustrates a pictorial representation of experimental results where several unstable sabots like those referenced in this document, including Meyer '816, were shot in still air on a range and tracked as they zoomed, diverged, and tumbled through the air. Such unstable or negatively stable sabots may pose a danger to launching aircraft, and a "Danger Zone" corresponds to an area where a launching aircraft has a very high probability of striking a sabot, thereby damaging the launching aircraft and/or other nearby friendly forces.

Conversely, experimental range testing of many exemplary configurations of aeromechanically stable sabots show consistent performance along a reliable, predictable ballistic flight path following the flip maneuver, with reduced drag increments incurred without the tumbling motion consistently displayed in the conventional and Meyer type sabot configurations. Because the flight paths of the aeromechanically stable sabots are far more predictable, they are far safer for launching aircraft than conventional/Meyer unstable sabots. Accordingly, properly designed and integrated aeromechanically stable sabot gun systems pose no significant threat to launching airframes, especially when sabot ballistics are integrated into launching and friendly aircraft flight path controllers.

Figure 26:
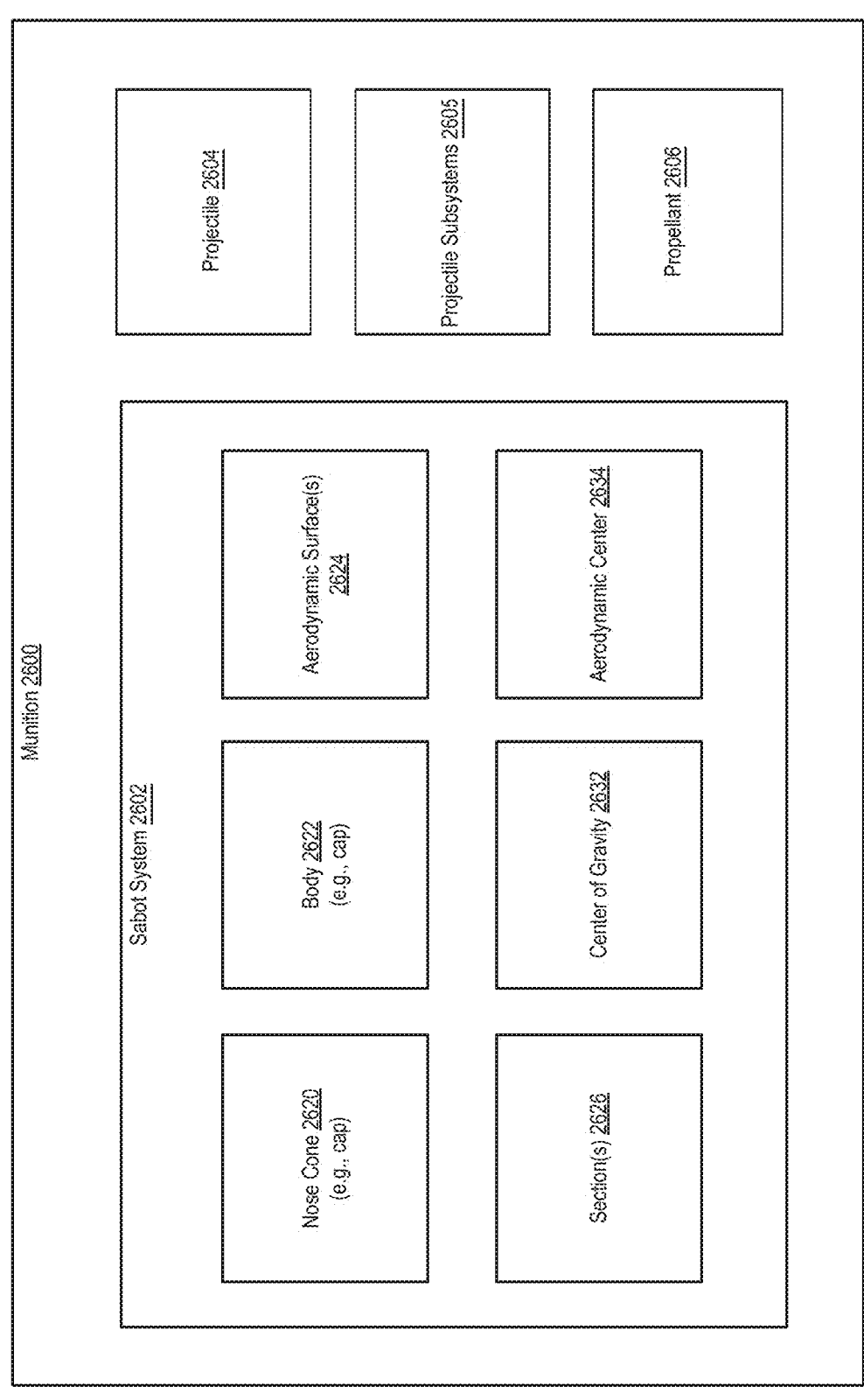
FIG. 26 is a block diagram that illustrates a sabot system in accordance with aspects of the present disclosure.

Referring to FIG. 26, a block diagram of a munition 2600 is shown. Munition 2600 may include or correspond to a round or hard-launched munition, such as described with reference to FIGS. 5A-24I. Multiple portions of munition 2600 are be configured to achieve stable flight, e.g., non-tumbling flight, after launching from a weapon. For example, after separation of sabot system 2602 from projectile 2604, sabot system 2602 (i.e., one or more pieces thereof) achieves stable flight.

As illustrated in FIG. 26, munition 2600 includes sabot system 2602, projectile 2604, and propellant 2606. Sabot system 2602 is removably coupled to projectile 2604 and is configured to accelerate projectile 2604 and guide projectile 2604 prior to separation. Sabot system 2602 may include or correspond to one or more projectiles described above. Additionally, sabot system 2602 may include one or more features of different sabots described with reference to FIGS. 5A-24I.

Sabot system 2602 may optionally include one or more sections, i.e., a sabot assembly, in some implementations. In other implementations, sabot system 2602 includes a single section coupled together, i.e., a monolithic sabot. As illustrated in the example of FIG. 26, sabot system 2602, includes a nose cone.

Sabot system 2602 includes a center of gravity 2632 and an aerodynamic center 2634. The center of gravity 2632 is forward of the aerodynamic center 2634 in steady-state free flight. The center of gravity 2632 of the sabot system 2602 may be "rearward" of the aerodynamic center 2634 prior to release from the projectile 2604, in some implementations. However, after separation of the projectile 2604 from the sabot system 2602, the sabot will continue to fly behind the projectile without major pitch and yaw disturbances if the body x-axis is aligned with the direction of travel. In lay terms, the sabot will fly like a dart or shuttlecock thrown forward with a heavy front end, followed by a much lighter empennage trailing without a flip maneuver. This configuration of sabot system 2602 will have a center of gravity 2632 far ahead of the aerodynamic center 2634. However, some aeromechanically stable sabot configurations are designed to be launched with the body x-axis facing aft or towards the gun barrel breech upon launch. In lay terms, this is as if a dart or shuttlecock were to be launched backwards. As with darts and shuttlecocks which are aeromechanically stable, the sabot will undergo a 180-deg. flip to achieve stable steady-state flight. This flip maneuver will place the sabot center of gravity 2632 ahead of the aerodynamic center 2634 and thereby achieve stable steady state flight following a predictable ballistic arc.

Projectile 2604 may include or correspond to one or more projectiles described above. Additionally, projectile 2604 may include one or more features of different projectiles described with reference to FIGS. 5A-24I. Propellant 2606 may include explosive charges, powders, gasses, etc., or another substance for launching projectiles. The projectile 2604 may include subsystems 2605 which allow for cooperative flight with other projectiles, inhabited and uninhabited friendly aircraft and target engagement, guidance, navigation and flight control. Included in the projectile subsystems 2605 may be components allowing for sensing targets in various electromagnetic spectra such as infrared, visible light, ultraviolet, microwave and other wavelengths. The projectile subsystems 2605 may be coupled to subsystems of other projectiles to form a synthetic aperture radar for target sensing and engagement. Any subsystem found on a conventional air-to-air or air-to-ground missile may be found within the projectile subsystem 2605.

Figure 27:
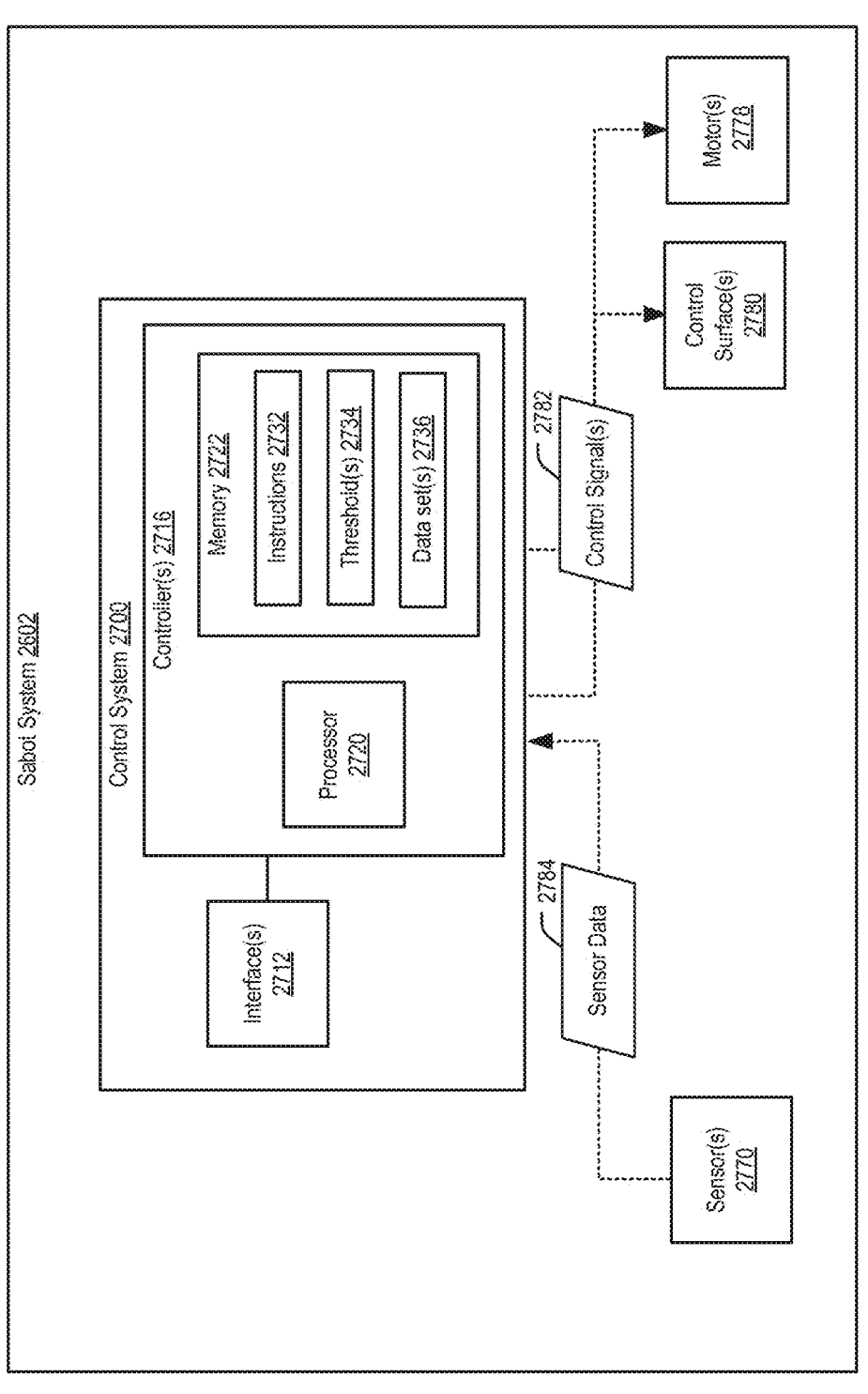
FIG. 27 is a block diagram that illustrates a controller of a sabot system in accordance with aspects of the present disclosure.

Referring to FIG. 27, a block diagram of an example of a control system 2700 of a sabot system 2602 is shown. Control system 2700 may include or correspond to an electronic device or system for controlling the flight state of the projectile, providing guidance, navigation and/or control. Control system 2700 may be configured to orient and direct sabot system 2602 such that sabot system 2602 achieves stable flight.

As shown in FIG. 27, control system 2700 includes one or more interfaces 2712 and one or more controllers, such as a representative controller 2716. Interfaces 2712 may include a network interface and/or a device interface configured to be communicatively coupled to one or more other devices, such as sensors 2770, control surfaces 2780, and/or motors 2778. The interfaces 2712 may include devices for reception, processing and/or transmission of command and flight state signals (e.g., position data, velocity data, orientation data, or a combination thereof) between the launching aircraft and the sabot so as to steer the sabot away from the launching aircraft or other cooperative aircraft. The sensors 2770 may include a global positioning system (GPS) receiver, magnetometer, rollsonde or other types of sensors. Interfaces 2712 may include a transmitter, a receiver, or a combination thereof (e.g., a transceiver), and may enable wired communication, wireless communication, or a combination thereof.

The one or more controllers (e.g., controller 2716) include one or more processors and one or more memories, such as representative processor 2720 and memory 2722. Memory 2722 may include executable instructions 2732. The one or more sets of instructions 2732 may be further based on thresholds 2734, data set(s) 2736 stored in memory 2722 that aid in determining control signals 2782 (e.g., one or more output settings), and/or one or more translation algorithms for generating control signals 2782. For example, instructions 2732 may be based on thresholds 2734 and/or data set(s) 2736 stored in memory 2722 that aid in determining the one or more control signals 2782 (e.g., dimensions, measurements, and/or other parameters control surface 2780 alignment or orientation). To illustrate, the instructions 2732 may execute when thresholds 2734 for sensor data 2784 stored in memory 2722 are reached.

As shown in FIG. 27, processor 2720 is coupled to the memory 2722 and configured to execute the one or more instructions. Processor 2720 may include or correspond to a microcontroller/microprocessor, a central processing unit (CPU), a field-programmable gate array (FPGA) device, an application-specific integrated circuits (ASIC), another hardware device, a firmware device, or any combination thereof. Processor 2720 may be configured to execute instructions to initiate or perform one or more operations described with reference to FIGS. 5A-24I or 30-32.

In some implementations, control system 2700 may be configured to receive sensor data 2784 and generate and/or communicate control signals 2782 (e.g., one or more output settings) for control surfaces 2780 and/or motors 2778, based on the sensor data 2784. The one or more sets of instructions 2732 may be further based on thresholds 2734 and/or data set(s) 2736 stored in memory 2722 that aid in determining the one or more output settings indicated by control signals 2782.

Figure 28:
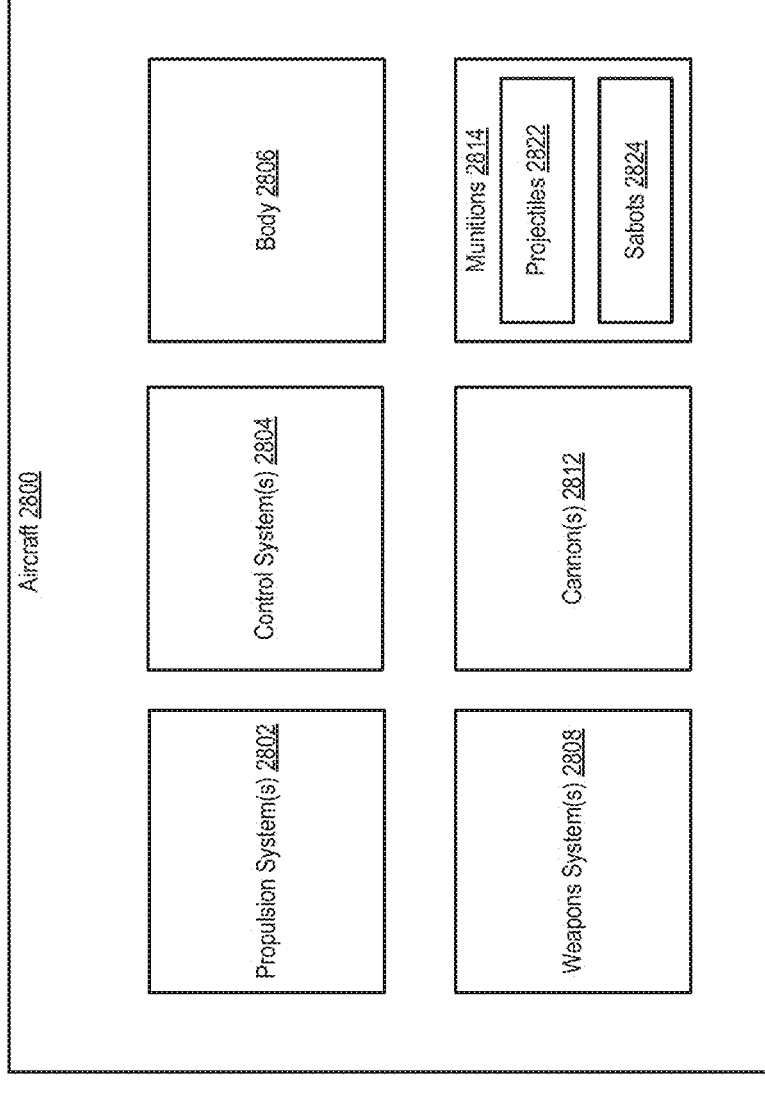
FIG. 28 is a block diagram that illustrates an aircraft including a sabot system in accordance with aspects of the present disclosure.

Referring to FIG. 28, a block diagram of vehicle is shown. In the example of FIG. 28, the vehicle is an aircraft 2800. In other examples, the vehicle may be a ground vehicle or a naval vessel. For example, the ground vehicle may be a tank or artillery vehicle, or the naval vessel may be a gunboat, destroyer, or other vessel. Aircraft 2800 may include or correspond to an such as described above with reference to FIGS. 5A-24I, and including a sabot as described above. In FIG. 28, aircraft 2800 include one or more propulsion system 2802, control systems 2804, a body 2806, and one or more weapons systems 2808. As illustrated in FIG. 28, the one or more weapons systems includes a cannon 2812 configured to launch munitions, such as munition 2814. Munitions 2814 may include or correspond to munitions 2600, sabot system 2602, or a sabot as described above with reference to FIGS. 5A-24I. In FIG. 28 Munitions 2814 include projectiles 2822 and sabots 2824 (e.g., 2602 or another sabot as described above with reference to FIGS. 5A-24I).

In a particular implementation, aircraft 2800 further includes a sensor, such as sensors 2770 of FIG. 27, and a controller, such as controller 2716 of FIG. 27. Aircraft 2800 may be configured to send control signals, such as control signal 2782 of FIG. 27, to sabots 2824 of munitions 2600 to control or guide flight of sabots 2824 based on sensor data (e.g., sensor data 2784 of FIG. 27, such as flight state information) from the sensors. The flight state information may include or correspond to a sabot attitude, an altitude, a velocity, acceleration(s), an earth-fixed orientation, a horizon orientation, a launching aircraft orientation, a friendly aircraft orientation, or any combination thereof. To illustrate, aircraft 2800 sends control signals (e.g., 2782) via an interface (e.g., 2712) to sabots 2824 to activate control surfaces (e.g., 2780) or motors (e.g., 2778, such as rocket motors) thereof.

Figure 29:
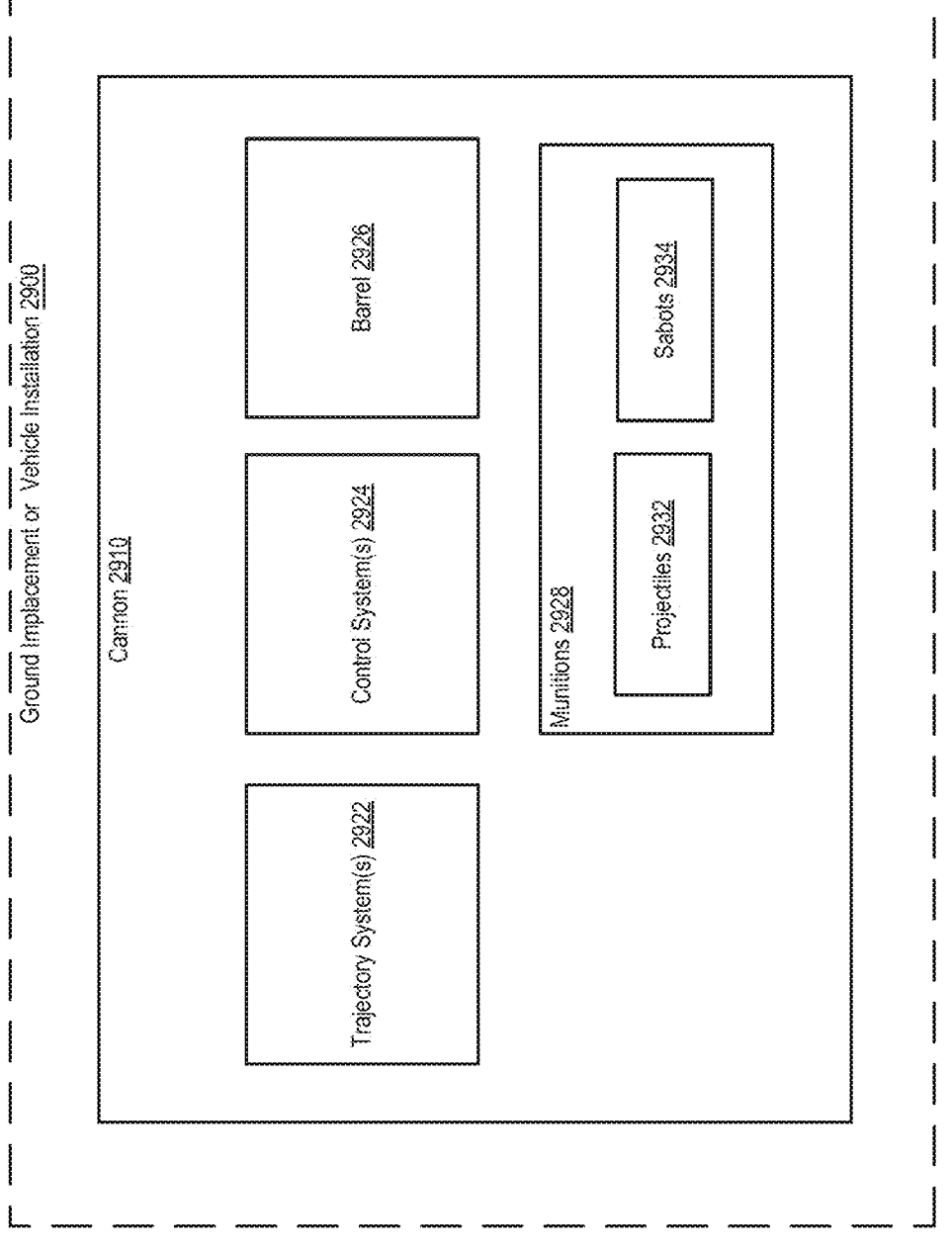
FIG. 29 is a block diagram that illustrates a cannon including a sabot system in accordance with aspects of the present disclosure.

Referring to FIG. 29, a block diagram of a cannon 2910 is shown. Cannon 2910 may include or correspond to cannon 2812 of FIG. 29. As illustrated in FIG. 29, cannon 2910 may be included in a generic vehicle (land or sea) or ground emplacement installation 2900. In the example of FIG. 29, cannon 2910 includes a trajectory system 2922, a control system 2924, a gun barrel 2926, and one or more munitions 2928.

The trajectory system 2922 is configured to adjust an orientation of the gun barrel 2926. The trajectory system 2922 may include or correspond to one or more mechanical members (e.g., linkage) controlled or driven by one or more motors. The control system 2924 is configured to control operation of the trajectory system 2922 and calculate an orientation (trajectory) of the gun barrel 2926. The control system 2924 may include or correspond to the control system 2700 of FIG. 27.

The gun barrel 2926 may include or correspond to one or more of the previously described gun barrels and includes a breech end and a muzzle. The one or more munitions 2928 may include one or more projectile 2932 and one or more sabots 2934, similar to munitions 2814 of FIG. 28.

Figure 30:
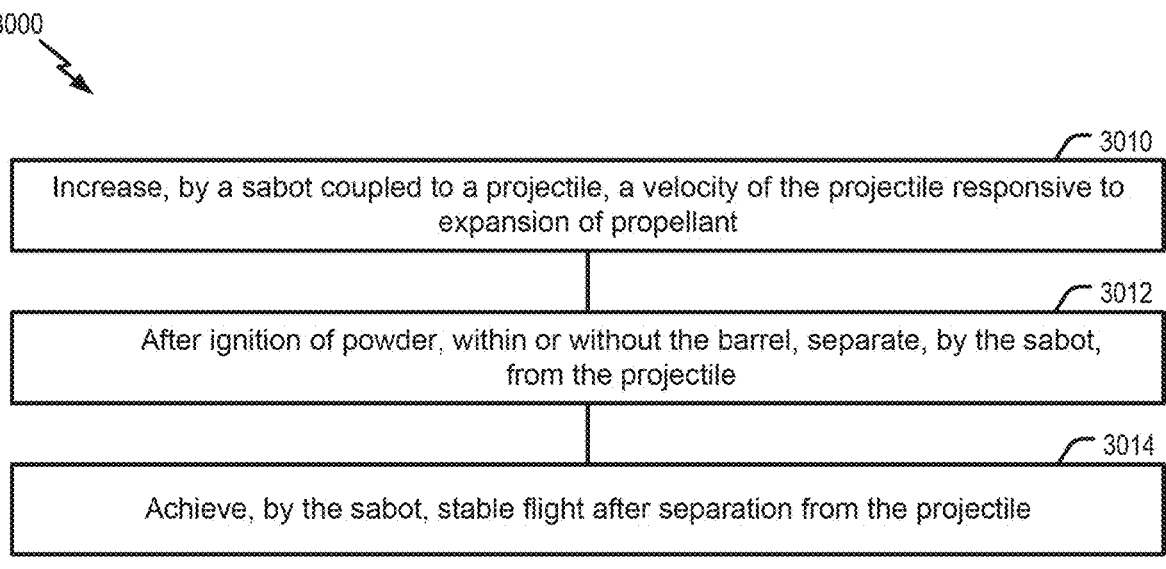
FIG. 30 is a flowchart in accordance with aspects of the present disclosure.
Figure 31:
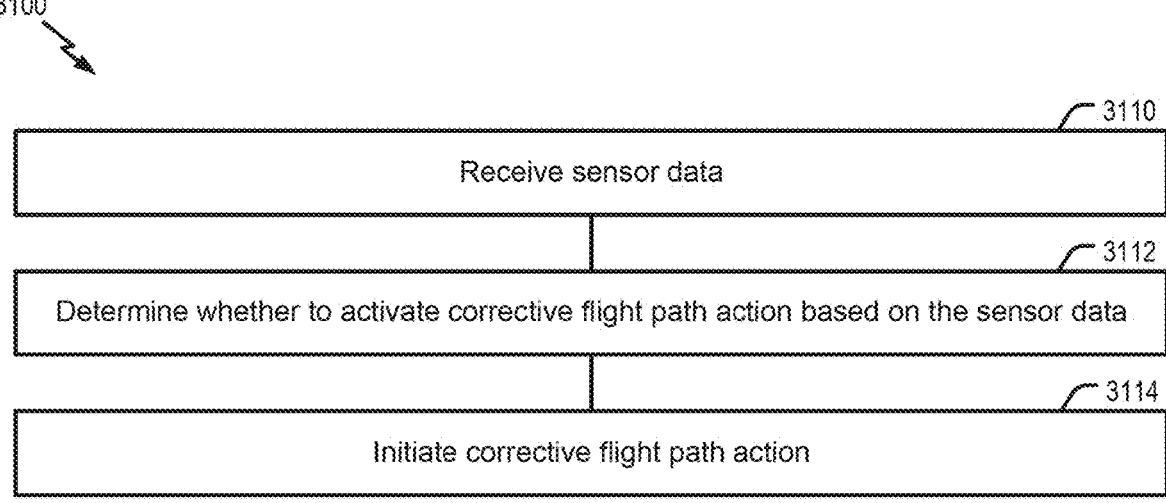
FIG. 31 is a flowchart in accordance with aspects of the present disclosure.

Referring to FIGS. 30-32, exemplary methods are illustrated. Method 3000 of FIG. 30 may be performed by a sabot, such as any of the sabots described herein. Method 3000 includes increasing, by a sabot coupled to a projectile, a velocity of the projectile responsive to expansion of propellant, at 3010. Method 3000 also includes, after exiting gun barrel, separating, by the sabot, from the projectile, at 3012. Method 3000 further includes achieving, by the sabot, stable flight after separation from the projectile, at 3014. Thus, method 3000 describes operation of a sabot which can be incorporated into a vehicle (e.g., an aerial vehicle) without the sabot crossing the flight path of the vehicle and causing damage to the vehicle.

Method 3100 of FIG. 31 may be performed by a controller, such as any of the controllers or control systems described herein. As an illustrative example, the method 3100 of FIG. 31 may be performed by a control system 2700 or a controller 2716. The control system 2700 or the controller 2716 may be including in a sabot (e.g., a guided sabot), an aircraft (e.g., 2800), or both. Method 3100 includes receiving sensor data, at 3110. Method 3100 also includes determining whether to activate corrective flight path action based on the sensor data, at 3112. Method 3100 further includes initiating corrective flight path action, at 3114. Thus, method 3100 describes operation of an aeromechanically stable sabot which can be incorporated into a vehicle (e.g., an aerial vehicle) without the sabot entering the movement path of the vehicle and causing damage to the vehicle.

Method 3200 of FIG. 32 may be performed by a vehicle, such as any of the vehicles or aircraft described herein. As an illustrative example, the method 3200 of FIG. 32 may be performed by aircraft 500 or 2800. Method 3200 includes loading a round of ammunition into a gun barrel, the ammunition included a sabot having positive stability, at 3210. Method 3200 further includes firing the round of ammunition, wherein the sabot decouples from a projectile of the round of ammunition and exits a movement path of a vehicle, at 3212. Thus, method 3200 describes operation of a vehicle (e.g., an aerial vehicle) which can incorporate aeromechanically stable sabots, and their accompanying benefits, without the aeromechanically stable sabots or sabot pieces crossing the flight path of the vehicle and causing damage to the vehicle.

Method 3300 of FIG. 33 may be performed by a projectile and aeromechanically stable sabot-launching aircraft or vehicles described herein. As an example, the method of 3300 may be performed by aircraft 500 or 2800. Method 3300 includes, at 3310, recording of the launching aircraft flight state. For example, recording of a flight state may include recording of one or more of airspeed, altitude, attitude, pitch, yaw and roll rates as well as type of round fired describing the muzzle velocity, type of powder, spin rates, static margin or other relevant factors described above.

Method 3300 also includes, at 3312, transmitting aircraft flight state data to one or more other aircraft. For example, the aircraft flight state data may be wirelessly transmitted to one or more other cooperative aircraft including inhabited and uninhabited aircraft or wingmen. The information may be entered in flight control computers of the other aircraft manually or automatically.

Method 3300 further includes, at 3315, calculating sabot trajectories predicting the flight states with time till the sabot hits the ground, establishing a probabilistic envelope of sabot position with time given a ballistic aeromechanically stable sabot (BASS), or a maneuvering aeromechanically stable sabot (MASS) with controls set to execute a command like prescribed roll (or spin) rate.

Method 3300 also includes, at 3318, transmitting predicted sabot positions to one or more other aircraft. For example, the launching aircraft may compute a predicted sabot position for a particular time in the future and transmit predicted sabot position information indicating the predicted sabot position to flight control computers of one or more other friendly aircraft. The generation and transmission of such predicted sabot position information may enable the sabots to be avoided by the other aircraft.

Method 3300 optionally includes, at 3319, communicating a flight path and/or maneuver to the MASS. For example, the launching aircraft and the MASS may be in communication such that the MASS is specifically directed by the launching aircraft and/or friendly cooperative aircraft to maneuver along a prescribed flight path. To illustrate, flight control commands may be transmitted to a MASS flight control computer so that the MASS may execute avoidance maneuvers.

It is noted that one or more operations described with reference to one of the methods of FIGS. 30-33 may be combined with one or more operations of another of FIGS. 30-31. For example, one or more operations of method 3100 may be combined with one or more operations of method 3200 or 3300. Additionally, or alternatively, one or more operations described above with reference to FIGS. 5A-29 may be combined with one or more operations of FIGS. 30-33, or a combination of FIGS. 30-33.

Although the embodiments of the present disclosure and their advantages have been described in detail, it should be understood that various changes, substitutions and alterations can be made herein without departing from the spirit and scope of the disclosure as defined by the appended claims. Further, although the drawings may illustrate some of the concepts disclosed herein as logical or functional blocks, it is to be understood that each of those blocks may be implemented in hardware, software, or a combination of hardware and software. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An aeromechanically stable sabot comprising:

a sabot assembly which is lower in mass than a projectile that the sabot assembly is configured to accelerate and release;

means of transferring launch pressures and loads when inside a gun barrel during a firing event to the projectile as the projectile is accelerated down a length of the gun barrel;

means of accommodating projectiles that are smaller in caliber than a bore of the gun barrel; and wherein the sabot assembly is configured to separate from the projectile such that the sabot assembly and the projectile will fly in steady-state, stable free flight upon separation and after exiting the gun barrel;

wherein, after exiting the gun barrel and projectile release, the sabot assembly has a center of gravity location that is displaced forward of longitudinal and directional aerodynamic centers such that that the sabot assembly will not tumble about the sabot center of gravity pitch and yaw axes;

wherein the sabot assembly has a center of gravity position, prior to launch and during launch from the gun barrel, which is behind the longitudinal and directional aerodynamic centers of the sabot during the launch event, but following sabot launch and separation from the projectile, will fly in a stable configuration such that the sabot assembly center of gravity will be ahead of the sabot assembly longitudinal and directional aerodynamic centers; wherein the sabot assembly has a lower density aft section and higher density forward section such that the center of gravity of the sabot assembly is shifted farther forward than the free-flight longitudinal and directional aerodynamic centers such that the pitching moment coefficient about the center of gravity with respect to angle of attack is less than zero ($C_{mcg\alpha}$<0) and the yawing moment coefficient about the center of gravity with respect to sideslip angle is greater than zero ($C_{ncg\beta}$>0); and a geometric feature, a functional feature, mass asymmetry or any combination thereof, configured to establish a trimmed angle of attack ($\alpha$) and/or slideslip angle ($\beta$) of the sabot assembly to execute a maneuver such that a collision between the sabot assembly and the launching aircraft and/or associated friendly aircraft is avoided.

2. The aeromechanically stable sabot of claim 1, wherein the assembly includes at least one aeromechanically stable segment.

3. The aeromechanically stable sabot of claim 1, further comprising one or more section having a bourrelet configuration.

4. The aeromechanically stable sabot of claim 1, wherein the assembly is configured to accommodate a projectile nose cone, a body, canards, wings, fins and strakes via a series of suitable slots, holes and/or geometric accommodations.

5. The aeromechanically stable sabot of claim 1, wherein the assembly is configured to accommodate at least one band, strap or seal that mitigates intrusion of water or other adverse conditions during storage, transportation and handling and may function as in-bore lubricant and/or obturating bands.

6. The aeromechanically stable sabot of claim 1, further comprising a series of baffles and/or valves that prevent gun gas backflow through and/or around the sabot during the firing event.

7. The aeromechanically stable sabot of claim 1, wherein the assembly includes one or more materials configured to biodegrade, deflagrate, disassociate, sublimate, evaporate, dissolve, combust or otherwise mechanically break down after launch and projectile separation.

8. The aeromechanically stable sabot of claim 1, wherein the assembly is configured to transfer launch loads to the projectile via a series of grooves or ridges.

9. The aeromechanically stable sabot of claim 1, wherein the assembly is configured to accommodate projectiles that can be as long as 99% of the entire shell length.

10. The aeromechanically stable sabot of claim 1, wherein the assembly is configured to accommodate an aeromechanically stable projectile, wherein the aeromechanically stable projectile comprises a dart, a flechette, or a cargo round, wherein the aeromechanically stable projectile has a circular shape, a regular polygon shape, or an irregular prism shape, wherein the aeromechanically stable projectile include one or more strakes, one or more canards, one or more wings, one or more fins, or any combination thereof.

11. The aeromechanically stable sabot of claim 1, wherein the assembly is configured to accommodate one or more fixed or movable aerodynamic stabilizers, the one or more fixed or movable aerodynamic stabilizers configured to increase static stability margins, enable commanded maneuvers, or both, wherein the aerodynamic stabilizers comprise one or more canards, one or more wings, one or more fins, one or more empennages, one or more ring-tails, one or more drag lines or whips suitable for inducing an aftward shift in aerodynamic center relative to the center of gravity, or any combination thereof.

12. The aeromechanically stable sabot of claim 1, wherein the assembly is configured to accommodate a plurality of sensors, the configured plurality of sensors to determine an orientation of the assembly relative to one or more reference orientations, wherein the one or more reference orientations include an Earth orientation, a horizon orientation, a launching aircraft orientation, a friendly aircraft orientation, or any combination thereof.

13. The aeromechanically stable sabot of claim 1, wherein the assembly is configured to accommodate one or more extendable flight control surfaces mounted on or within the assembly, the one or more extendable flight control surfaces configured to be extended after launch, wherein the one or more extendable flight control surfaces comprise one or more canards, one or more wings, one or more fins, or any combination thereof.

14. The aeromechanically stable sabot of claim 1, further comprising a flight control system configured to execute avoidance maneuvers, control flight of one or more components of the assembly to ground, or both.

15. The aeromechanically stable sabot of claim 1, further comprising a rocket motor including at least one nozzle configured to execute a controlled maneuver.

16. The aeromechanically stable sabot of claim 1, further comprising a separation/explosive charge configured to induce rapid subcomponent separation upon muzzle exit.

17. The aeromechanically stable sabot of claim 1, further comprising nose seals and/or handling guards which are made from compliant, frangible materials, and wherein the compliant, frangible materials be ingested by launching aircraft engines or strike the launching aircraft airframe without inducing adverse harm or damage.

18. The aeromechanically stable sabot of claim 1, wherein the assembly is configured to accommodate projectile full-bore fins by expanding via clip assemblies between segments or by breaking into aeromechanically stable segments.

19. An aeromechanically stable sabot as described in claim 1 which may employ both fast and slow-burn charges so as to maximize muzzle velocity with respect to peak gun barrel pressure such that:

at least one slower burn portion of the charge travels down gun barrel during launch in close proximity to or attached to a portion of the projectile and/or sabot;

at least one faster burn portion of the charge that stay near the breech, separating from the other charge sections allowing for high initial acceleration;

at least one interstitial section of charge at a given burn rate between fast and slow.

20. An aeromechanically stable sabot as described in claim 1 which shields the expelled projectile from high tip-off moment impulses caused by muzzle blast.

\*    \*    \*    \*    \*